(12) United States Patent
LaCross et al.

(10) Patent No.: US 12,703,303 B2
(45) Date of Patent: Aug. 11, 2026

(54) VEHICULAR INTERIOR REARVIEW MIRROR ASSEMBLY WITH DRIVER MONITORING CAMERA

(71) Applicant: Magna Mirrors of America, Inc., Holland, MI (US)

(72) Inventors: Anthony J. LaCross, Hastings, MI (US); Justin E. Sobecki, Rockford, MI (US)

(73) Assignee: Magna Mirrors of America, Inc., Holland, MI (US)

(*) Notice: Subject to any disclaimer, the term of this patent is extended or adjusted under 35 U.S.C. 154(b) by 0 days.

(21) Appl. No.: 19/290,465

(22) Filed: Aug. 5, 2025

(65) Prior Publication Data

US 2026/0042394 A1 Feb. 12, 2026

Related U.S. Application Data

(60) Provisional application No. 63/679,835, filed on Aug. 6, 2024.

(51) Int. Cl.
*B60R 1/04* (2006.01)
*B60R 1/08* (2006.01)
*B60R 1/12* (2006.01)
*B60R 1/29* (2022.01)

(52) U.S. Cl.
CPC .................. *B60R 1/12* (2013.01); *B60R 1/08* (2013.01); *B60R 1/29* (2022.01); *B60R 2001/1253* (2013.01); *B60R 2300/103* (2013.01)

(58) Field of Classification Search
CPC .... B60R 1/04; B60R 1/12; B60R 1/29; B60R 2001/1253; B60R 2300/103
USPC .......................................................... 362/494
See application file for complete search history.

(56) References Cited

U.S. PATENT DOCUMENTS 10,017,114 B2 7/2018 Bongwald
10,029,614 B2 7/2018 Larson
10,046,706 B2 8/2018 Larson et al.
10,065,574 B2 9/2018 Tiryaki
10,166,924 B2 1/2019 Baur
10,421,404 B2 9/2019 Larson et al.
10,442,360 B2 10/2019 LaCross et al.
10,958,830 B2 3/2021 Koravadi
(Continued)

FOREIGN PATENT DOCUMENTS

WO 2025231198 A1 11/2025
WO 2026019985 A1 1/2026

*Primary Examiner* — Toan C Ly
(74) *Attorney, Agent, or Firm* — HONIGMAN LLP

(57) ABSTRACT

A vehicular driver monitoring system includes a vehicular interior rearview mirror assembly, a cabin monitoring camera accommodated by a mirror head of the mirror assembly, and a near infrared light source accommodated by the mirror head. The mirror head includes a chin portion disposed at a lower region of the mirror head. The chin portion of the mirror head accommodates a cover panel disposed below a lower edge region of the mirror reflective element. An outer surface of the cover panel is disposed at an oblique angle relative to an outer surface of the mirror reflective element at the lower region of the mirror head. The cabin monitoring camera is accommodated at a first side region of the chin portion, and the near infrared light source is accommodated at a second side region of the chin portion that is opposite the first side region.

30 Claims, 94 Drawing Sheets

(56) References Cited

U.S. PATENT DOCUMENTS

| | | | |
|---|---|---|---|
| 11,214,199 | B2 | 1/2022 | LaCross et al. |
| 11,242,008 | B2 | 2/2022 | Blank et al. |
| 11,518,401 | B2 | 12/2022 | Kulkarni |
| 11,582,425 | B2 | 2/2023 | Liu |
| 11,639,134 | B1 | 5/2023 | Huizen et al. |
| 11,780,372 | B2 | 10/2023 | Sobecki et al. |
| 11,827,153 | B2 | 11/2023 | Miller et al. |
| 11,930,264 | B2 | 3/2024 | Conger et al. |
| 12,134,358 | B2 | 11/2024 | Baur |
| 12,393,089 | B2 | 8/2025 | Baur |
| 12,403,834 | B2 | 9/2025 | Baur |
| 2015/0092042 | A1 | 4/2015 | Fursich |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2016/0209647 | A1 | 7/2016 | Fursich |
| 2017/0217367 | A1 | 8/2017 | Pflug et al. |
| 2017/0274906 | A1 | 9/2017 | Hassan et al. |
| 2017/0355312 | A1 | 12/2017 | Habibi et al. |
| 2018/0056871 | A1* | 3/2018 | Karner ...................... B60R 1/12 |
| 2018/0231976 | A1 | 8/2018 | Singh |
| 2019/0118717 | A1 | 4/2019 | Blank et al. |
| 2019/0146297 | A1 | 5/2019 | Lynam et al. |
| 2019/0210615 | A1 | 7/2019 | Caron et al. |
| 2019/0258131 | A9 | 8/2019 | Lynam et al. |
| 2020/0143560 | A1 | 5/2020 | Lu et al. |
| 2020/0202151 | A1 | 6/2020 | Wacquant |
| 2020/0320320 | A1 | 10/2020 | Lynam |
| 2020/0377022 | A1 | 12/2020 | LaCross et al. |
| 2021/0155167 | A1 | 5/2021 | Lynam et al. |
| 2021/0162926 | A1 | 6/2021 | Lu |
| 2021/0291739 | A1 | 9/2021 | Kasarla et al. |
| 2021/0323473 | A1 | 10/2021 | Peterson et al. |
| 2022/0242438 | A1 | 8/2022 | Sobecki et al. |
| 2022/0254132 | A1 | 8/2022 | Rother |
| 2022/0377219 | A1 | 11/2022 | Conger et al. |
| 2024/0190456 | A1 | 6/2024 | P et al. |
| 2024/0383406 | A1 | 11/2024 | Sobecki |
| 2025/0329174 | A1 | 10/2025 | De Wind et al. |

* cited by examiner 14
28

14
26
18
24

| Angle | Total Height | Delta |
| --- | --- | --- |
| 0° | 79.7mm | NA |
| 3° | 77.3mm | -2.4mm |
| 5° | 76.3mm | -3.4mm |
| 7° | 75.6mm | -4.1mm |

LHD Narrow FOV
RHD Narrow FOV
18

LHD Narrow FOV
RHD Narrow FOV
18

18

*Common LH and RH Drive Part*

*LH Drive Part Only*

Worst Case Driver/Vehicle/Aims Results

| | | | 10a | 10b | 10c | |
|---|---|---|---|---|---|---|
| | | | Camera Centered 20° downward pitch | Camera offset to the driver 20° downward pitch | Camera offset to the passenger 20° downward pitch | |
| | Topic | Measurement | Value | Value | Value | |
| DMS FUNCTIONS | Driver HAND: FOV Overhead | Angle between FOV Limit and Driver Hand on steering wheel POI | -8.3° | -11.4° | -4.3° | |
| DMS FUNCTIONS | Camera Pose: Pitch | Pitch = Angle between camera, driver eye and vehicle Z-plane | 11.7° | 12.3° | 11.1° | *Little Impact* |
| DMS FUNCTIONS | Camera Pose: YAW | Yaw = Angle between camera, driver eye and vehicle Y-plane | 67.0° | 64.3° | 69.5° | |
| DMS FUNCTIONS | Driver Eye Position: Pupil Angle | Angle between LED, Eye and Camera ° | 3.7° | 3.5° | 3.7° | *Little Impact* |
| DMS FUNCTIONS | Object Space MTF at LH Eye | MFT is estimated based on camera spatial resolution curves and POI position. | 0.212 lp/mm | 0.213 lp/mm | 0.211 lp/mm | *Little Impact* |
| DMS FUNCTIONS | Driver LH Eye Resolution Pupil Radius = 5.5mm | The image size of the eye in pixels | 20.5 Pixels | 20.8 Pixels | 20.4 Pixels | *Little Impact* |
| OMS FUNCTIONS | 1st Row Passenger Front Seat: FOV Overhead | Angle between FOV Limit and Front Passenger Seat (Est. Child Seat) | 10.0° | 10.9° | 4.9° | *Little Impact* |
| OMS FUNCTIONS | 1st Row Passenger Front Face: FOV Overhead | Angle between FOV Limit and Passenger Monocular Eye | -10.1° | -10.7° | -9.6° | *Little Impact* |

FIG.16

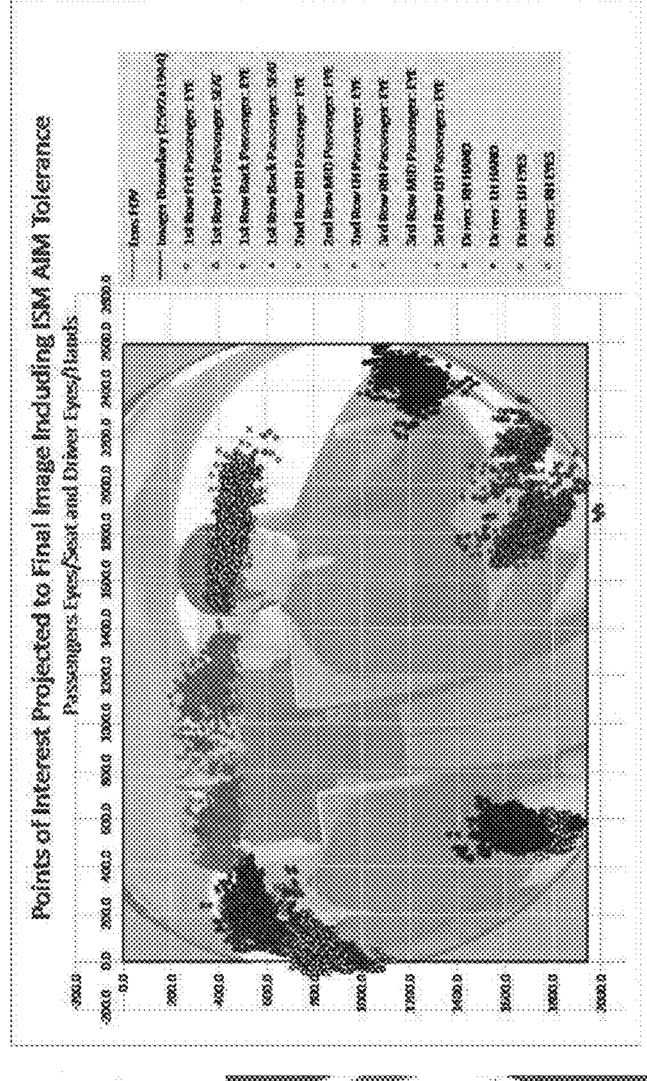
10a
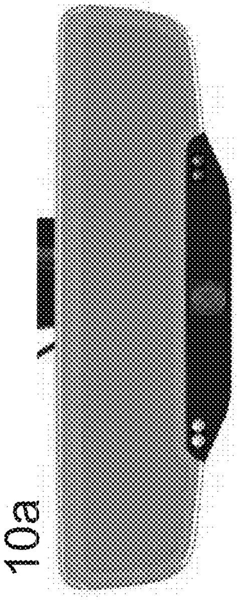
*Example Camera FOV Rendering*
*5% Female Driver*
*5% Female Passenger*
FIG. 17A 10b

*Example Camera FOV Rendering*
*5% Female Driver*
*5% Female Passenger*

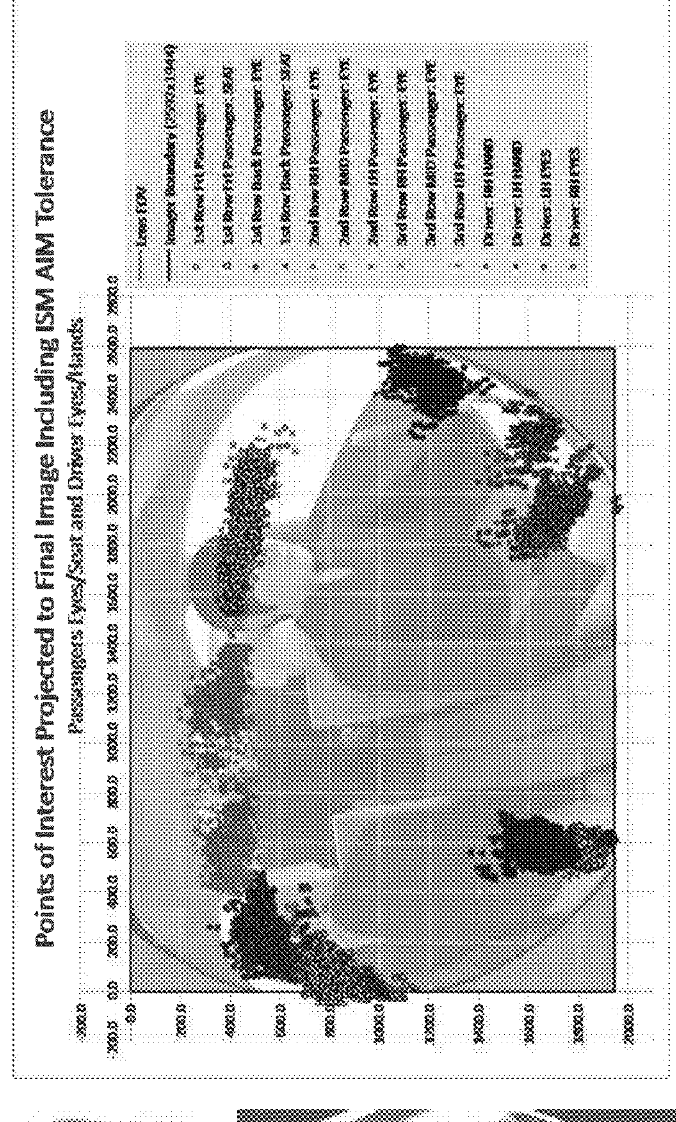
10c
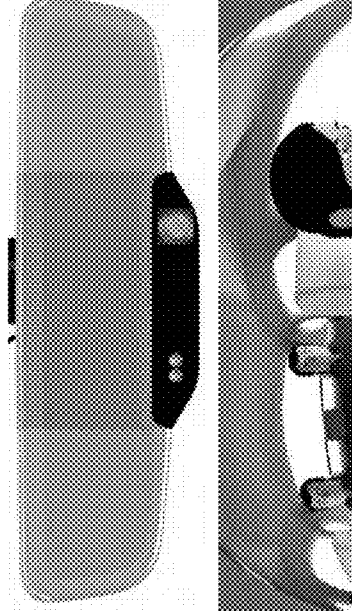
*Example Camera FOV Rendering*
*5% Female Driver*
*5% Female Passenger*
FIG. 17C

| | FOV | 1/2FOV | half height | Full Size, mm | pixel | full res | Gimp Offset t | Pixel Size, m | pixels/mm | EFL | | Mechanical Camera Center (mm) |
|---|---|---|---|---|---|---|---|---|---|---|---|---|
| Horizontal | 141.6368012 | 70.81840061 | 2.8512 | 5.7024 | 1296 | 2592 | 0.109353367 | | | | X | 0 |
| Vertical | 93.48044153 | 46.74022077 | 2.1384 | 4.2768 | 972 | 1944 | 1.072153367 | 0.0022 | 454.5454545 | 2.5137334 | Y | 0.250000 |
| Diagonal | 165.0000 | 82.5 | 2.960553367 | 5.921106734 | | | | | | Total Shift, mm | | 0.2500000 |
| | | | | | | | | | | Total Shift, deg | | 5.679598714 |
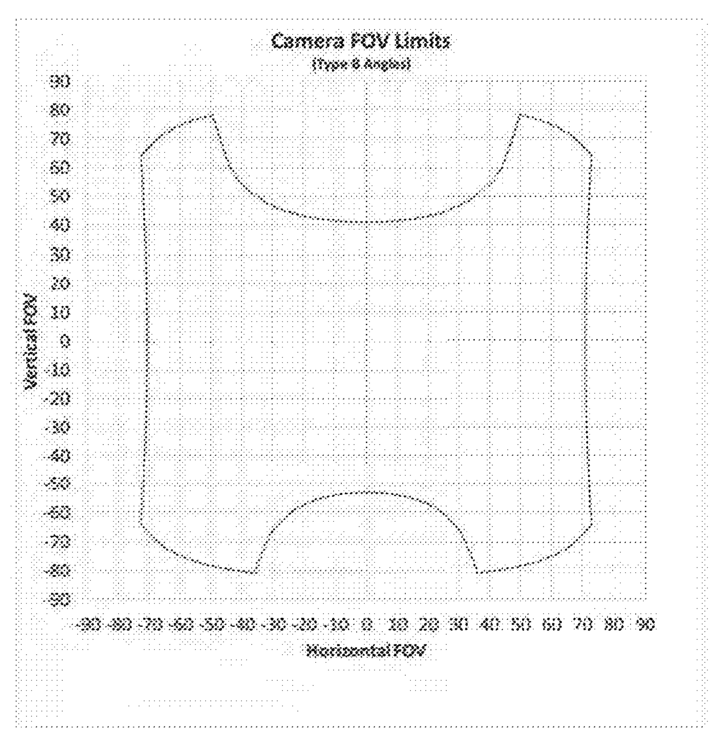
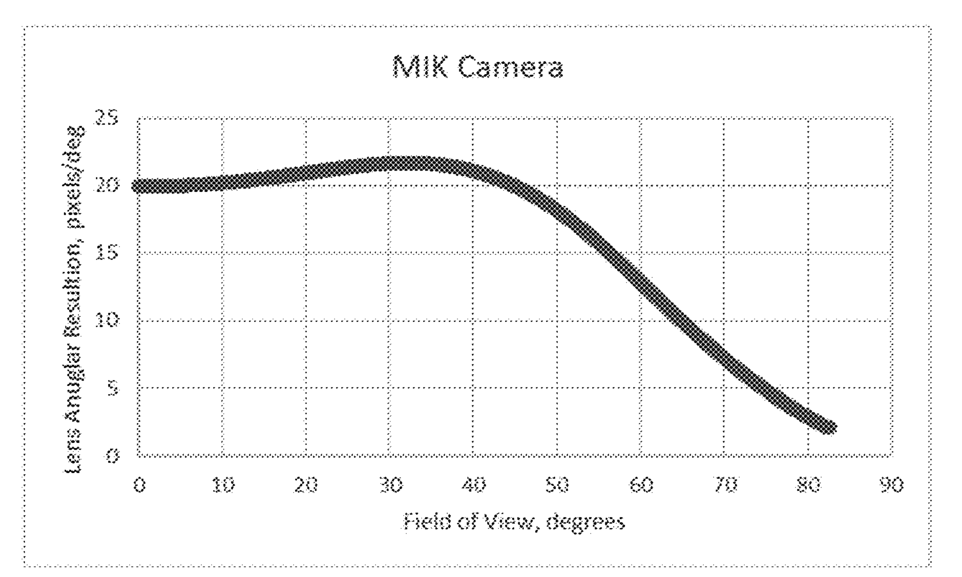
FIG. 20

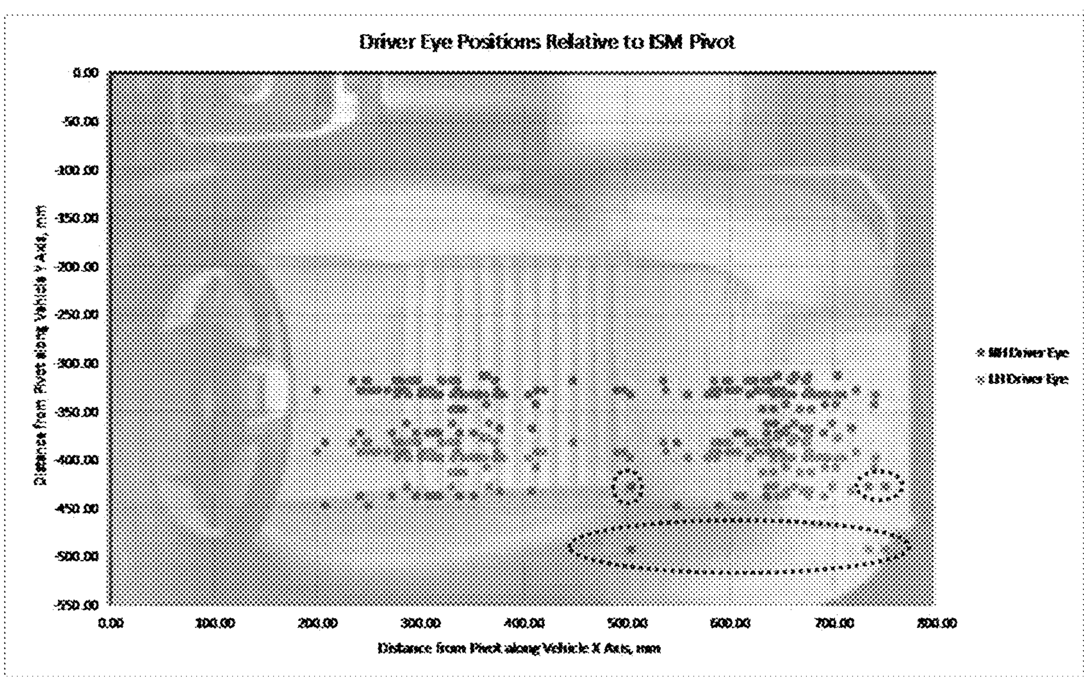
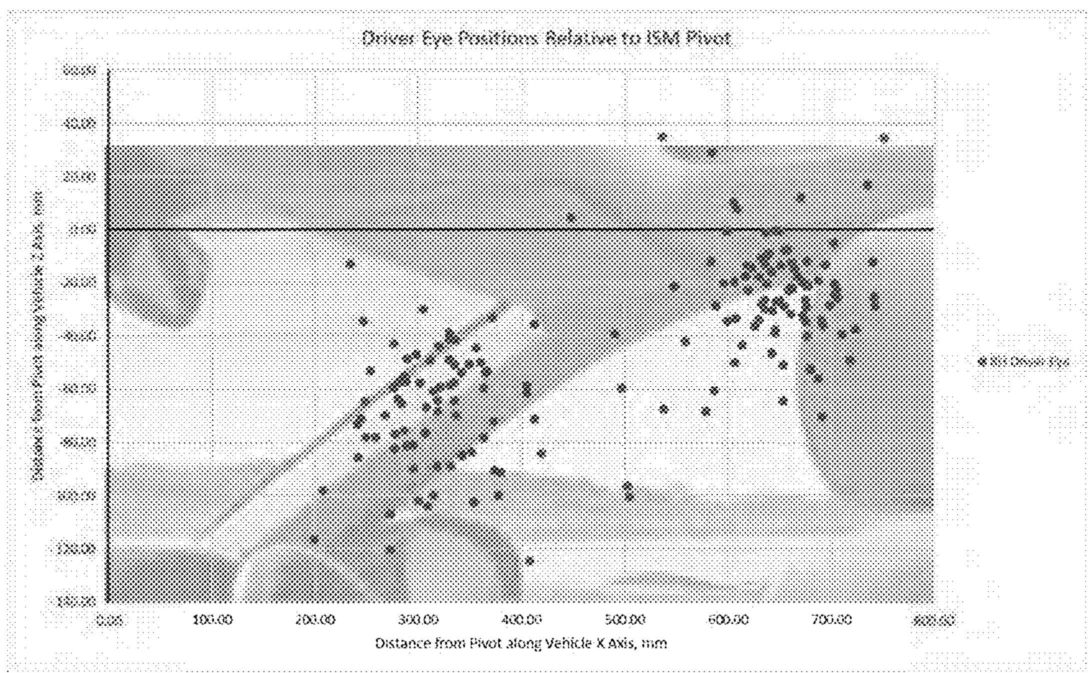
FIG.21

| INPUTS | | | | |
|---|---|---|---|---|
| | x | y | z | |
| Reflector surface to mirror Pivot, Po | 48.8 | 0.0 | -0.9 | mm |
| Normal Unit Vector for mirror glass | 1.0 | 0.0 | 0.0 | mm |
| Reflector Limit TOP | 48.8 | 0.0 | 26.2 | mm |
| Reflector Limit BOTTOM | 48.8 | 0.0 | -28.0 | mm |
| Reflector Limit LEFT | 48.8 | -122.9 | -0.9 | mm |
| Reflector Limit RIGHT | 48.8 | 122.9 | -0.9 | mm |

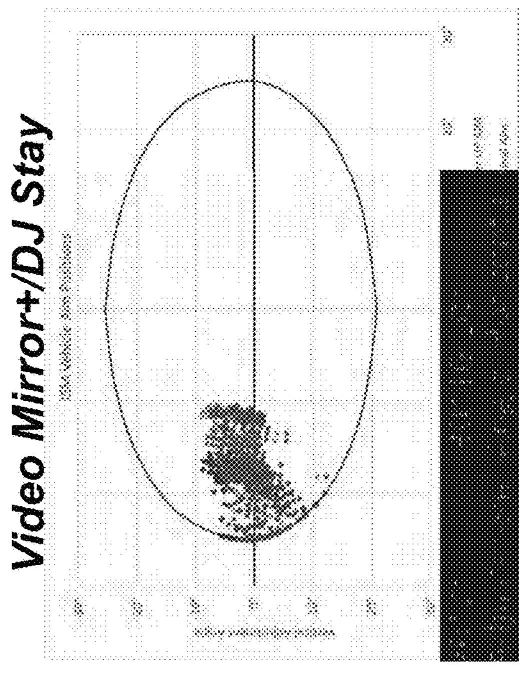
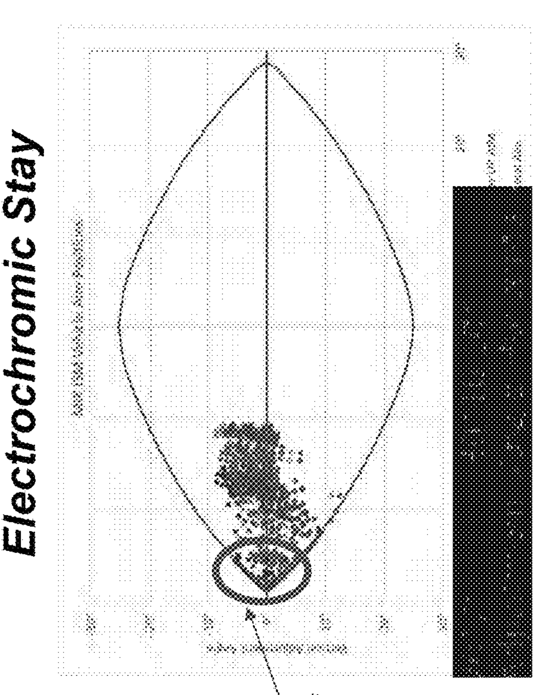
FIG. 25

| | Topic | Measurement | Limits/Goal | Worst Case Study (All AIMs) | | | | |
|---|---|---|---|---|---|---|---|---|
| | | | | Value | Vehicle/Variant | Driver | Passenger | AIM |
| DMS FUNCTIONS | **Driver HAND:** FOV Overhead | Angle between FOV Limit and Driver Hand on steering wheel POI | > 0° | -8.3° | | | | Aim Towards Passenger Side And UP |
| | **Driver Eye Distance:** MTF Range Limit | Distance between camera and Driver Eye | < 790 mm | 856.8 mm | | | | Aim Towards Passenger Side And Down |
| | **Driver Eye Distance:** Detection Limit | Distance between camera and Driver Eye | > 350 mm | 359.1 mm | | | | Nominal Aim [*] |
| | **Driver Eye Position:** MTF Field Angle | Angle between Driver's Eye and Camera axis | < 45° | 48.1° | | | | Aim Towards Passenger Side And Down |
| | **Camera Pose:** Pitch | Pitch = Angle between camera, driver eye and vehicle Z-plane | < 20° | 11.7° | | | | Nominal Aim [*] |
| | **Camera Pose:** YAW | Yaw = Angle between camera, driver eye and vehicle Y-plane | < 55° | 67.0° | | | | Aim Towards Driver Side And UP |
| | **Driver Eye Position:** Pupil Angle | Angle between LED, Eye and Camera ° | > 3.5°*** | 3.4271° | | | | Aim Towards Passenger Side And Down |
| | **Object Space MTF at LH Eye** | MFT is estimated based on camera spatial resolution curves and POI position. | > 0.2 lp/mm | 0.200° | | | | Aim Towards Driver Side And UP |
| | **Driver RH Eye Resolution Pupil Radius = 5.5mm** | The image size of the eye in pixels | > 11 Pixels | 20.8 Pixels | | | | Nominal Aim [*] |
| | **Driver LH Eye Resolution Pupil Radius = 5.5mm** | The image size of the eye in pixels | > 11 Pixels | 20.5 Pixels | | | | Nominal Aim [*] |
| OMS FUNCTIONS | **1st Row Passenger Front Seat:** FOV Overhead | Angle between FOV Limit and Front Passenger Seat (Est. Child Seat) | > 0° | 10.0° | | | 1st Row FRT | Aim Towards Driver Side And UP |
| | **1st Row Passenger Front Face:** FOV Overhead | Angle between FOV Limit and Passenger Monocular Eye | > 0° | -10.1° | | | 1st Row FRT | Aim Towards Driver Side And UP |

FIG. 26

| | Topic | Measurement | Limits/Goal | Worst Case Study (All AIMs) Value | Vehicle/Variant | Driver | Passenger | AIM |
|---|---|---|---|---|---|---|---|---|
| DMS FUNCTIONS | **Driver HAND:** FOV Overhead | Angle between FOV Limit and Driver Hand on steering wheel POI | > 0° | -8.3° | | | | Aim Towards Passenger Side And UP |
| | **Driver Eye Distance:** MTF Range Limit | Distance between camera and Driver Eye | < 790 mm | 801.5 mm | | | | Aim Towards Passenger Side And Down |
| | **Driver Eye Distance:** Detection Limit | Distance between camera and Driver Eye | > 350 mm | 359.1 mm | | | | Nominal Aim [°] |
| | **Driver Eye Position:** MTF Field Angle | Angle between Driver's Eye and Camera axis | < 45° | 48.1° | | | | Aim Towards Passenger Side And Down |
| | **Camera Pose:** Pitch | Pitch = Angle between camera, driver eye and vehicle Z-plane | < 20° | 11.7° | | | | Nominal Aim [°] |
| | **Camera Pose:** YAW | Yaw = Angle between camera, driver eye and vehicle Y-plane | < 55° | 67.0° | | | | Aim Towards Driver Side And UP |
| | **Driver Eye Position:** Pupil Angle | Angle between LED, Eye and Camera ° | > 3.5*** | 3.7239° | | | | Aim Towards Passenger Side And Down |
| | **Object Space MTF at LH Eye** | MFT is estimated based on camera spartial resolution curves and POI position | > 0.2 lp/mm | 0.212° | | | | Aim Towards Driver Side And UP |
| | **Driver RH Eye Resolution Pupil Radius = 5.5mm** | The image size of the eye in pixels | > 11 Pixels | 20.8 Pixels | | | | Nominal Aim [°] |
| | **Driver LH Eye Resolution Pupil Radius = 5.5mm** | The image size of the eye in pixels | > 11 Pixels | 20.5 Pixels | | | | Nominal Aim [°] |
| OMS FUNCTIONS | **1st Row Passenger Front Seat:** FOV Overhead | Angle between FOV Limit and Front Passenger Seat (Est. Child Seat) | > 0° | 10.0° | | | 1st Row FRT | Aim Towards Driver Side And UP |
| | **1st Row Passenger Front Face:** FOV Overhead | Angle between FOV Limit and Passenger Monocular Eye | > 0° | -10.1° | | | 1st Row FRT | Aim Towards Driver Side And UP |

FIG. 27

| | | Rohm Plexiglass 7v392 | Camera + Dual Band Pass %T (LC Data 06-27-22 #4) | Camera x EC |
|---|---|---|---|---|
| Visible Spectrum | Avg %t 425 - 630 | 24% | 71% | 17% |
| Infrared Spectrum | Avg %t 900 - 1000 | 92% | 74% | 68% |

| | | | | | | |
|---|---|---|---|---|---|---|
| 4 | Average Irradiance On driver's face | 11.2545 w/sqm | | | | |
| 5 | | | | | | |
| 6 | | Red Pixel | Green B pixel | Green Pixel | Blue Pixel | IR Pixel |
| 7 | Total Signal from LED Radiation | 2.0564 | 1.9646 | 1.9646 | 2.0451 | 2.2308 |
| 8 | Total Signal from Solar Radiation | 25.6689 | 35.7462 | 35.7462 | 27.4231 | 13.7755 |
| 9 | ARR | 0.0801 | 0.0550 | 0.0550 | 0.0746 | 0.1619 |

FIG. 34

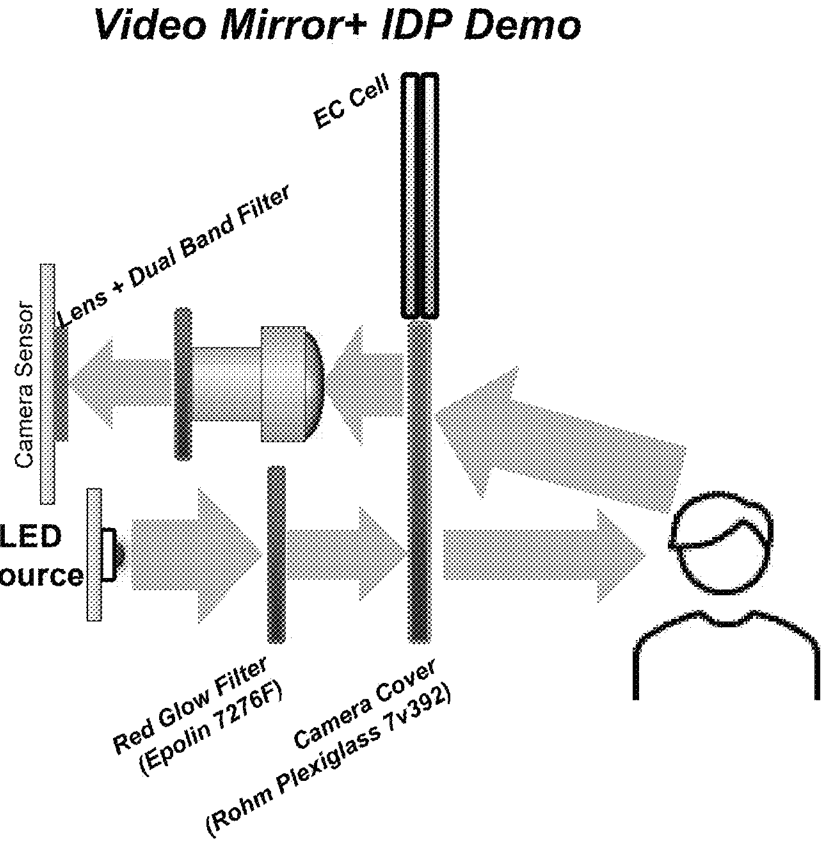
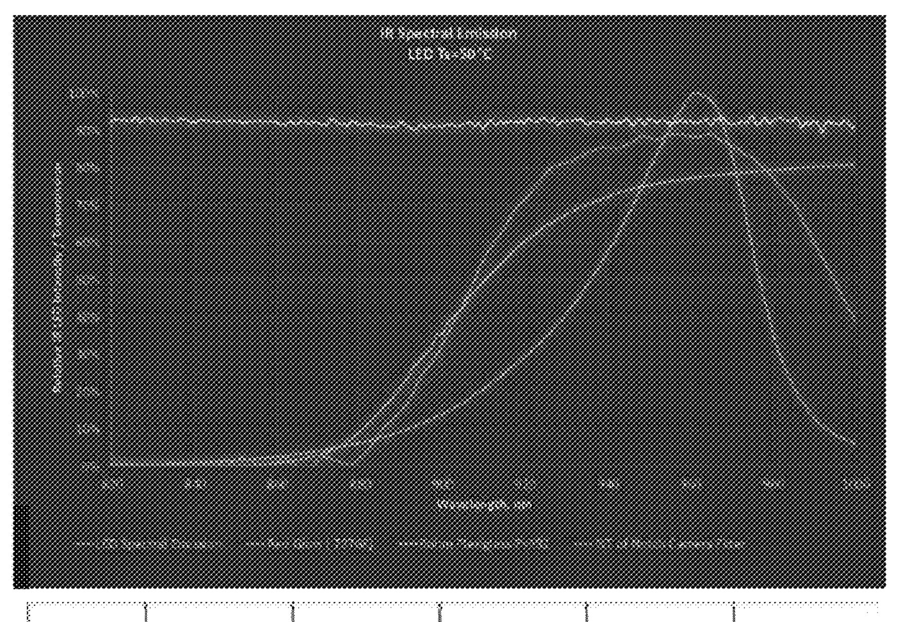
| LED Solder TEMP, °C | Red Glow Filter | Cover OUT | Cover IN | Camera Notch Filter Eff. | Overall Eff. |
|---|---|---|---|---|---|
| 120 | 72.25% | 92.22% | 92.23% | 71.41% | 43.88% |
| 100 | 71.72% | 92.30% | 92.31% | 75.18% | 45.94% |
| 75 | 70.73% | 92.36% | 92.36% | 79.09% | 47.72% |
| **50** | **69.48%** | **92.37%** | **92.37%** | **81.30%** | **48.20%** |
| 25 | 67.95% | 92.36% | 92.36% | 81.82% | 47.43% |
| 0 | 66.06% | 92.35% | 92.35% | 80.99% | 45.63% |
| -20 | 64.01% | 92.34% | 92.35% | 79.39% | 43.33% |
| -40 | 61.76% | 92.34% | 92.35% | 77.25% | 40.69% |
*AOI = 0°
FIG. 35

Video Mirror+ IDP Demo

EC Cell

Lens + Dual Band Filter

Camera Sensor

LED Source

Red Glow Filter (Epolin 7276A)

Camera Cover (Rohm Plexiglass 7v392)

| LED Solder TEMP, °C | Red Glow Filter | Cover OUT | Cover IN | Camera Notch Filter Eff. | Overall Eff. |
|---|---|---|---|---|---|
| 120 | 88.25% | 92.20% | 92.21% | 69.41% | 52.08% |
| 100 | 88.34% | 92.27% | 92.28% | 73.78% | 54.75% |
| 75 | 88.36% | 92.32% | 92.33% | 76.15% | 57.35% |
| 50 | 88.32% | 92.32% | 92.33% | 77.86% | 58.62% |
| 25 | 88.25% | 92.31% | 92.32% | 77.96% | 58.63% |
| 0 | 88.14% | 92.30% | 92.30% | 76.76% | 57.64% |
| -20 | 87.98% | 92.28% | 92.29% | 74.83% | 56.07% |
| -40 | 87.79% | 92.27% | 92.28% | 72.38% | 54.11% |

*AOI = 0°

Irradiance to SNR Conversion

- 50% reflective target
- F2 Lens
- High QE version
- Sensor Temp: 23°C
- Nominal Gain
- 100%T Lens
  - (The actual %T of lens is factored in before using this conversion factor)

Current Draw

- 35Hz System
  - Max Energy (SNR calculations)
    - 4ms Pulse = 2.31A
  - Max Power (ARR Calculations)
    - 0.5ms Pulse = 4.69A
- 54Hz System
  - Max Energy (SNR calculations)
    - 4ms Pulse = 1.709A
  - Max Power (ARR Calculations)
    - 0.5ms Pulse ≈ 4.383A

| | Narrow LEDs | | | | Wide LEDs | | | |
|---|---|---|---|---|---|---|---|---|
| Product Type | DMS Freq. | OMS Freq. | RGB | Total | DMS Freq. | OMS Freq. | RGB | Total |
| MIK (ISM behind the glass) | 30Hz | OFF | OFF | **30Hz** | 30Hz | 5Hz | 25Hz | **60Hz** |
| ISM chin mount | 30Hz | OFF | OFF | **30Hz** | OFF | 5Hz | 25Hz | **30Hz** |
| DMS3 | 54Hz | N/A | N/A | **54Hz** | N/A | N/A | N/A | **N/A** |

*Duty Cycles above assume 4ms pulses at these frequencies

FIG. 40

| 50FOV | | | MIK Current | DMS3 Current |
|---|---|---|---|---|
| Property | Sym. | Unit | TYPICAL Low bin | TYPICAL Low bin |
| Solder Temp | Ts | °C | 122.0 | 122.0 |
| Flux Condition | - | - | TYP Low BIN | TYP Low BIN |
| Radiant Intensity I (1A; 25°C) | | mW/sr | 1260.0 | 1260.0 |
| Radiant Flux (1A; 25°C), W | | W | 1.213 | 1.213 |
| Voltage Condition | - | - | TYP | TYP |
| Voltage Range factor @ $I_f$ (25°C) | | | 1.00 | 1.00 |
| Voltage Drop ($I_f$, Ts) | $V_f$ | V DC | 2.68 | 2.59 |
| End of Life Brightness Reduction | | - | 1.0 | 1.0 |
| Current Draw | $I_f$ | Amps | 2.32 | 1.709 |
| Light output per Source | $\Phi_e$ | W | 2.11 | 1.59 |
| Power Conversion Eff | $\eta$ | | 34% | 36% |
| Average Electrical Power | | W | 0.75 | 0.53 |
| Instantaneous Heat Dissipation | $P_{heat}$ | W | 4.1 | 2.8 |
| Exposure Time | T | msec | 4.000 | 4.000 |
| Frame Rate | FR | FPS | 30.0 | 30.0 |
| Duty cycle | DC | % | 12% | 12% |
| Average Heat Dissipation/Source | $P_{heat,avg}$ | W | 0.4927 | 0.3407 |
| Junction Temp* | Tj | °C | 125.3 | 124.2 |
| Number Sources | | | 2.0 | 3.0 |
| Total Average Heat Dissipation | | W | 1.0 | 0.7 |

| 130° x 155°FOV | | | MIK Current | | DMS3 Current | |
|---|---|---|---|---|---|---|
| Property | Sym. | Unit | TYPICAL Low bin 60Hz (RGB video) | TYPICAL Low bin 5Hz (no RGB video) | TYPICAL Low bin 60Hz (RGB video) | TYPICAL Low bin 5Hz (no RGB video) |
| Solder Temp | Ts | °C | 122.0 | 122.0 | 122.0 | 122.0 |
| Flux Condition | - | - | TYP Low BIN | TYP Low BIN | TYP Low BIN | TYP Low BIN |
| Radiant Intensity I (1A; 25°C) | | mW/sr | 265.0 | 265.0 | 265.0 | 265.0 |
| Radiant Flux (1A; 25°C), W | | W | 1.224 | 1.224 | 1.224 | 1.224 |
| Voltage Condition | - | - | TYP | TYP | TYP | TYP |
| Voltage Range factor @ $I_f$ (25°C) | - | | 1.00 | 1.00 | 1.00 | 1.00 |
| Voltage Drop ($I_f$, Ts) | $V_f$ | V DC | 2.68 | 2.68 | 2.59 | 2.59 |
| End of Life Brightness Reduction | | | 1.0 | 1.0 | 1.0 | 1.0 |
| Current Draw | $I_f$ | Amps | 2.32 | 2.32 | 1.709 | 1.709 |
| Light output per Source | $\Phi_e$ | W | 2.13 | 2.13 | 1.60 | 1.60 |
| Power Conversion Eff | $\eta$ | | 34% | 34% | 36% | 36% |
| Average Electrical Power | | W | 0.75 | 0.12 | 0.53 | 0.09 |
| Instantaneous Heat Dissipation | $P_{heat}$ | W | 4.1 | 4.1 | 2.8 | 2.8 |
| Exposure Time | T | msec | 4.000 | 4.000 | 4.000 | 4.000 |
| Frame Rate | FR | FPS | 30.0 | 5.0 | 30.0 | 5.0 |
| Duty cycle | DC | % | 12% | 2% | 12% | 2% |
| Average Heat Dissipation/Source | $P_{heat,avg}$ | W | 0.4903 | 0.0817 | 0.3390 | 0.0565 |
| Junction Temp* | Tj | °C | 125.2 | 122.5 | 124.2 | 122.4 |
| Number Sources | | | 2.0 | 2.0 | 3.0 | 2.0 |
| Total Average Heat Dissipation | | W | 1.0 | 0.2 | 0.7 | 0.1 |

*All calculations done at max power for 30Hz DMS + 5Hz OMS.*

FIG. 41

- 2 x nFOV LEDs (4728AS)
  - 22° bias to RH Driver
- 2 x wFOV LEDs (47278AS)
  - 20° bias Down
- 2 x nFOV LEDs (4728AS)
  - -22° bias to LH Driver

| | 30hz | 5hz | 30hz | 5hz | 25hz |
|---|---|---|---|---|---|
| LED Group | LHD DMS | LHD OMS | RHD DMS | RHD OMS | RGB |
| nFOV RH | | | 2x ON | | |
| wFOV | OFF | 2x ON | OFF | 2x ON | 2x ON |
| nFOV LH | 2x ON | | | | |

| FRAME: | 1 | 2 | 3 | 4 | 5 | 6 | 7 | 8 | 9 | 10 | 11 | 12 |
|---|---|---|---|---|---|---|---|---|---|---|---|---|
| | DMS | OMS | DMS | RGB | DMS | RGB | DMS | RGB | DMS | RGB | DMS | RGB |

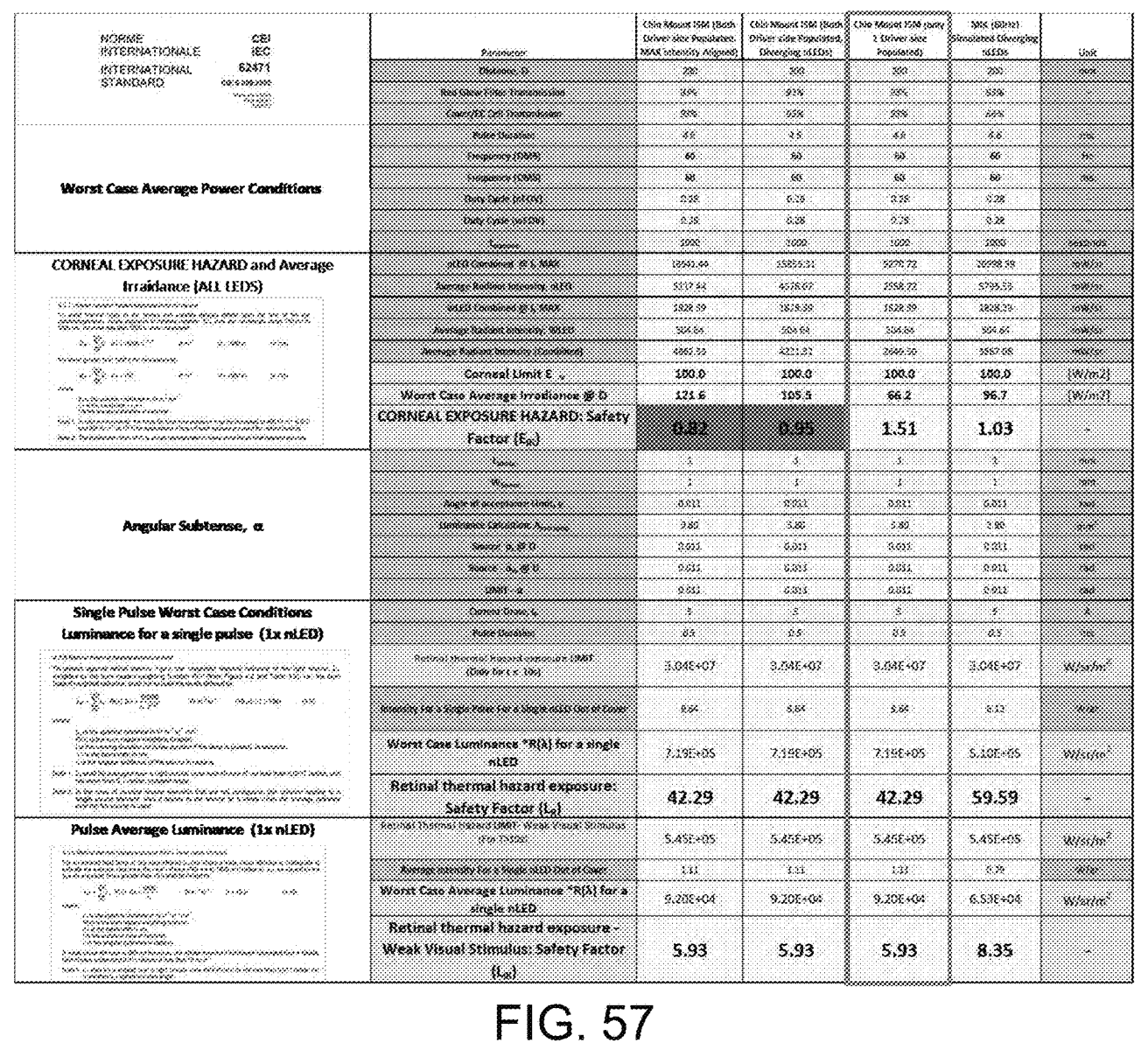

NORME INTERNATIONALE / INTERNATIONAL STANDARD — CEI IEC 62471

| Section | Parameter | Chin Mount ISM (Both Driver side Populated, MAX Intensity Aligned) | Chin Mount ISM (Both Driver side Populated, Diverging nLEDs) | Chin Mount ISM (only 1 Driver side Populated) | MK (60Hz) Simulated Diverging nLEDs | Unit |
|---|---|---|---|---|---|---|
| Worst Case Average Power Conditions | Distance, D | 200 | 200 | 200 | 200 | mm |
| | Red Glow Filter Transmission | 85% | 91% | 85% | 55% | |
| | Cover/EC Diff Transmission | 90% | 95% | 90% | 60% | |
| | Pulse Duration | 4.6 | 4.5 | 4.6 | 4.6 | ms |
| | Frequency (SOR) | 60 | 60 | 60 | 60 | Hz |
| | Frequency (CON) | 60 | 60 | 60 | 60 | Hz |
| | Duty Cycle (nLEDs) | 0.28 | 0.28 | 0.28 | 0.28 | |
| | Duty Cycle (wLEDs) | 0.28 | 0.28 | 0.28 | 0.22 | |
| | $t_{limit}$ | 1000 | 1000 | 1000 | 1000 | seconds |
| CORNEAL EXPOSURE HAZARD and Average Irradiance (ALL LEDS) | nLED Combined @ D, MAX | 18561.44 | 15855.31 | 9270.72 | 20098.59 | mW/sr |
| | Average Radiant Intensity, nLED | 5317.44 | 4578.07 | 2558.72 | 5795.53 | mW/sr |
| | wLED Combined @ D, MAX | 1828.59 | 1828.59 | 1828.59 | 1828.59 | mW/sr |
| | Average Radiant Intensity, wLED | 504.64 | 504.64 | 504.64 | 504.64 | mW/sr |
| | Average Radiant Intensity (Combined) | 4863.79 | 4221.32 | 2640.50 | 3557.08 | mW/sr |
| | Corneal Limit $E_{IR}$ | 100.0 | 100.0 | 100.0 | 100.0 | [W/m2] |
| | Worst Case Average Irradiance @ D | 121.6 | 105.5 | 66.2 | 96.7 | [W/m2] |
| | CORNEAL EXPOSURE HAZARD: Safety Factor ($E_R$) | 0.82 | 0.95 | 1.51 | 1.03 | - |
| Angular Subtense, α | $t_{[illegible]}$ | 1 | 1 | 1 | 1 | mm |
| | $W_{[illegible]}$ | 1 | 1 | 1 | 1 | mm |
| | Angle of acceptance Limit, γ | 0.011 | 0.011 | 0.011 | 0.011 | rad |
| | Luminance Calculation $A_{[illegible]}$ | 3.80 | 3.80 | 3.80 | 3.80 | [illegible] |
| | Source $\alpha_x$ @ D | 0.011 | 0.011 | 0.011 | 0.011 | rad |
| | Source $\alpha_y$ @ D | 0.011 | 0.011 | 0.011 | 0.012 | rad |
| | LIMIT α | 0.011 | 0.011 | 0.011 | 0.012 | rad |
| Single Pulse Worst Case Conditions Luminance for a single pulse (1x nLED) | Correct Cone, $t_s$ | 5 | 5 | 5 | 5 | A |
| | Pulse Duration | 0.5 | 0.5 | 0.5 | 0.5 | ms |
| | Retinal thermal hazard exposure LIMIT (Only for t < 10s) | 3.04E+07 | 3.04E+07 | 3.04E+07 | 3.04E+07 | W/sr/m² |
| | Intensity for a Single Pulse for a single nLED Out of Cover | 8.84 | 8.84 | 8.84 | 6.12 | W/sr |
| | Worst Case Luminance *R(λ) for a single nLED | 7.19E+05 | 7.19E+05 | 7.19E+05 | 5.10E+05 | W/sr/m² |
| | Retinal thermal hazard exposure: Safety Factor ($L_R$) | 42.29 | 42.29 | 42.29 | 59.59 | - |
| Pulse Average Luminance (1x nLED) | Retinal Thermal Hazard LIMIT - Weak Visual Stimulus (t > 10s) | 5.45E+05 | 5.45E+05 | 5.45E+05 | 5.45E+05 | W/sr/m² |
| | Average Intensity for a Single nLED Out of Cover | 1.11 | 1.11 | 1.11 | 0.79 | W/sr |
| | Worst Case Average Luminance *R(λ) for a single nLED | 9.20E+04 | 9.20E+04 | 9.20E+04 | 6.53E+04 | W/sr/m² |
| | Retinal thermal hazard exposure - Weak Visual Stimulus: Safety Factor ($L_{IR}$) | 5.93 | 5.93 | 5.93 | 8.35 | - |

FIG. 57

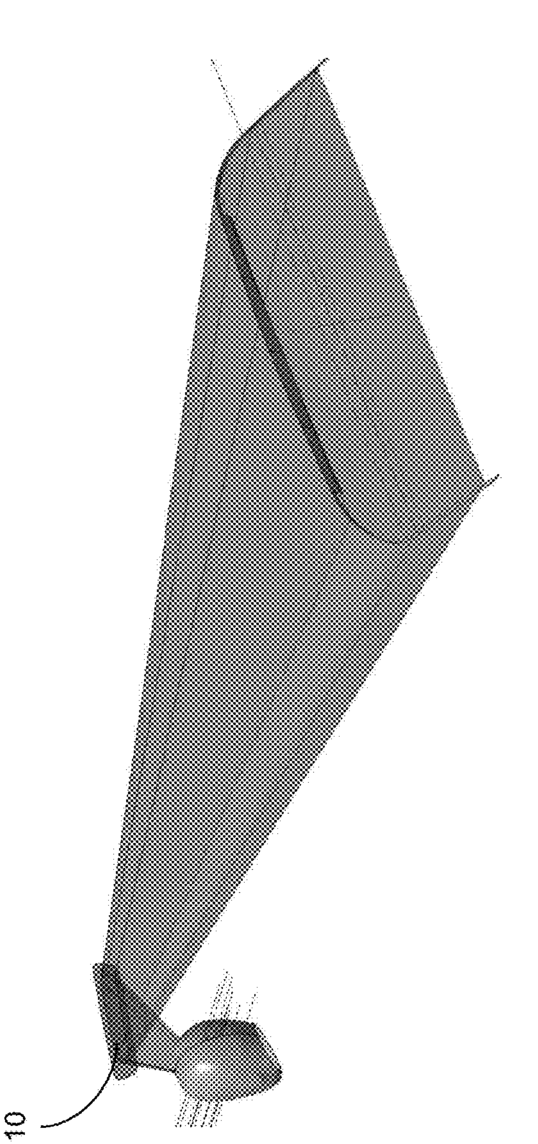
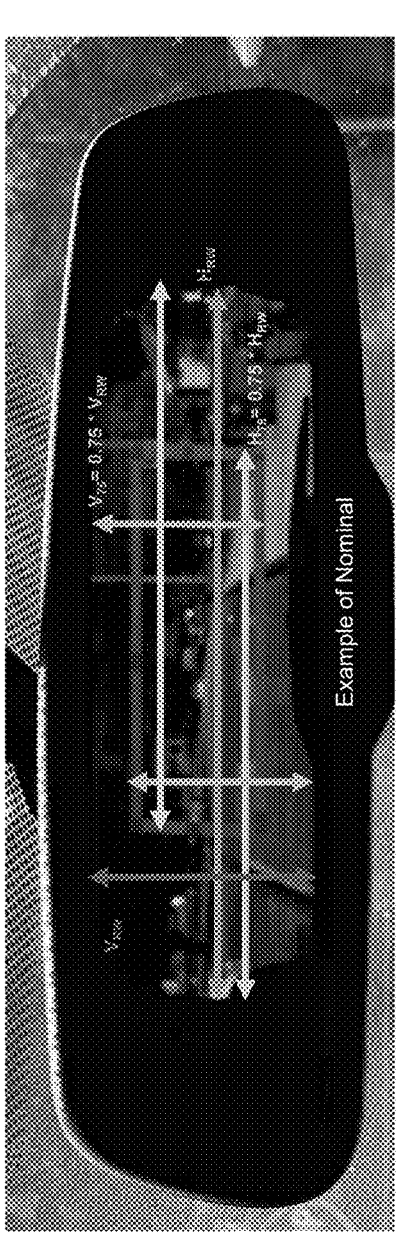
FIG. 89

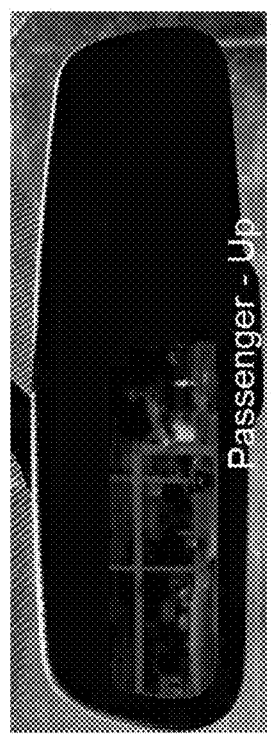
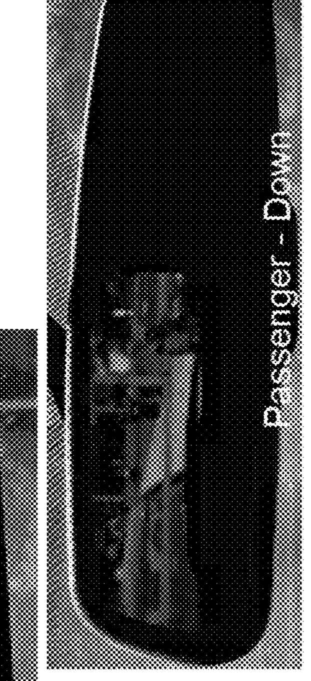
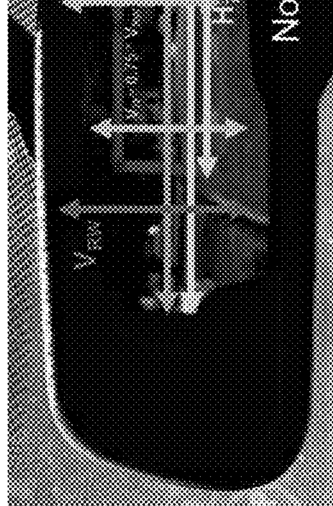
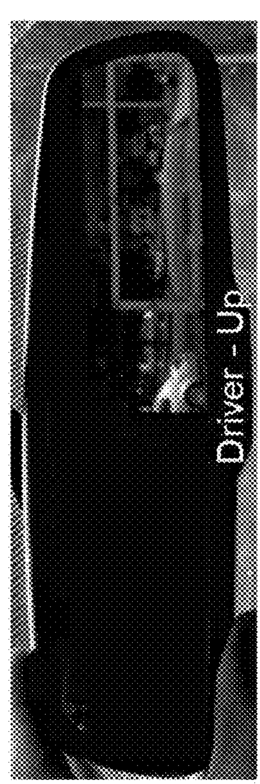
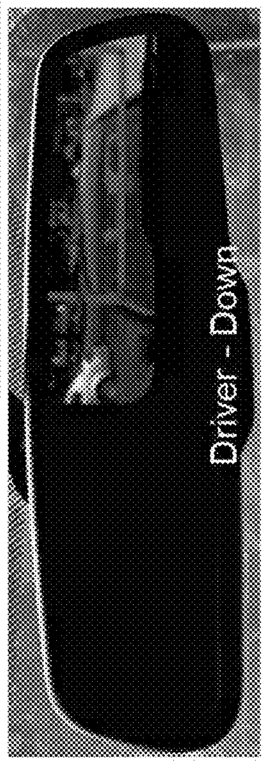
FIG. 90

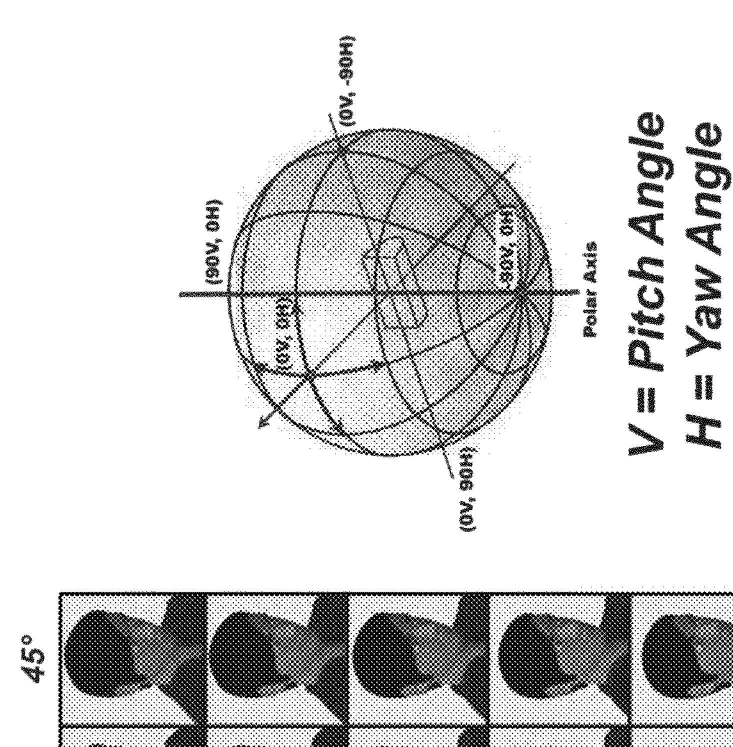
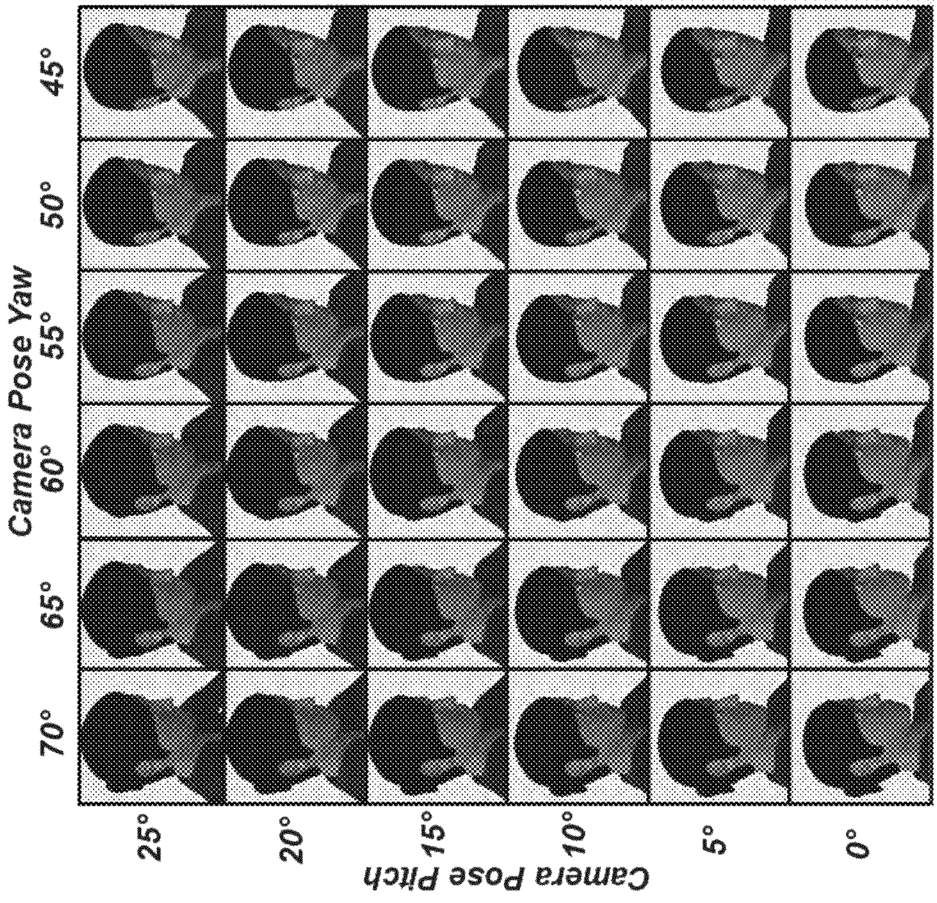
FIG. 91

VEHICULAR INTERIOR REARVIEW MIRROR ASSEMBLY WITH DRIVER MONITORING CAMERA

CROSS REFERENCE TO RELATED APPLICATION

The present application claims the filing benefits of U.S. provisional application Ser. No. 63/679,835, filed Aug. 6, 2024, which is hereby incorporated herein by reference in its entirety.

FIELD OF THE INVENTION

The present invention relates generally to a vehicular driver or occupant or cabin monitoring system for a vehicle and, more particularly, to a vehicular driver or occupant or cabin monitoring system that utilizes one or more cameras at an interior mirror of a vehicle.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the single or double ball pivot configuration. The mirror casing and reflective element are adjustable by a user that is adjusting his or her rearward view. The mirror assembly may accommodate a cabin viewing camera that views within the interior cabin of the vehicle.

SUMMARY OF THE INVENTION

A vehicular driver monitoring system includes a vehicular interior rearview mirror assembly including a mirror head adjustably attached at a mounting structure. The mounting structure is configured to mount the vehicular interior rearview mirror assembly at an interior portion of an interior cabin of a vehicle. The mirror head accommodates a mirror reflective element. A driver monitoring camera is accommodated by the mirror head, and the driver monitoring camera moves together and in tandem with the mirror head when, with the vehicular interior rearview mirror assembly mounted at the interior portion of the interior cabin of the vehicle, the mirror head is adjusted relative to the mounting structure to set a rearward view of a driver of the vehicle. A near infrared light emitter is accommodated by the mirror head, and the near infrared light emitter moves together and in tandem with the mirror head when, with the vehicular interior rearview mirror assembly mounted at the interior portion of the interior cabin of the vehicle, the mirror head is adjusted relative to the mounting structure to set the rearward view of the driver of the vehicle. The mirror head includes a chin portion extending from a lower edge region of the mirror head. The chin portion of the mirror head accommodates a cover panel that extends at least partially along a lower edge region of the mirror reflective element. The driver monitoring camera views through the cover panel, and the near infrared light emitter, when electrically operated to emit near infrared light, emits near infrared light that passes through the cover panel. An outer surface of the cover panel is disposed at an oblique angle relative to an outer surface of the mirror reflective element at the lower edge region of the mirror reflective element. An imager plane of the driver monitoring camera is parallel to the outer surface of the cover panel. The driver monitoring camera is accommodated by the chin portion at a first side region of the chin portion, and the near infrared light emitter is accommodated by the chin portion at a second side region of the chin portion that is opposite the first side region.

These and other objects, advantages, purposes and features of the present invention will become apparent upon review of the following specification in conjunction with the drawings.

BRIEF DESCRIPTION OF THE DRAWINGS

FIGS. 14-16 show example parameters for different positions of the camera and near IR LEDs behind the chin cover within the chin portion of the mirror assembly;

FIGS. 17A-17C show example fields of view for different positions of the camera and near IR LEDs behind the chin cover within the chin portion of the mirror assembly;

FIG. 20 shows example parameters for the mirror assembly;

FIGS. 21 and 22 show example detection data based on image data captured by the camera within the chin portion of the mirror assembly;

FIGS. 25-32 show example detection data based on image data captured by the camera within the chin portion of the mirror assembly;

FIGS. 33-38 show example data of near IR light emitted by the near IR light emitters within the chin portion of the mirror assembly;

FIGS. 39-41 show example energy data of the near IR light emitters disposed within the chin portion of the mirror assembly;

FIGS. 56 and 57 show example energy data of the near IR light emitters disposed within the chin portion of the mirror assembly;

FIGS. 88-92 shows a calibration method for mapping points of interest within the cabin based on the mounting position of the mirror assembly at the interior cabin of the vehicle.

DESCRIPTION OF THE PREFERRED EMBODIMENTS

Figure 1:
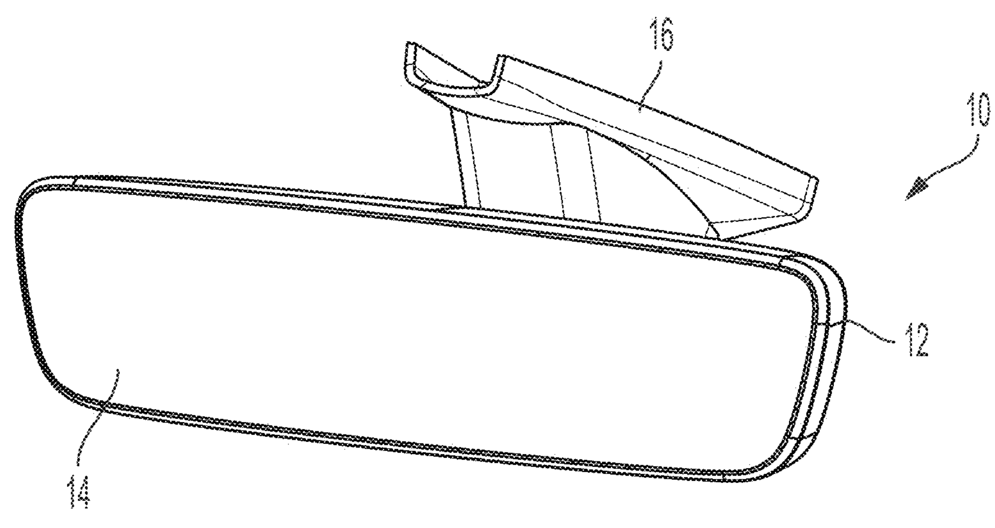
FIG. 1 is a perspective view of a vehicular interior rearview mirror assembly.
Figures 2, 3:
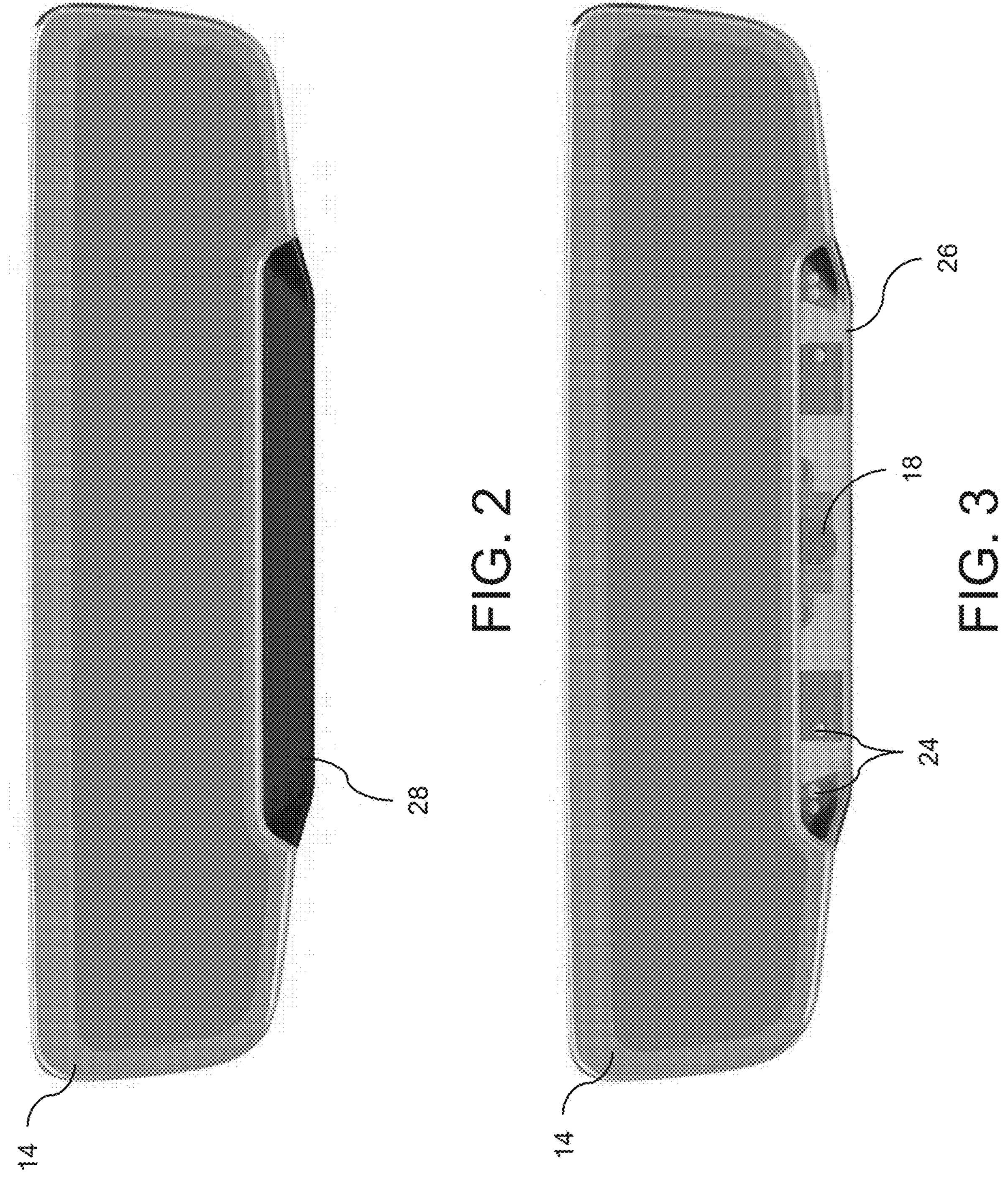
FIG. 2 is a plan view of the mirror assembly.
FIG. 3 is a plan view of the mirror assembly, with a chin cover rendered transparent to show a camera and near IR LEDs disposed behind the chin cover.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly or stay 16. The system includes a camera 18 disposed at and movable with the mirror head (FIGS. 2 and 3). For example, and as discussed further below, the camera 18 may be accommodated within a chin region or chin portion 26 of the mirror head 12 that extends along a lower edge region of the mirror reflective element 14. The camera 18 views through a cover panel or lens 28 that extends along the chin region 26 below the mirror reflective element 14. The system may utilize aspects of driver monitoring systems or occupant monitoring systems described in U.S. Pat. Nos. 11,930,264; 11,827,153; 11,780,372 and/or 11,639,134 and/or International Publication No. WO 2023/220222, which are all hereby incorporated herein by reference in their entireties.

The mirror assembly 10 may comprise an auto-dimming mirror reflective element (e.g., an electrochromic mirror reflective element) or a prismatic mirror reflective element. For a prismatic mirror, when the head or housing is set to a particular orientation by the driver of an equipped vehicle, a toggle operable by the driver moves the housing and reflective element to flip upward/downward, typically by about 4 degrees, to switch between a daytime or non-glare reducing position (where the driver views reflections at the mirror reflector at the second or rear surface of the mirror reflective element) and a nighttime or glare reducing position (where the driver views reflections at the first or front surface of the glass substrate of the mirror reflective element). With the auto-dimming mirror, there is typically no movement once the mirror head is set for the particular driver. The electrochromic mirror reflective element dims responsive to an electric current applied to an electrochromic medium of the mirror reflective element.

The mirror assembly 10 includes or is associated with a DMS and/or an OMS, with the mirror assembly 10 including the driver/occupant monitoring camera 18, such as disposed at a back plate (and viewing through an aperture of the back plate) below the reflective element 14 and viewing through the cover element 28 toward at least a head region of the driver of the vehicle (FIGS. 2 and 3). That is, the driver monitoring camera 18 is accommodated by the mirror head, and with the mounting structure 16 attached at the interior portion of the cabin of the vehicle, the driver monitoring camera views within the cabin of the vehicle toward at least the head region of the driver.

The mirror assembly 10 may include a printed circuit board (PCB) 22 (FIG. 4) (such as disposed at the back plate) having a control or control unit comprising electronic circuitry (e.g., disposed at the circuit board or substrate in the mirror casing), which may include driver circuitry for controlling dimming of the mirror reflective element 14. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of the OMS.

The DMS may include one or more infrared (IR) or near infrared (NIR) light emitter(s) 24, which may be disposed at the back plate and may emit light, when electrically powered to emit light, that passes through another aperture of the back plate 20 and through the cover element 28 to illuminate the head region of the driver of the vehicle. For example, the mirror assembly 10 may include one or more IR or NIR light emitting diodes (LEDs) or vertical-cavity surface-emitting lasers (VCSEL) or the like disposed at the back plate behind the reflective element 14 and, when electrically powered to emit light, emitting near infrared light (or other nonvisible light) through the aperture of the back plate and through the cover element 28 toward the head region of the driver of the vehicle.

The interior rearview mirror 10 thus may include embedded cameras, IR/NIR illuminators and one or more processors for processing captured image data for the driver monitoring application. The inward facing camera 18 and light emitters 24 are fixed within the mirror head, and thus both components may be coupled with the mirror body. In these cases, the camera's field of view is subject to change from driver to driver as the mirror head is adjusted to set the driver's preferred rearward view provided by the mirror reflective element 14.

Because the camera 18 moves with the mirror head, adjustment of the mirror head to set the driver's preferred rearward view changes the position and viewing direction or principal viewing axis of the camera 18 relative to the fixed base portion or mounting structure or stay 16, and thus relative to the vehicle. Put another way, the driver monitoring camera and the mirror reflective element move together and in tandem with the mirror head when the mirror head is adjusted about the mounting structure to provide a rearward view for the driver of the vehicle. Responsive to image processing of image data captured by the DMS camera, DMS algorithms may calculate or determine the driver eye gaze direction relative to the camera 18, and thus relative to the mirror head. Precise eye gaze direction analysis is important to understanding what part of the vehicle cabin the driver is looking at. This information allows the advanced driver or driving assistance systems (ADAS) of the vehicle to generate an alert or intervene appropriately when the user may be distracted and/or when the user is looking off the road (i.e., not looking ahead of where the vehicle is traveling along the road). Further, the OMS may process image data captured by the camera at the mirror head to determine presence of passengers within the vehicle and/or presence of objects within the vehicle, such as within the footwells of the vehicle.

Further, the mounting position of the mirror assembly at the interior portion of the vehicle and the position of the camera and/or light emitters at the mirror head may affect the field of view of the camera when the mirror head is adjusted to set the rearward field of view for the driver. That is, the angle, distance and/or orientation of the mirror head and camera relative to the driver and occupant(s) changes based on the mounting position of the mirror assembly and the position of the driver and occupants relative to the mirror assembly. This results in the points of interest (e.g., the driver's head region or hand positions) appearing within different portions of the captured image data.

Figure 4:
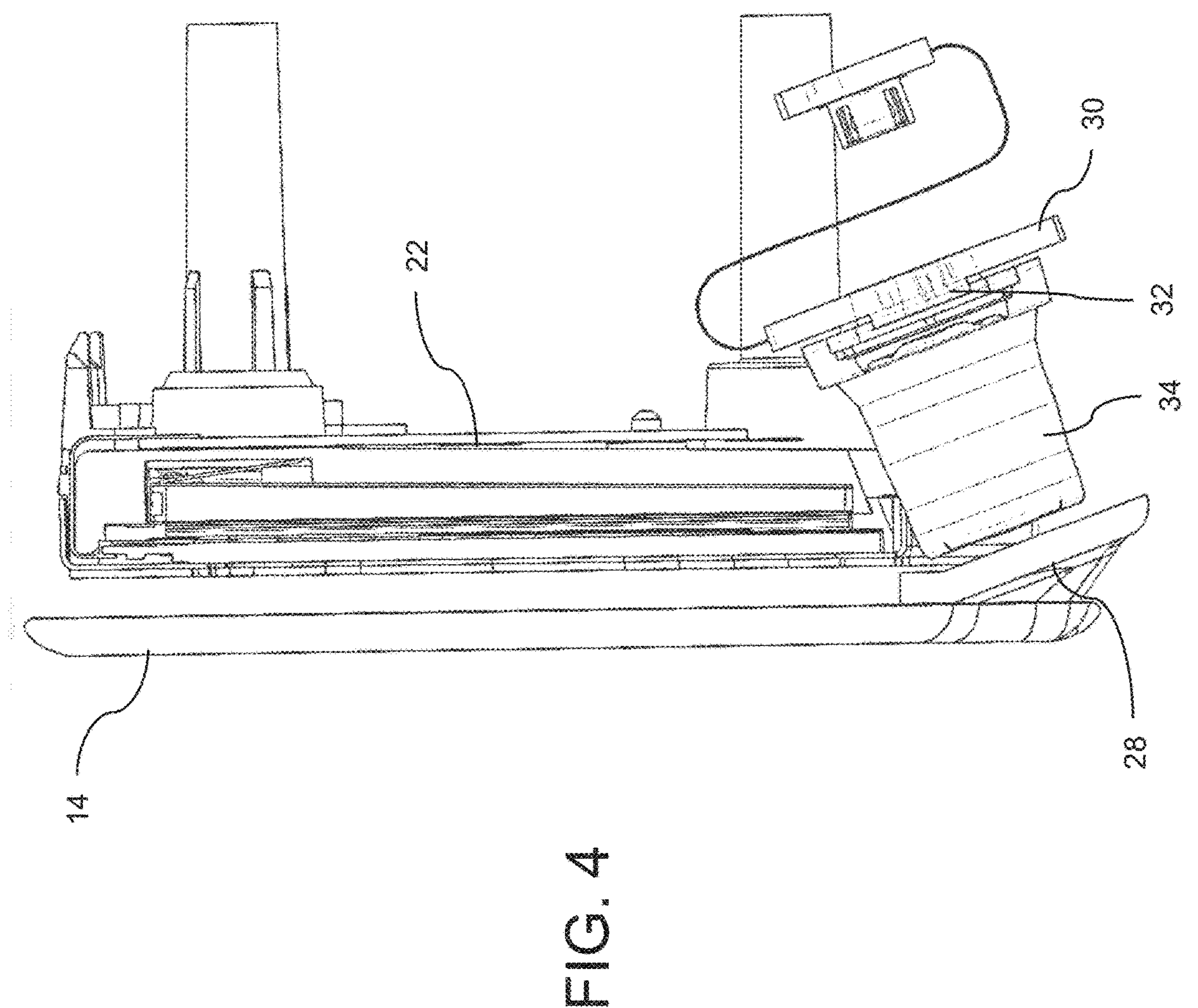
FIG. 4 is a sectional view of the mirror assembly.

Referring to FIGS. 2-4, the chin region 26 extends below and/or along a lower edge region of the mirror reflective element 14 and at least partially accommodates the camera 18 and/or near IR light emitters 24. The cover or panel or lens element 28 may be disposed at the chin region 26 and extends along the lower edge region of the mirror reflective element 14 so that the camera 18 views through the cover 28 and the near IR light emitters 24 emit light that passes through the cover 28. Optionally, a lower portion of the mirror reflective element 14 extends along the chin region 26. As discussed further below, placement of the camera 18 and/or near IR light emitters 24 at the chin region 26 may allow the DMS and/or OMS to have greater visibility of the cabin of the vehicle and/or capture higher quality image data for the DMS/OMS function. That is, the camera 18 at the chin region 26 may have a wider angle or larger field of view than if the camera 18 were, for example, placed directly behind the mirror reflective element to view through the mirror reflective element. The mirror assembly and chin region may utilize characteristics of the mirror assemblies described in U.S. Pat. No. 11,639,134 and/or International Publication No. WO 2023/220222 and/or International Patent Application No. PCT/US25/038021, filed Jul. 17, 2025 and published on Jan. 22, 2026 as International Publication No. WO 2026/019985, which are hereby incorporated herein by reference in their entireties.

In the illustrated example of FIG. 4, the camera 18 views through the cover 28 at the chin region 26 and is angled downward relative to the mirror reflective element 14, such as at an angle of about 5 degrees, an angle of about 10 degrees, an angle of about 20 degrees and the like. That is, a plane of an imager PCB 30, which accommodates the imager 32, of the camera 18 may be parallel to a plane of the cover 28, and the planes of the cover 28 and the imager PCB 30 may be disposed at an angle (e.g., about 20 degrees) relative to a plane of the mirror reflective element 14. The imager 32 may view through a lens barrel or lens element 34 of the camera 18 disposed between the imager PCB 30 and the cover 28, and the lens barrel 34 may be generally normal or perpendicular to the cover 28 and the imager plane. A primary viewing axis of the camera 18 may be generally parallel to a longitudinal axis of the lens barrel 34. Thus, with the lens/camera tilted downward, the body of the camera module (i.e., the widest portions of the camera like the imager PCB) sits at least partially behind the mirror reflective element and/or a backlight assembly of a video display screen. This may result in a smaller cutout or recess at the lower edge of the mirror reflective element by minimizing the cutout based on the camera barrel instead of the total camera size. As discussed further below, other suitable camera angles, orientations of the camera, configurations of the camera and/or placements of the camera within the mirror head may be implemented. Thus, the mirror assembly and camera may achieve a greatest possible camera field of view suitable for use in a variety of different vehicle applications without physical changes needed to the camera assembly, where the camera is able to view a wider range of occupants and a greater proportion of the vehicle interior. Further, the mirror assembly and camera may achieve a smallest possible packaging with desirable aesthetics, less intrusion on the driver's forward field of view, and reducing mirror weight.

Figure 5:
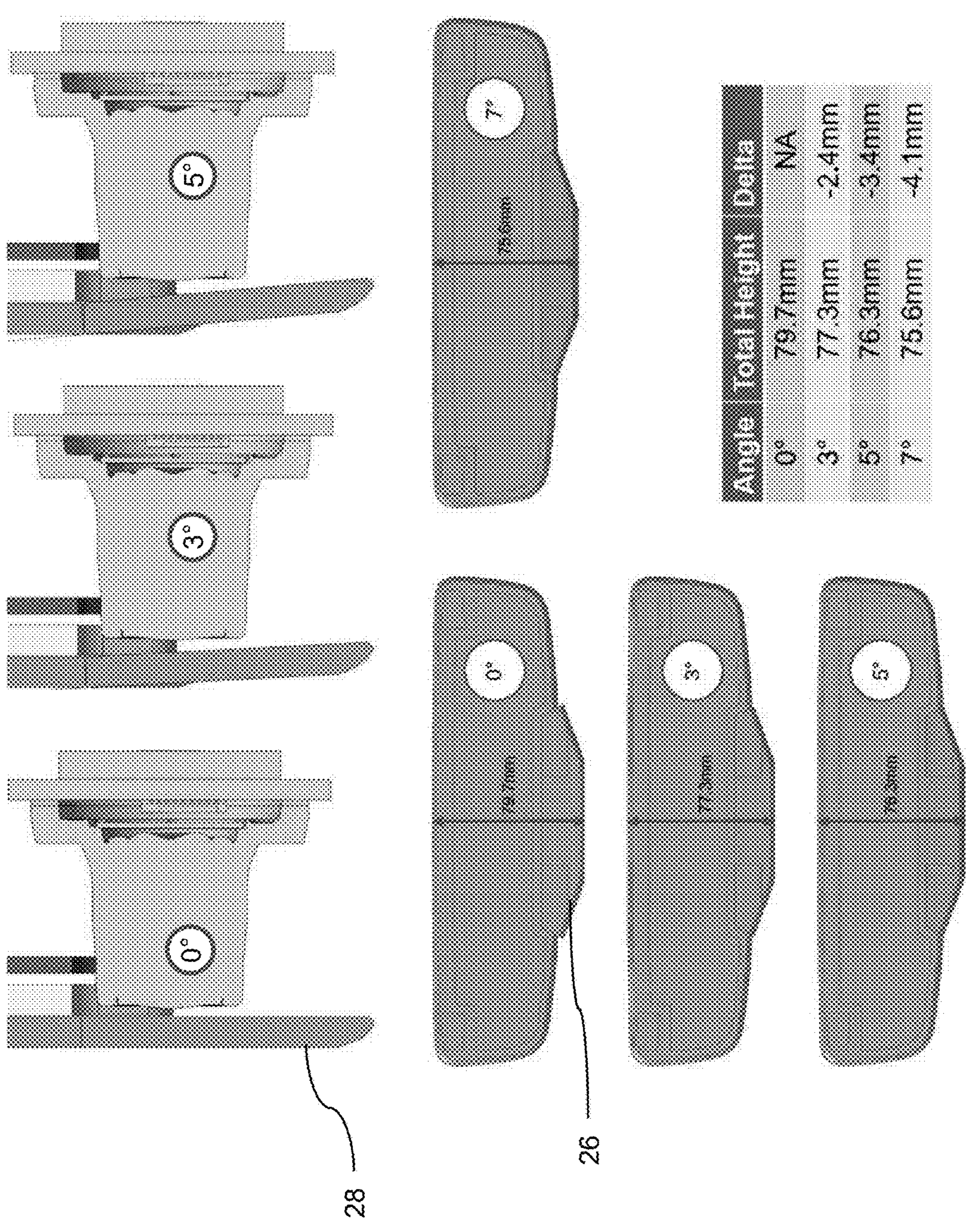
FIG. 5 shows the chin cover angled relative to the camera and the mirror reflective element of the mirror assembly.

In some examples, and as shown in FIG. 5, to reduce the height of the chin region (e.g., measured in a direction generally parallel to the plane of the mirror reflective element), the cover 28 may be tilted or angled relative to the mirror reflective element and the camera is normal relative to the mirror reflective element (i.e., a plane of the imager of the camera is parallel to the mirror reflective element). A greater angle of the cover relative to the mirror reflective element and camera may lead to a smaller chin, but may negatively affect the upper field of view.

Figures 6A, 6B, 6C:
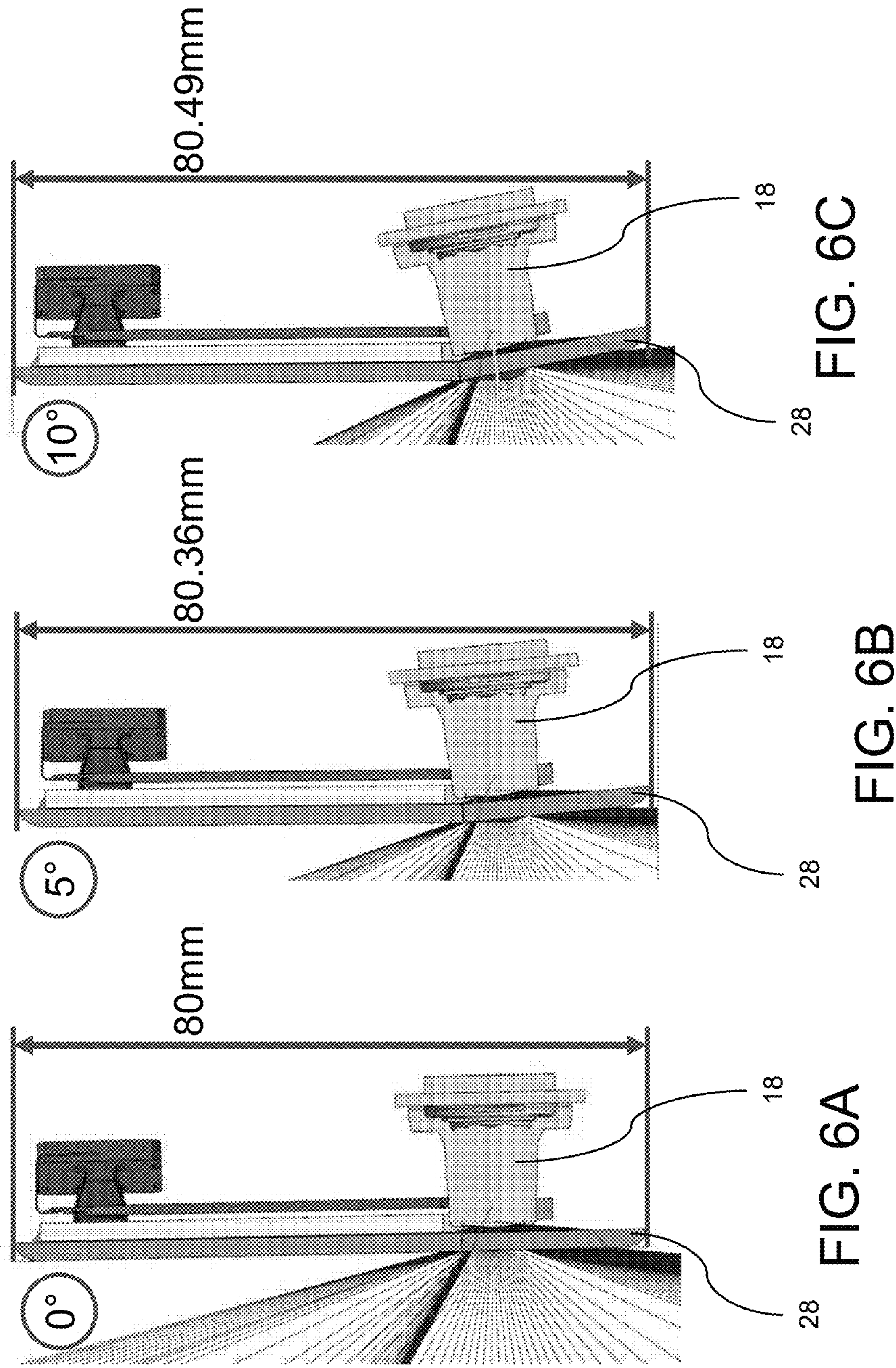
FIGS. 6A-6C show the chin cover and the camera angled relative to the mirror reflective element of the mirror assembly.

As shown in FIGS. 6A-6C, to further reduce the height of the chin region, the cover may be tilted or angled relative to the mirror reflective element and the camera 18 is normal to the cover 28, with the existing imager shift maintained. That is, the imager of the camera 18 may not be shifted relative to the lens barrel. Thus, the principal viewing axis of the camera 18 may be concentric with the lens barrel. With the camera located at or near or relative to an upper portion of the chin region, and the barrel of the lens normal to the cover 28, the vertical height of the mirror grows due to the minimum gap required to the TFT backlight. Tilting the camera according to an angle of the cover lens also means that the field of view of the camera rotates down. For example, with a ten degree downward tilt, there may be a loss of ten degrees at the top of the field of view. In other words, with the camera 18 tilted according to an angle of the cover 28 relative to the mirror reflective element, an overall height of the mirror head may increase to accommodate clearance between the camera 18 and other components within the mirror head, such as a backlight for the video display screen.

Figures 7A, 7B, 7C:
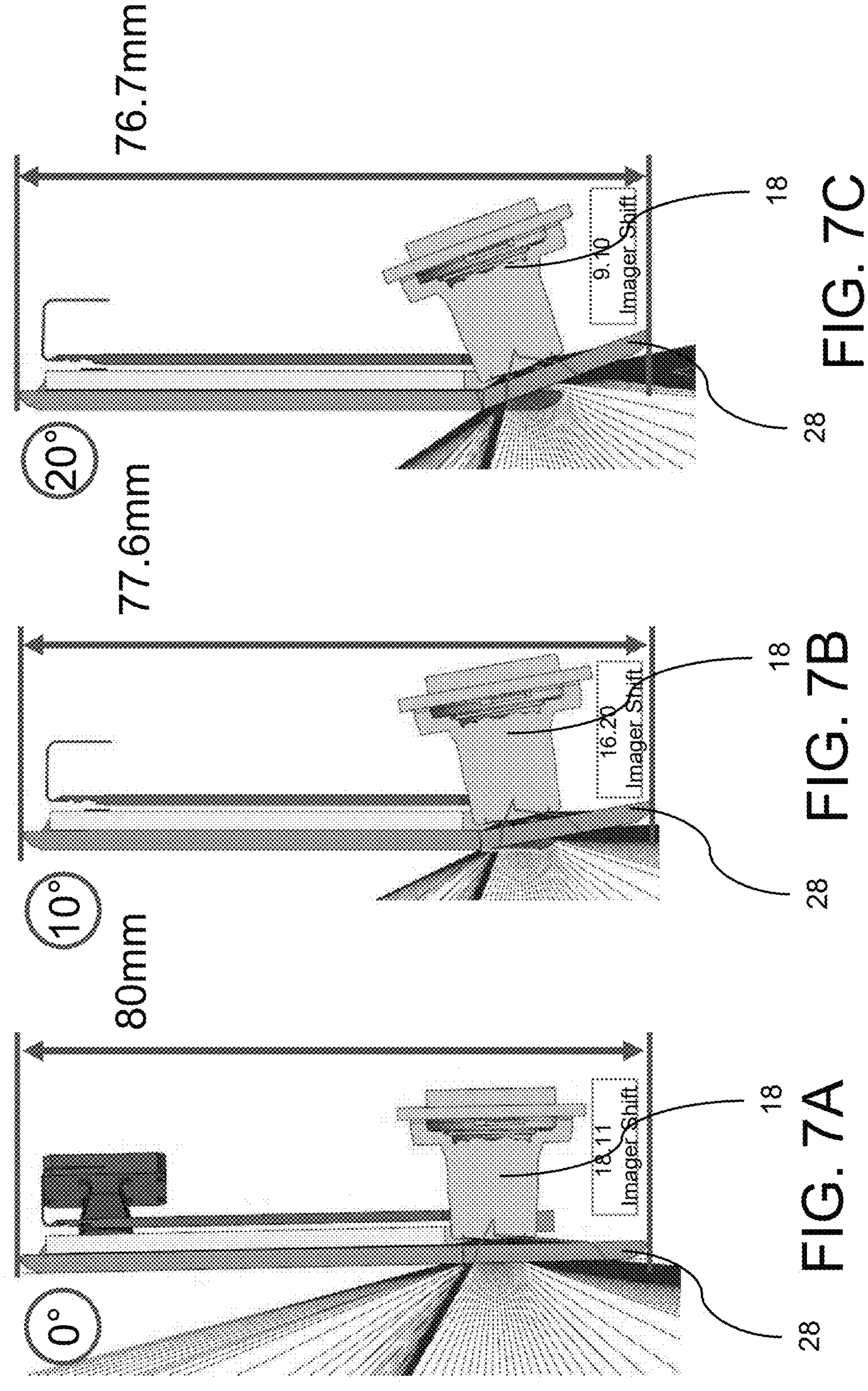
FIGS. 7A-7C show the chin cover and the camera angled relative to the mirror reflective element of the mirror assembly, with the imager of the camera shifted relative to the lens barrel.

Referring to FIGS. 7A-7C, to even further reduce the height of the chin region, the cover may be tilted relative to the mirror reflective element, with the camera normal to the cover, and the imager shifted. That is, the imager in the camera is shifted relative to the lens barrel so that a principal viewing axis of the imager may be offset or shifted relative to a longitudinal axis of the lens barrel. This changes the shape of the camera field of view. As the angle of the camera and cover changes, the camera imager shifts relative to the lens barrel to provide the required field of view for the system to operate properly for the full range of occupant eye points. Shifting the imager allows the bottom of the field of view to come up and decreases the vertical height of the mirror.

Figures 8A, 8B, 8C:
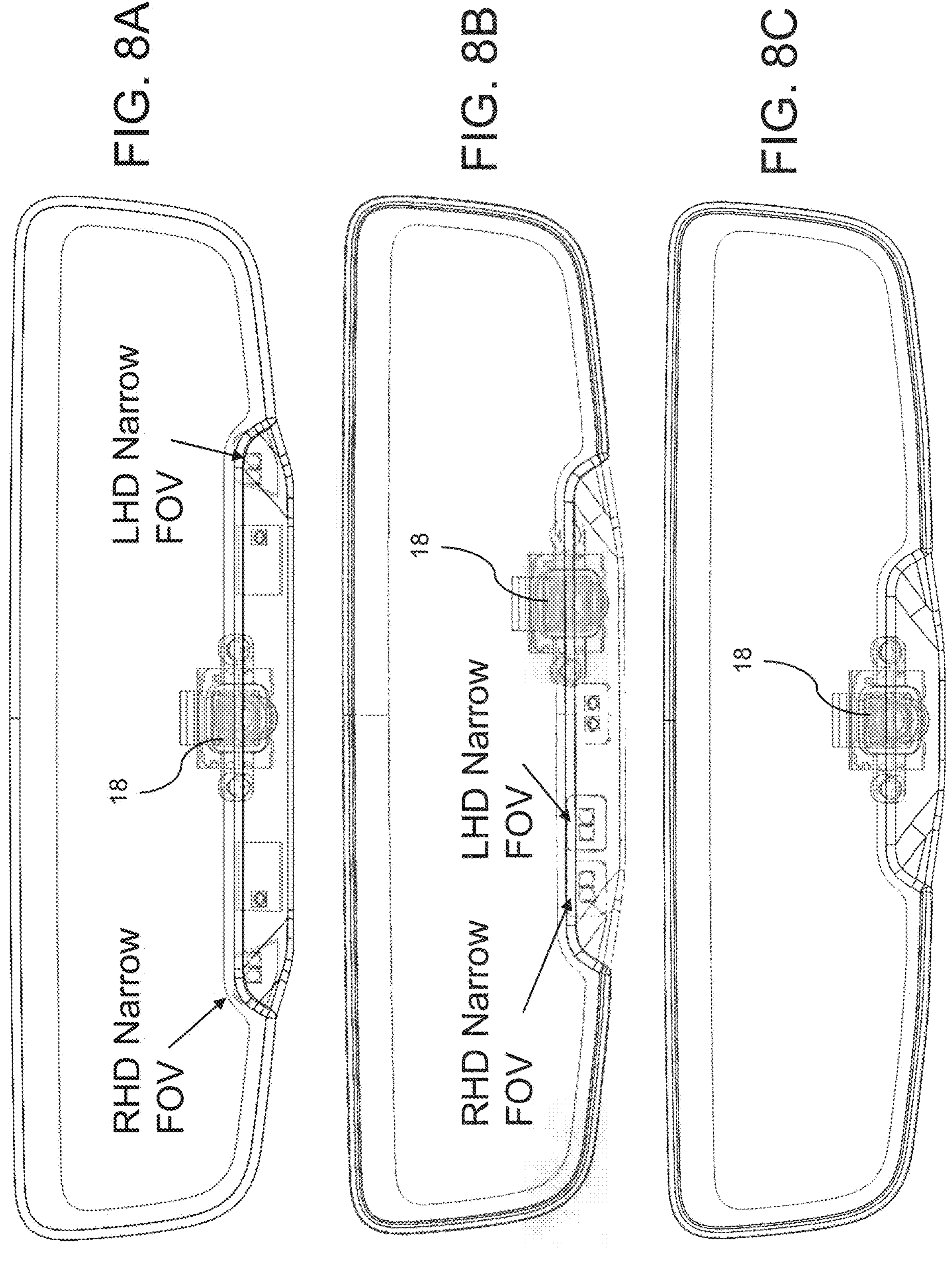
FIGS. 8A-8C show example positions of the camera and near IR LEDs behind the chin cover within a chin portion of the mirror assembly.

As shown in FIGS. 8A-8C, the position of the camera 18 along the lower edge region of the mirror head may determine the field of view of the camera and the size of the chin region 26. That is, a lateral position of the camera 18 relative to a midpoint or centerline of the mirror head adjusts the portions of the interior cabin of the vehicle that are viewable by the camera 18. With the camera 18 located off-center, the chin can be packaged smaller (e.g., extend laterally along the lower edge of the mirror reflective element to a lesser degree). That is, moving the camera 18 from a center portion of the chin region to a side portion (e.g., a driver's side portion or a passenger's side portion) of the chin region may allow for a narrower chin region. For example, for a DMS that uses a dark pupil algorithm (e.g., the DMS detects the gaze direction of the driver based on viewing dark pupils within the image data), narrow field of view IR LEDs must be located at least a threshold distance from the camera barrel. Because the mirror assembly may include a pair of LEDs for left-hand drive (LHD) vehicles and a pair of LEDs for right-hand drive (RHD) vehicles, both pairs of LEDs are positioned away from the camera by at least the threshold distance. When the camera 18 is at the central portion of the chin region, one pair of LEDs are disposed at one side portion of the chin region and the other set of LEDs are disposed at the other side portion of the chin region. Putting both pairs of LEDs on the same side of the mirror, with the camera on the opposite side, yields the smaller package.

Figure 9:
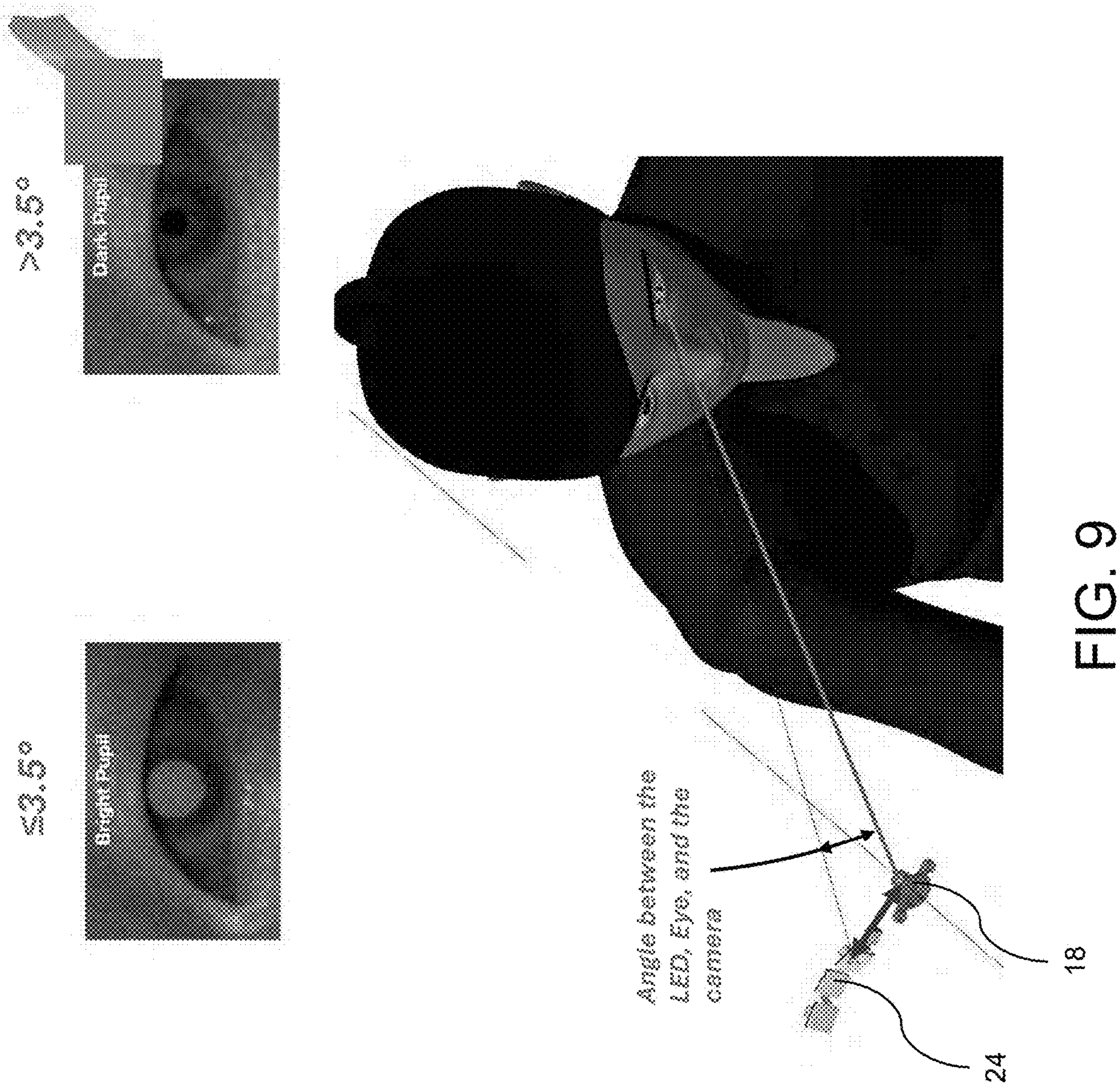
FIG. 9 shows an angle of the camera relative to an eye of a driver of the vehicle.

Referring to FIG. 9, the DMS algorithm may use a dark pupil lighting effect, which means that the angle between the DMS LEDs 24, the eye of the driver and the camera 18 should be greater than about 3.5 degrees to view a dark pupil. Optionally, the DMS algorithm may use a bright pupil lighting effect, where the angle should be less than about 3.5 degrees to view a bright pupil lighting effect. In other words, the LEDs may be disposed closer to the camera 18 when a bright pupil lighting effect is used by the DMS algorithm. Implementing a bright pupil algorithm may decrease the width of the chin region, such as by decreasing the required distance between the LEDs and the camera.

Figures 10A, 10B:
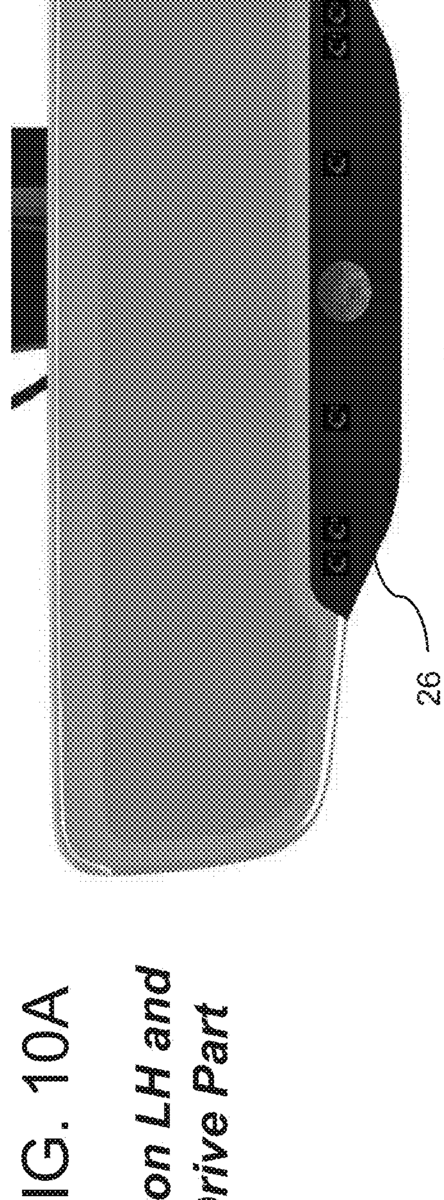
FIGS. 10A, 10B, 11A and 11B show example positions of the camera and near IR LEDs behind the chin cover within the chin portion of the mirror assembly.

Further, and as shown in FIGS. 10A and 10B, positioning the camera 18 offset within the chin region 26 may result in a narrower chin region. A smaller width of the chin region 26 may also be achieved if the camera is offset to one side of a mirror assembly that is compatible for use in a one-handed mirror assembly (e.g., a mirror assembly compatible for use in a LHD vehicle but not a RHD vehicle). In other words, a mirror assembly compatible for use in both a LHD vehicle and a RHD vehicle may include the camera 18 at a central portion of the chin region 26 and thus include LEDs at both sides of the chin region and at least the threshold distance from the camera. To reduce the width of the chin region, the camera 18 may be positioned offset from the center of the mirror assembly, such as along a side of the mirror assembly closest to the driver region of the cabin of the vehicle, with the LEDs disposed at the opposite side of the chin region.

Figures 11A, 11B:
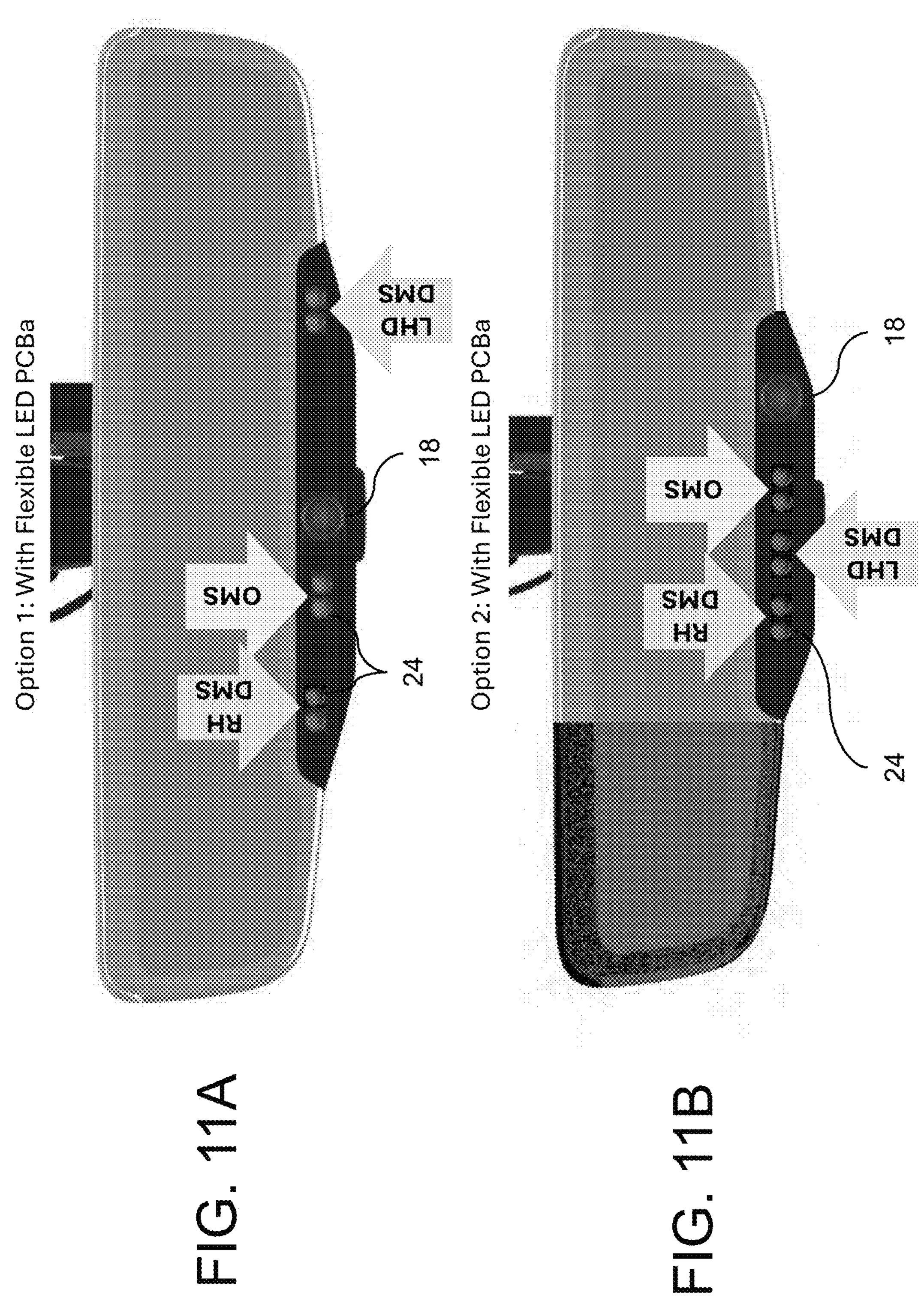

For example, and as shown in FIGS. 11A and 11B, a mirror assembly may include the camera 18 at a central portion of the chin region 26, with near IR LEDs 24 for illuminating the cabin during DMS monitoring in a LHD vehicle disposed at a side of the chin region furthest from the driver region (e.g., a passenger side of the chin region in a LHD vehicle), and with near IR LEDs 24 for illuminating the cabin during DMS monitoring in a RHD vehicle disposed at the other side of the chin region (e.g., a passenger side of the chin region in a RHD vehicle). Near IR LEDs 24 for illuminating the cabin during OMS monitoring may be disposed at or near the camera 18 at the central portion of the chin region. This design may be universally applicable for LHD vehicles and RHD vehicles, with the camera centered. Positioning the LEDs at opposite sides from the driver allows the chin region to be narrowed at least slightly. This design may require large or multiple LED PCBs to accommodate the LEDs at opposing sides of the camera 18.

Optionally, the camera 18 may be positioned along one side of the chin region (e.g., a passenger side of the chin region in a LHD vehicle), with the near IR LEDs disposed between the camera 18 and the other side of the chin region (e.g., a driver side of the chin region in a LHD vehicle). The mirror may include near IR LEDs for illuminating the cabin during DMS monitoring for both LHD vehicles and RHD vehicles, and the mirror may include near IR LEDs for illuminating the cabin during OMS monitoring. Thus, this design may be universally applicable for LHD vehicles and RHD vehicles, with an offset camera providing similar performance to a centered camera. Grouping the LEDs together allows for a smaller LED PCB and a thinner or narrower chin region.

Figure 12:
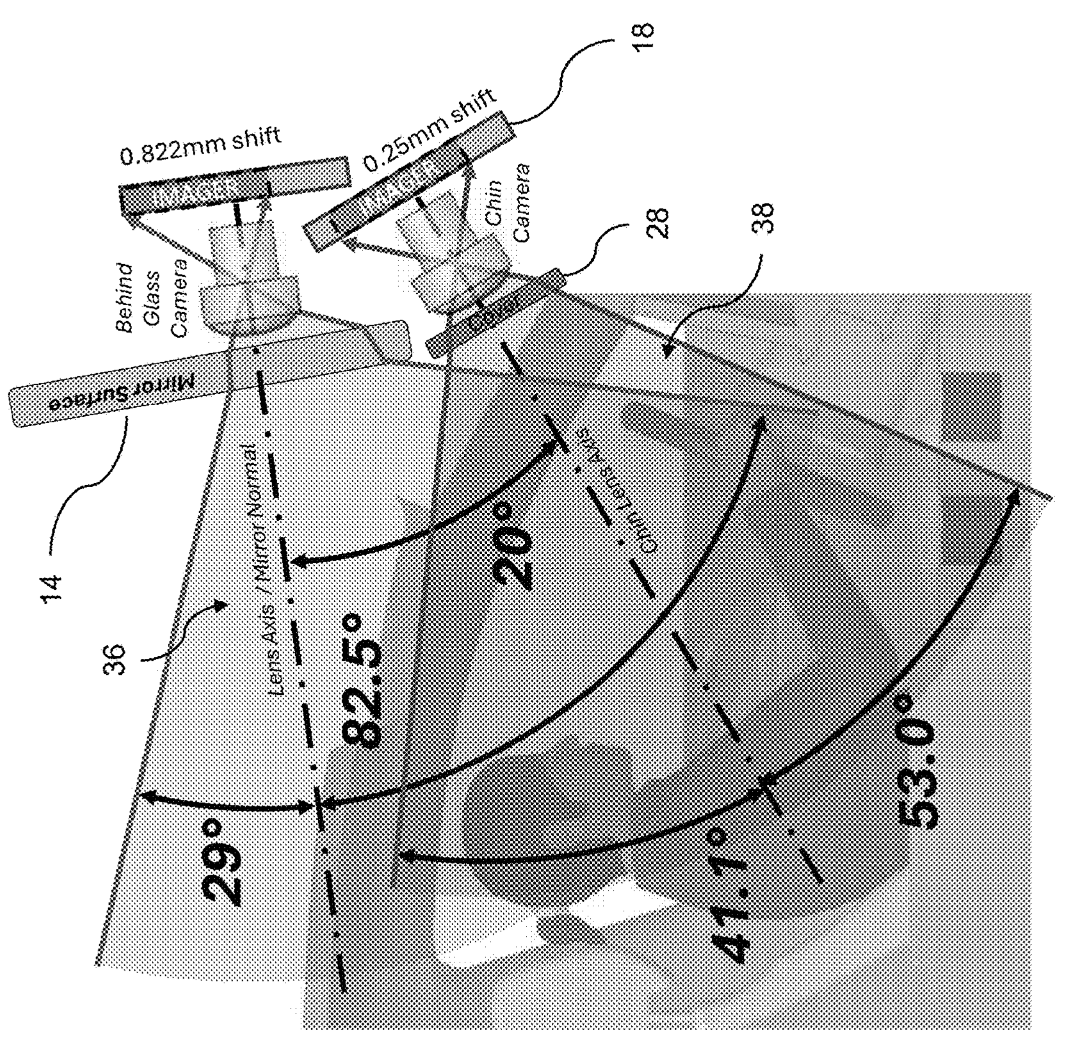
FIGS. 12 and 13 show example fields of view for a camera disposed behind the mirror reflective element and the camera disposed within the chin portion of the mirror assembly.
Figure 13:
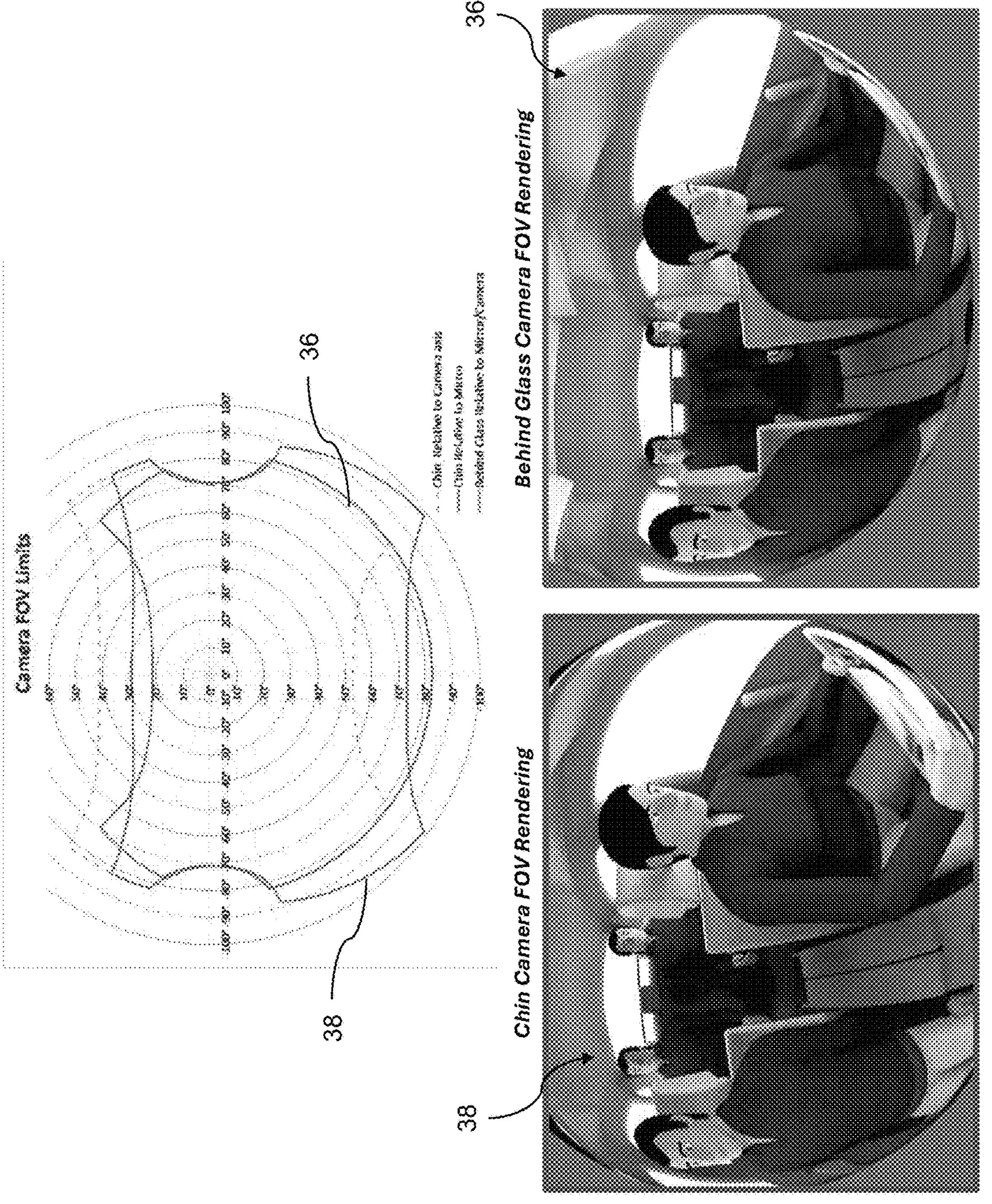

FIGS. 12 and 13 compare a field of view 36 of a DMS camera disposed behind the mirror reflective element 14 and that views through the mirror reflective element 14 with a 0.822 millimeter imager shift and a field of view 38 of the DMS camera 18 disposed at the chin region 26 along the lower edge region of the mirror reflective element 14 and that views through the chin cover 28 with a 0.25 millimeter imager shift. The DMS camera 18 viewing through the chin cover 28 may be disposed at an angle of about 20 degrees relative to the mirror reflective element 14. As shown, with the mirror assembly adjusted to provide the rearward view to the driver of the vehicle, the field of view 36 of the DMS camera disposed behind the mirror reflective element 14 views higher within the cabin of the vehicle and does not view the lap regions or hand positions of the driver or front passenger. The field of view 36 has a total viewing range of about 115.5 degrees, with about 29 degrees of the field of view 36 being above the head region of the driver, and about 82.5 degrees of the field of view 36 including the driver. The field of view 38 has a total viewing range of about 94.1 degrees, with about 41.1 degrees of the field of view 38 including the head region of the driver and about 53 degrees of the field of view 38 including the lap region and hand positions of the driver and/or front passenger. Thus, a greater portion of the field of view 38 may be used for driver monitoring as compared to the field of view 36.

Figure 14:
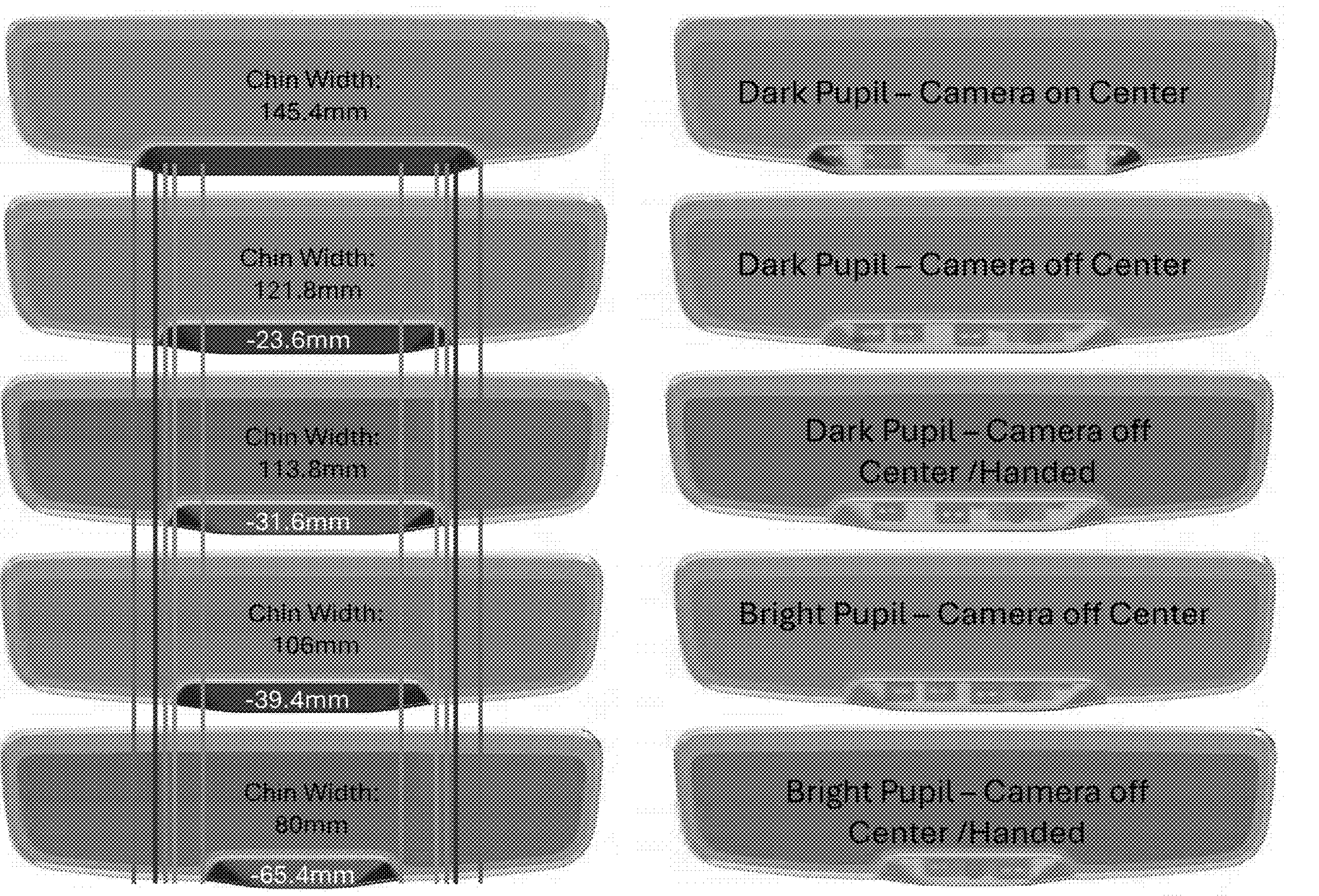

FIG. 14 shows example mirror assemblies having different arrangements of the camera 18 and LEDs 24 within the chin region 26, and example dimensions of the chin regions 26 of the mirror assemblies. For example, a mirror assembly having a camera 18 that captures image data for a DMS operating on a dark pupil algorithm with the camera 18 in a center portion of the chin region and near IR LEDs 24 disposed at both sides of the chin region 26 may have a chin width of about 145.4 millimeters. A mirror assembly having a camera 18 that captures image data for a DMS operating on a dark pupil algorithm with the camera 18 in an off-center portion of the chin region (e.g., at a passenger side portion of the chin region) and DMS/OMS near IR LEDs 24 for both LHD vehicle applications and RHD vehicle applications disposed at the opposite side of the chin region 26 (e.g., at a driver side portion of the chin region) may have a chin width of about 121.8 millimeters. The near IR LEDs for both LHD vehicle applications and RHD vehicle applications may be disposed on the same LED PCB and/or a shared PCB with the camera 18. Another mirror assembly having a camera 18 that captures image data for a DMS operating on a dark pupil algorithm with the camera 18 in an off-center portion of the chin region (e.g., at a passenger side portion of the chin region) and DMS/OMS near IR LEDs 24 for one type of vehicle application (i.e., one of a LHD vehicle application and a RHD vehicle application) disposed at the opposite side of the chin region 26 (e.g., at a driver side portion of the chin region) may have a chin width of about 113.8 millimeters. The near IR LEDs may be disposed on the same PCB as the camera 18. A mirror assembly having a camera 18 that captures image data for a DMS operating on a bright pupil algorithm with the camera 18 in an off-center portion of the chin region (e.g., at a passenger side portion of the chin region) and DMS/OMS near IR LEDs 24 for both LHD vehicle applications and RHD vehicle applications disposed at the opposite side of the chin region 26 (e.g., at a driver side portion of the chin region) may have a chin width of about 106 millimeters. The near IR LEDs for both LHD vehicle applications and RHD vehicle applications may be disposed on the same LED PCB and/or a shared PCB with the camera 18. Another mirror assembly having a camera 18 that captures image data for a DMS operating on a bright pupil algorithm with the camera 18 in a center portion of the chin and DMS/OMS near IR LEDs 24 for one type of vehicle application (i.e., one of a LHD vehicle application and a RHD vehicle application) disposed at opposing sides of the camera 18 may have a chin width of about 80 millimeters. The near IR LEDs may be disposed on the same PCB as the camera 18. Thus, the mirror assembly provides a chin region for accommodating the driver monitoring camera and the plurality of light emitters for illuminating the driver's head region and the passenger seat region. The width of the chin region is preferably less than 130 millimeters, such as less than 120 millimeters, such as less than 110 millimeters or less than 100 millimeters, such as, for example about 80 millimeters. The height of the chin region is preferably less than 20 millimeters, such as less than 15 millimeters, such as less than 10 millimeters, such as, for example, about 6 millimeters.

Figures 15A, 15B, 15C:
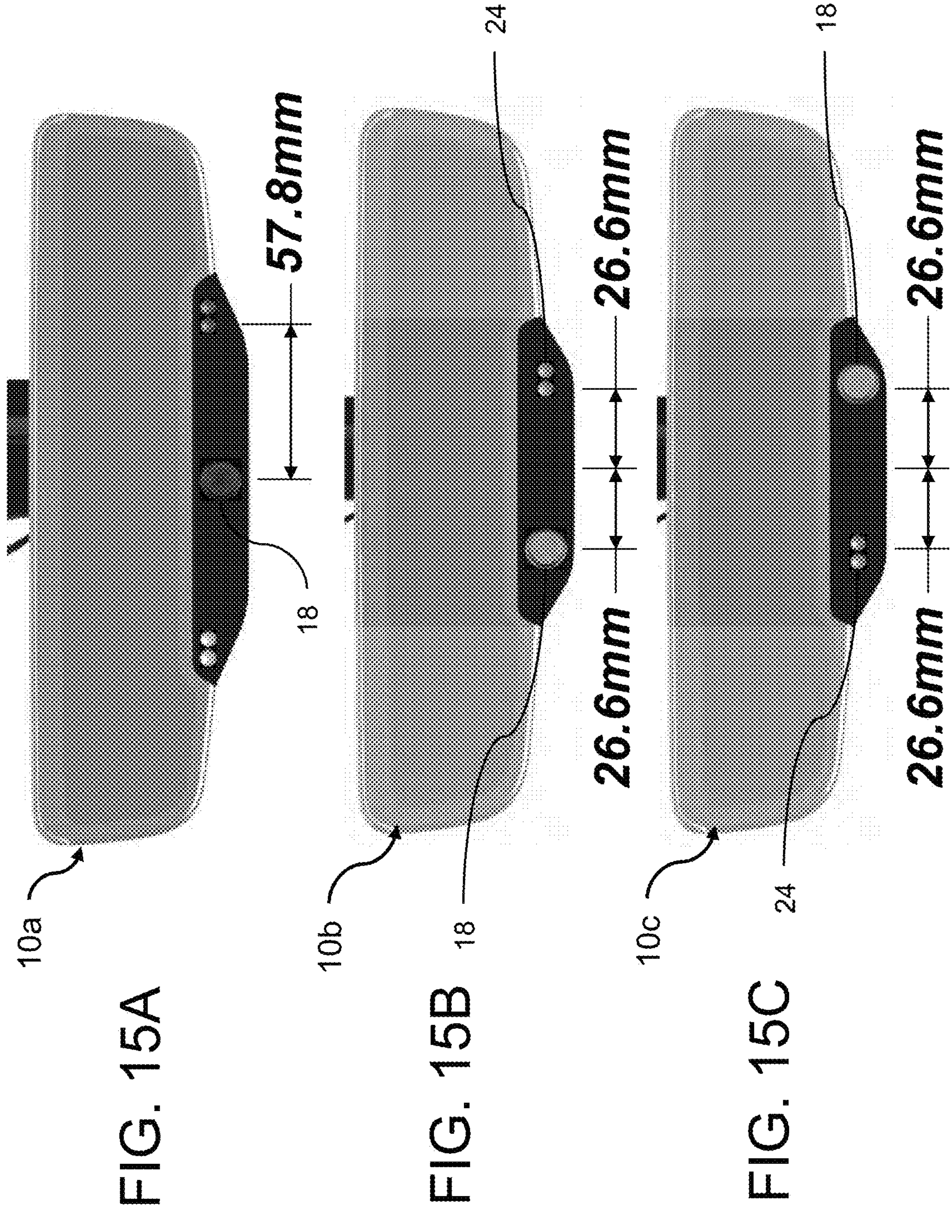
Figure 17B:
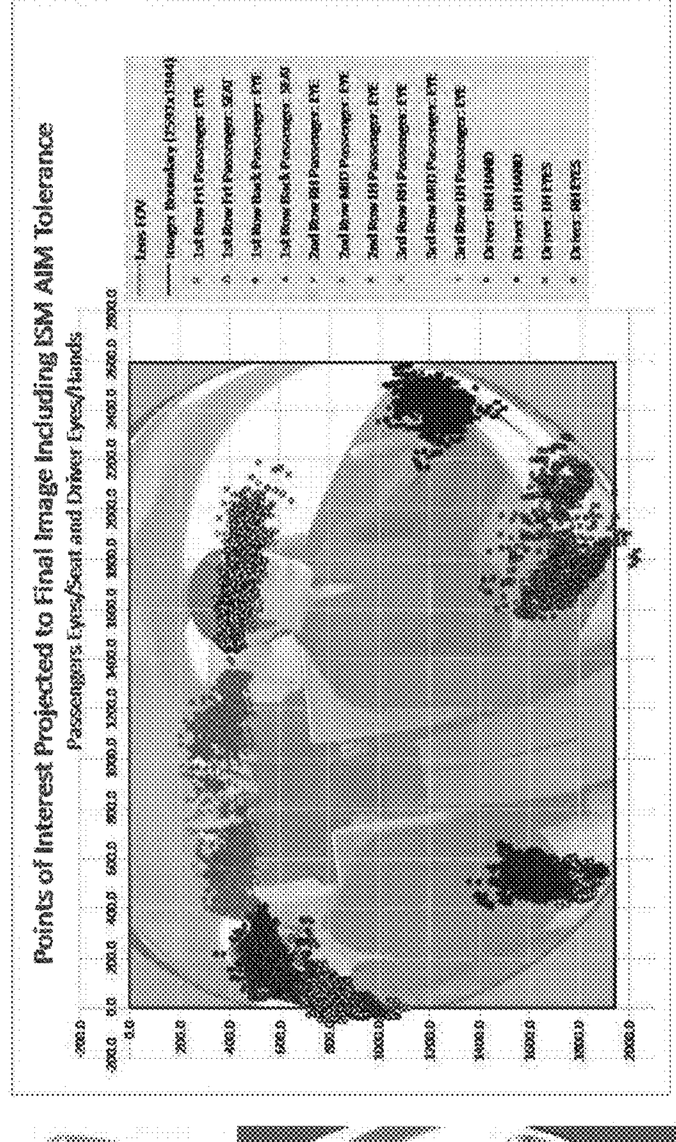

FIG. 16 shows example measurements for the mirror assemblies and camera positions depicted in FIGS. 15A-15C. As shown, a mirror assembly (designated 10*a*) having the camera at a central portion of the chin region and having near IR LEDs disposed at both side portions of the chin region (FIG. 15A) is compared to a mirror assembly (designated 10*b*) having the camera at a driver's side portion of the chin region and near IR LEDs at a passenger's side portion of the chin region (for a LHD vehicle) (FIG. 15B) and a mirror assembly (designated 10*c*) having the camera at a passenger's side portion of the chin region and near IR LEDs at a driver's side portion of the chin region (for a LHD vehicle) (FIG. 15C). FIG. 17A depicts an example field of view for the camera of the mirror assembly 10*a* and example positions in the image data captured by the camera of the mirror assembly 10*a* at which the driver and occupants are detected. FIG. 17B depicts an example field of view for the camera of the mirror assembly 10*b* and example positions in the image data captured by the camera of the mirror assembly 10*b* at which the driver and occupants are detected. FIG. 17C depicts an example field of view for the camera of the mirror assembly 10*c* and example positions in the image data captured by the camera of the mirror assembly 10*c* at which the driver and occupants are detected. The field of view of the camera 18 is comparable or improved when the camera 18 is moved from the center portion of the chin region to the respective side portions of the chin region, while the size of the chin region is reduced. That is, the field of view of the camera at each of the mirror assemblies 10*a*, 10*b*, 10*c* includes driver hand positions, a driver lap region, a driver head region, a passenger lap region, a passenger head region, and rear seat passenger positions, while achieving a smaller package size of the chin region 26 for the mirror assemblies 10*b*, 10*c* having the camera 18 off-center.

Thus, the mirror assembly having the camera 18 disposed within the chin region 26 and angled relative to the mirror reflective element 14 (and optionally having the imager shifted relative to the lens barrel) may be implemented in a variety of vehicle applications (e.g., having different mounting configurations and/or mounting positions within the vehicles) without significant mechanical changes to the mirror assembly. In some examples, the mirror foot/stay or mounting structure may be adjusted based on the vehicle application. That is, the part that mounts the mirror to the windshield may need to be adjusted based on the vehicle. Further, the DMS/OMS for each vehicle application may include a different or new scene file that defines a reference environment that the DMS/OMS algorithm picks up on to determine where the driver may be located in the interior cabin of the vehicle. For example, the DMS and/or OMS may utilize characteristics of the systems described in U.S. Pat. No. 11,465,561, which is hereby incorporated herein by reference in its entirety.

Figures 18A, 18B:
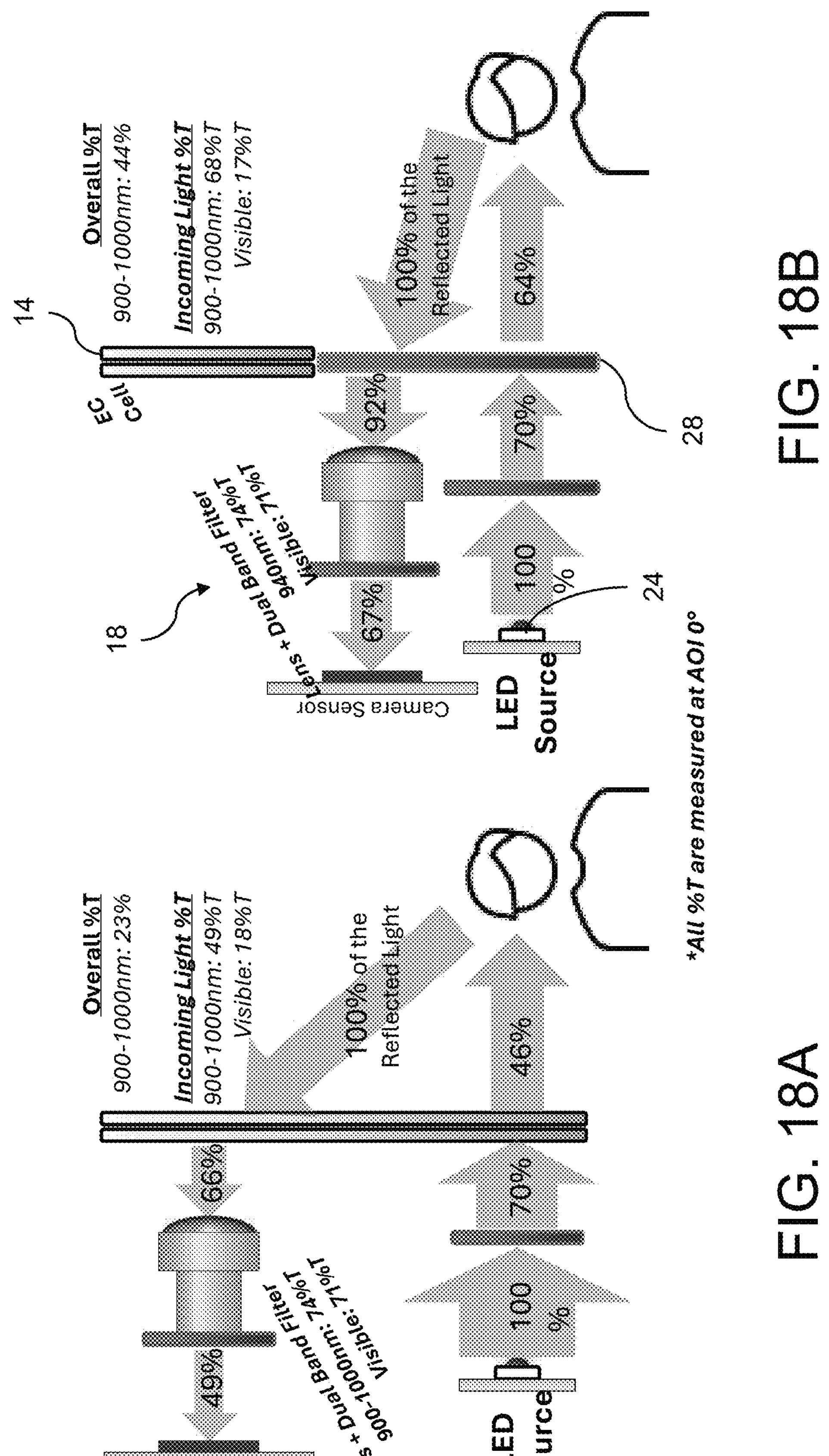
FIGS. 18A and 18B show example paths of near IR light emitted from a near IR light emitter disposed behind the mirror reflective element and from the near IR light emitter disposed within the chin portion of the mirror assembly.

Moreover, the chin cover 28 may allow for greater transmissivity of IR light or near IR light as compared to the mirror reflective element 14. For example, FIG. 18A depicts the DMS camera and near IR light emitters disposed within the mirror head behind the mirror reflective element. The DMS camera views through the mirror reflective element and the near IR light emitters emit near IR light that passes through the mirror reflective element. As shown, about 46 percent of the near IR light emitted by the near IR light emitters may pass through the mirror reflective element and about 49 percent of the near IR light reflected from the vehicle cabin that is incident at the mirror reflective element may be captured by the DMS camera in FIG. 18A.

FIG. 18B depicts the DMS camera 18 and near IR light emitters 24 disposed at the chin region 26 behind the chin cover 28. The DMS camera 18 views through the chin cover 28 and the near IR light emitters emit near IR light that passes through the chin cover 28. The DMS camera includes the image sensor or imager that may capture image data representative of light in the visible light spectrum and light in the IR light spectrum and/or near IR light spectrum (e.g., having frequencies between about 900 nanometers and 1,000 nanometers). The camera may further include the lens or lens barrel having one or more optic elements and a dual band light filter, and the camera views through the chin cover 28. The dual band light filter may be disposed between the image sensor and the lens barrel, or between respective optic elements of the lens barrel. Further, the near IR light emitter 24 emits near IR light that may pass through a red glow IR light filter and the chin cover 28. Thus, when the camera 18 views the driver of the vehicle and captures image data representative of the driver, the image sensor captures image data representative of light (i.e., visible light and near IR light emitted by the light emitter) reflected from the driver and that passes through the chin cover 28, the lens and the light filter. A similar arrangement may be present when the camera views through the mirror reflective element (FIG. 18A).

As shown, the chin cover 28 may allow a higher percentage of near IR light incident at the chin cover 28 to pass through as compared to the mirror reflective element. For example, the mirror reflective element may have a transmissivity for near IR light of about 66 percent and the chin cover 28 may have a transmissivity for near IR light of about 92 percent. Thus, a greater percentage of near IR light emitted by the near IR LEDs 24 passes through the chin cover 28 to illuminate the cabin of the vehicle (e.g., about 64 percent) and a larger portion of light reflected from the cabin of the vehicle passes through the chin cover 28 and is captured by the image sensor of the camera 18 (e.g., about 67 percent of the reflected light). The mirror assembly may utilize characteristics of the near IR LEDs, cameras and mirror assemblies described in U.S. Publication No. US-2024-0383406, which is hereby incorporated herein by reference in its entirety.

Figures 19A, 19B, 19C:
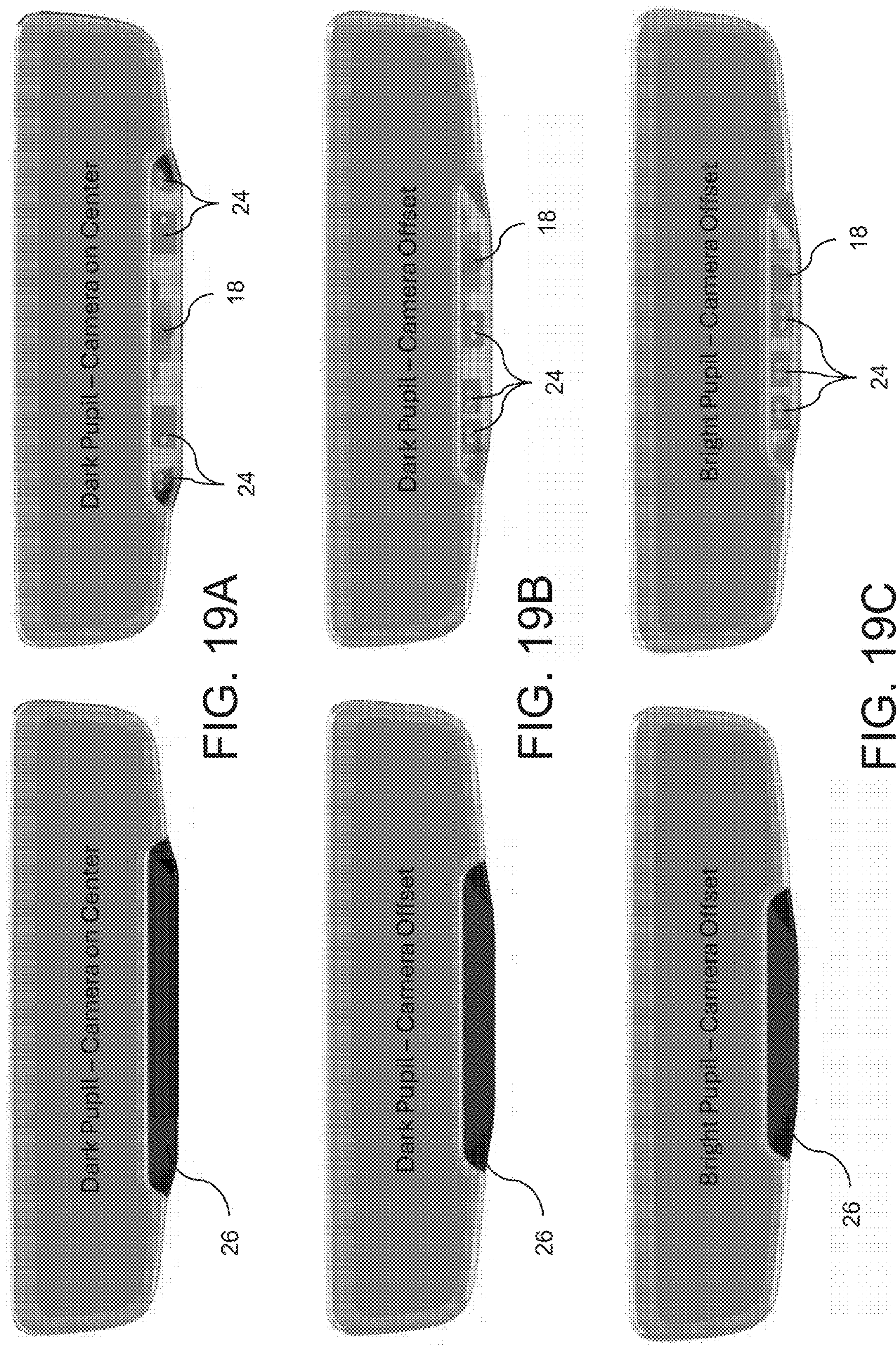
FIGS. 19A-19C show example positions of the camera and near IR LEDs behind the chin cover within the chin portion of the mirror assembly.

Thus, and such as shown in FIGS. 19A-19C, the mirror assembly may include the driver monitoring camera 18 and the near IR light emitters 24 accommodated within the chin region 26 of the mirror head at the lower edge region of the mirror reflective element 14. The camera 18 views through the chin cover 28 and the near IR light emitters 24 emit light that passes through the chin cover 28. The chin cover 28 may transmit a relatively high percentage of near IR light incident thereat, such as about 92 percent or more, and transmit a relatively low percentage of visible light incident thereat, such as about 11 percent or less. The camera 18 may be positioned at a center portion of the chin region 26 with DMS LEDs 24 disposed at opposing side portions of the chin region 26 (FIG. 19A). The chin region 26 may be wide enough to maintain the threshold distance between the camera 18 and the DMS LEDs 24 for a dark pupil DMS algorithm. Optionally, the camera 18 may be positioned at a side portion of the chin region 26, such as a passenger side portion of the chin region, with the DMS LEDs 24 disposed at the other side portion of the chin region 26, such as at driver side portion of the chin region 26 (FIGS. 19B and 19C). While maintaining the threshold distance between the DMS LEDs 24 and the camera 18, this orientation may narrow the chin region 26. The OMS LEDs 24 may be disposed at the center portion of the chin region 26. Further, and such as shown in FIG. 19C, the DMS LEDs 24 may be shifted closer to the camera 18 when a bright pupil DMS algorithm is implemented, further narrowing the chin region 26. The DMS camera 18 and the LEDs 24 may be disposed at the same PCB as one another and may be linearly aligned with one another along the PCB, such that the camera 18 views and the LEDs 24 emit light through a narrow slit or chin cover.

As discussed further below, the mirror assembly having the DMS/OMS camera and near IR LEDs accommodated within the chin region allows the associated DMS/OMS to view points of interest or determine portions of the captured image data that include a driver's head region (e.g., monocular eye points), a front passenger's head region (when closest to the side of the mirror assembly accommodating the camera and when furthest from the side of the mirror assembly accommodating the camera), driver hand positions (e.g., on the steering wheel), front passenger hand positions, second row occupants (e.g., up to three second row occupant positions), and/or third row occupants (e.g., up to three second row occupant positions). When viewing the passenger and occupant positions, the DMS/OMS may determine which portions of the captured image data represent monocular eye points and/or the bottom of torso or seat positions, such as an estimate for a child seat position. Rear window points, such as the top, bottom, left, and right of rear windows may also be determined. These points of interest or regions within the interior cabin of the vehicle may be visible to the DMS/OMS when the mirror head is adjusted to set the rearward view for the driver of the vehicle, and for mounting in a variety of different vehicle applications.

Figure 22:
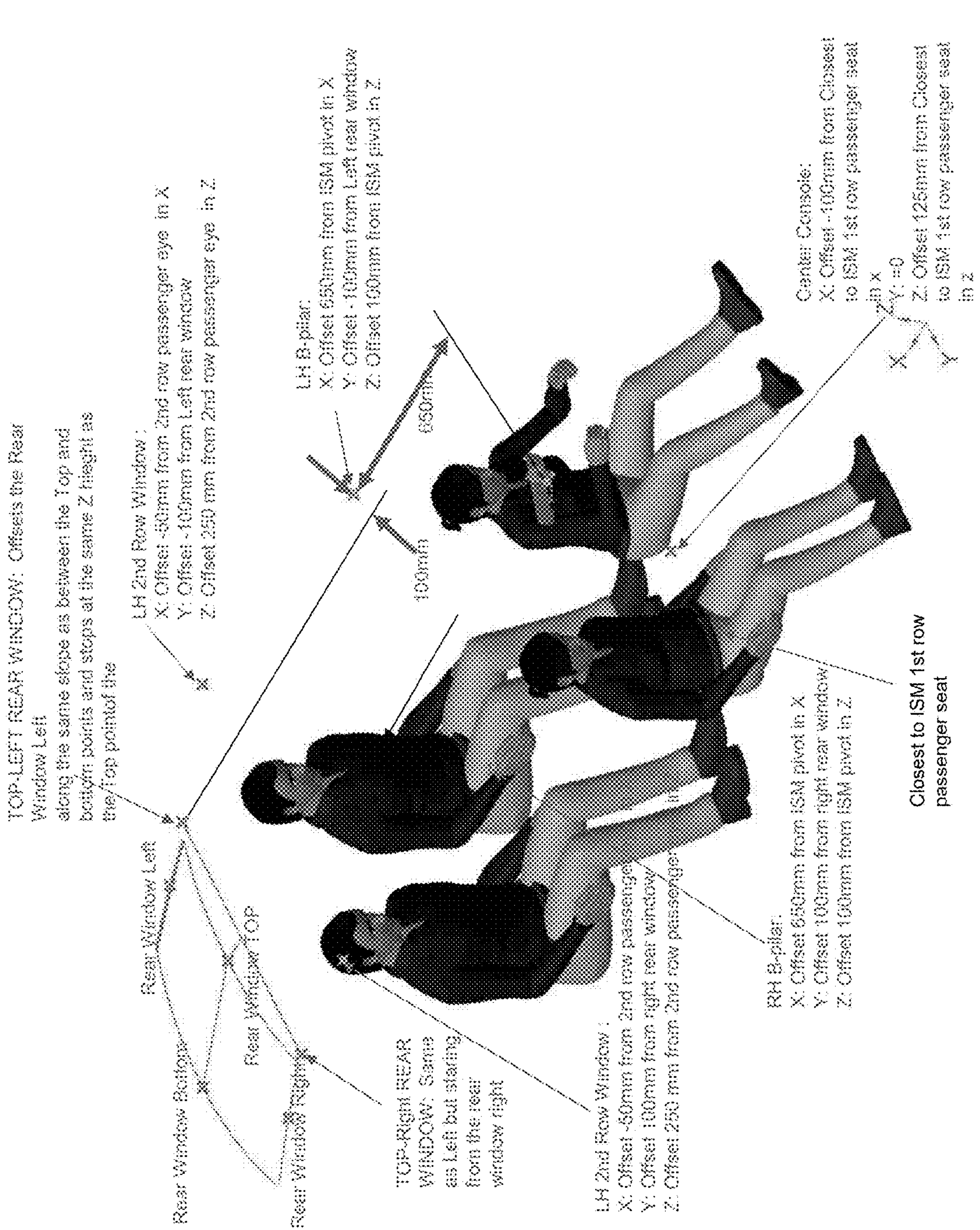
Figure 23:
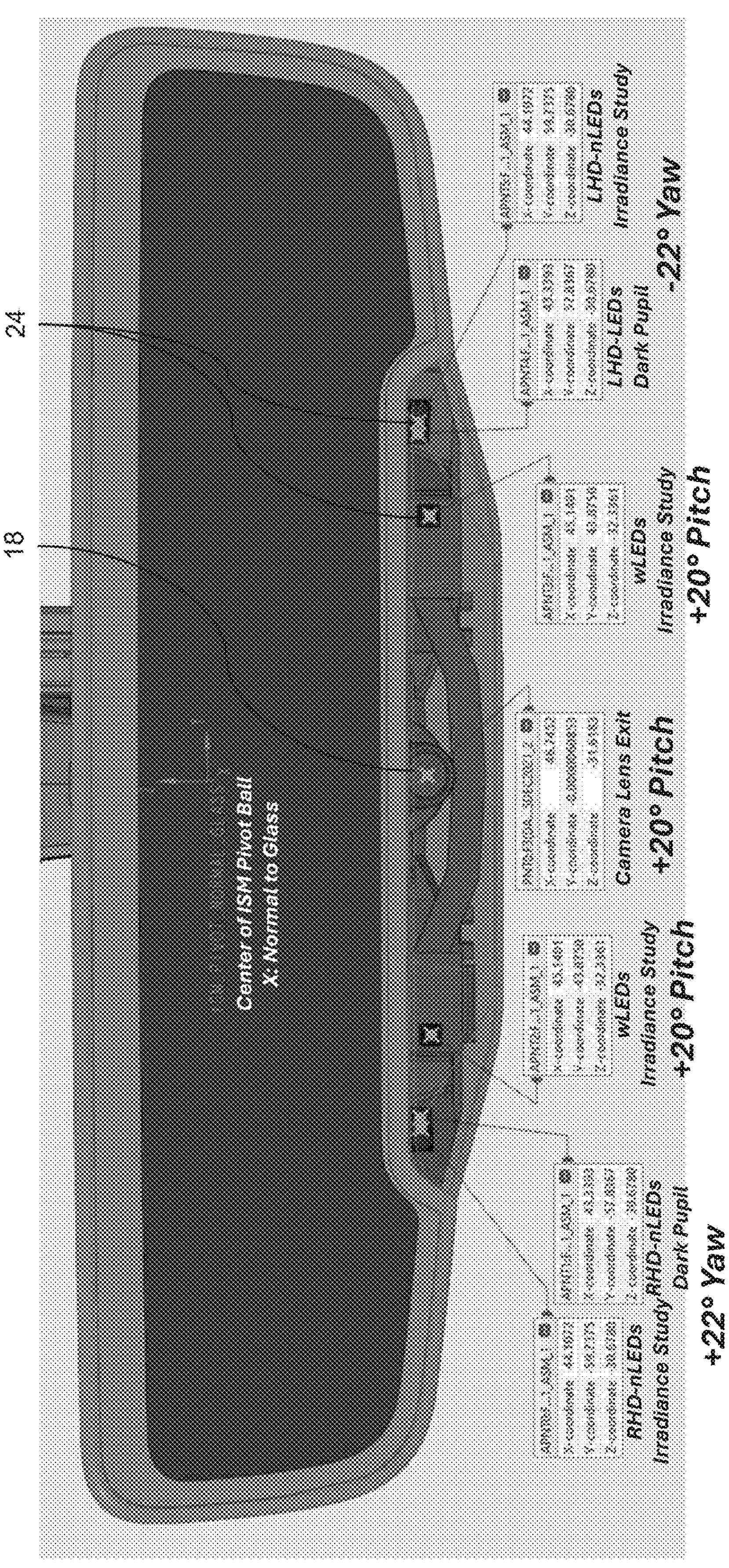
FIGS. 23 and 24 show an example position of the camera and near IR LEDs relative to the mirror reflective element of the mirror assembly.
Figure 24:
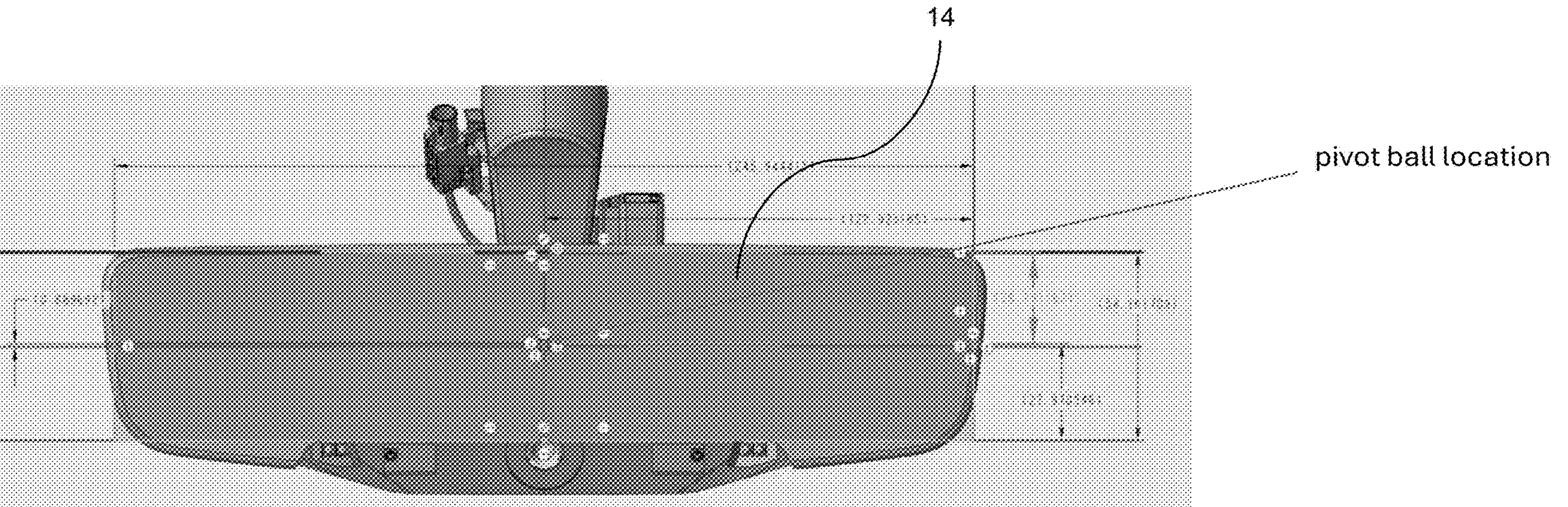
Figure 28:
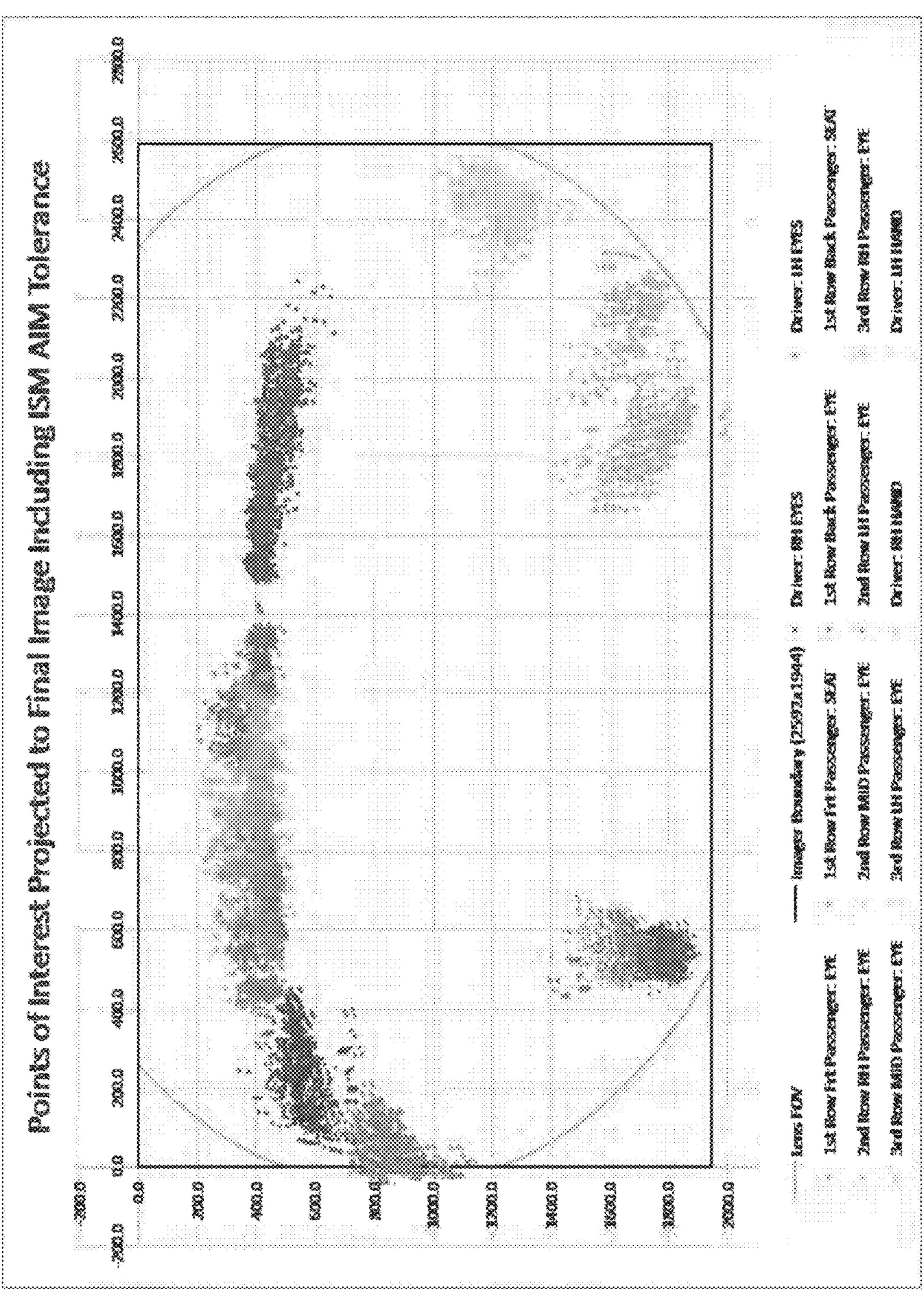
Figure 29:
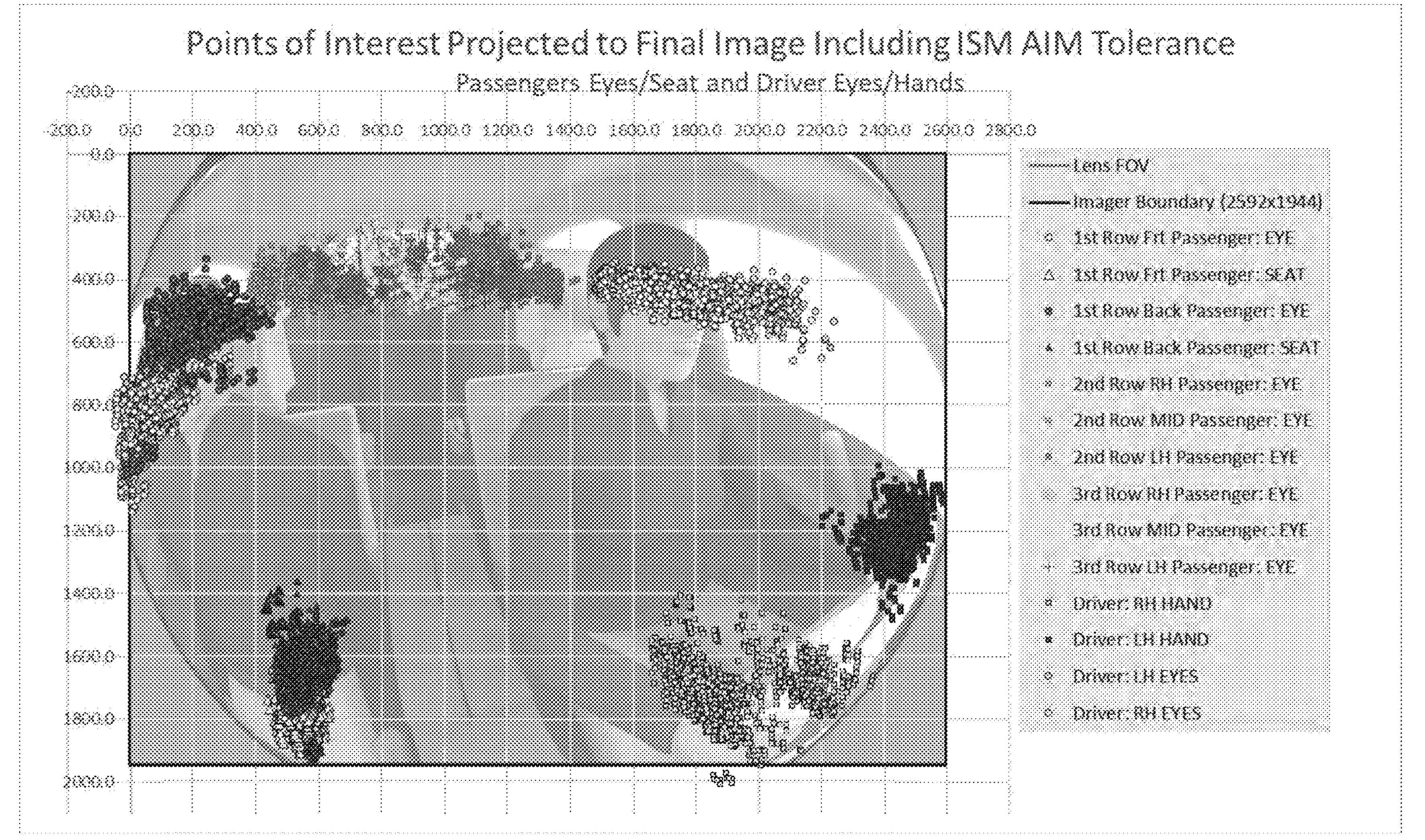
Figure 30:
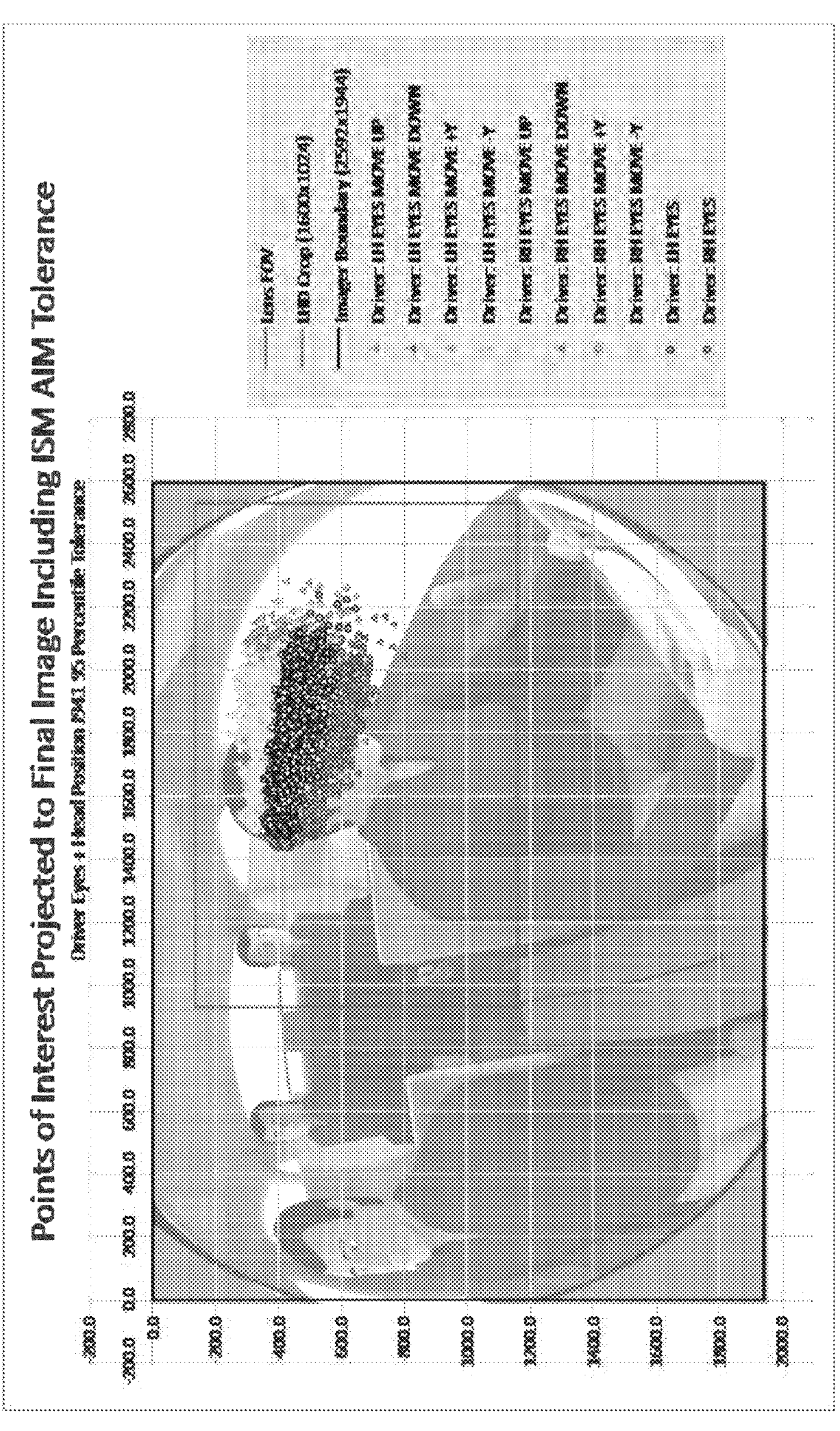
Figure 31:
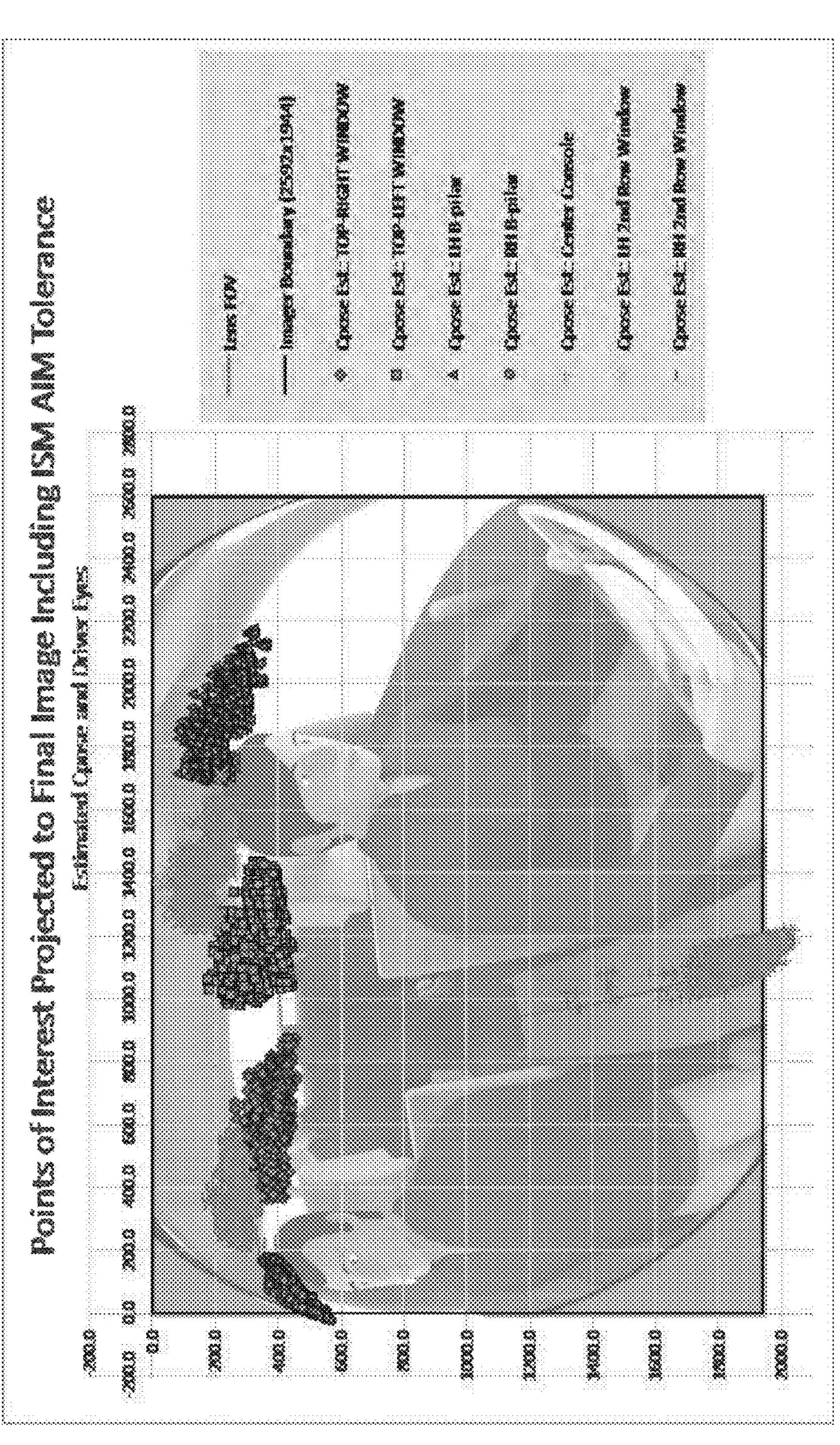
Figure 32:
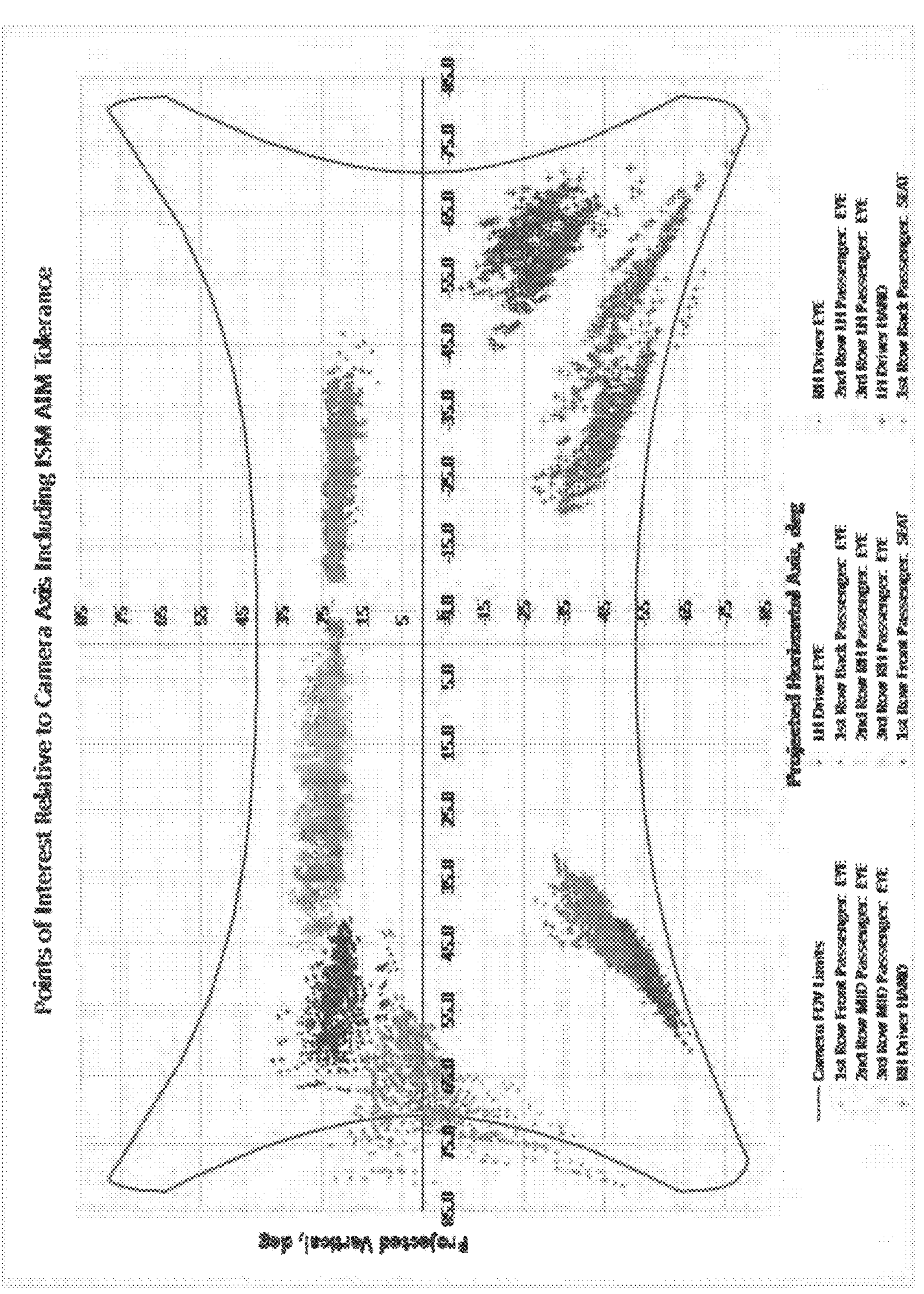
Figure 33:
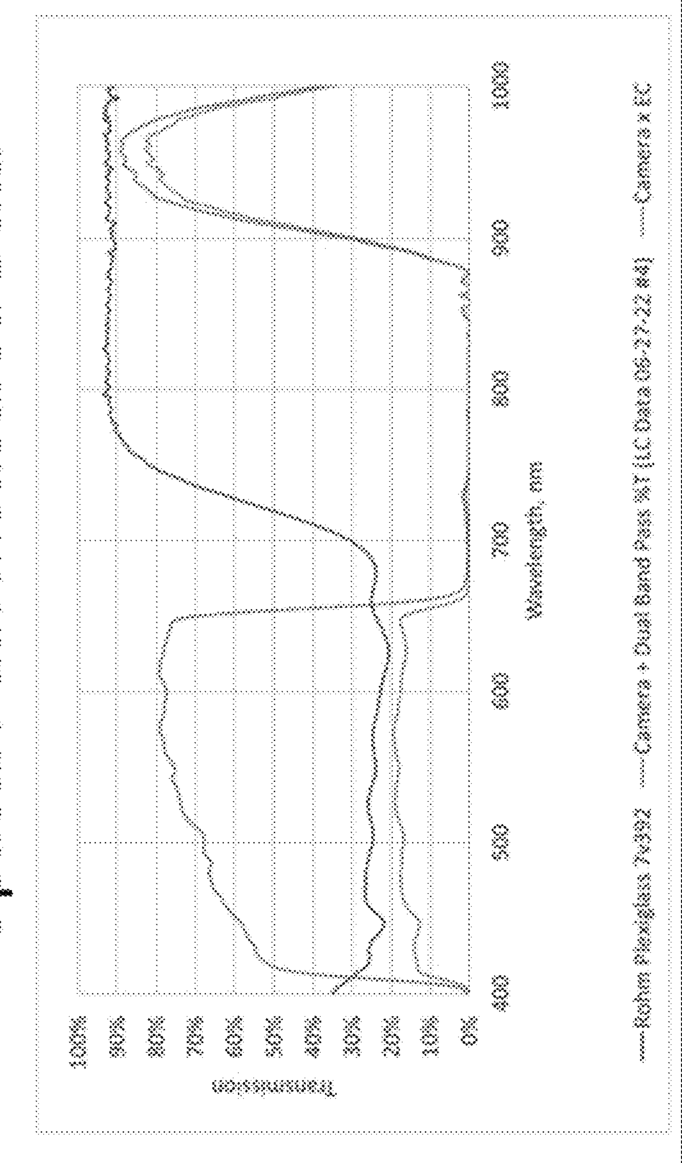
Figure 36:
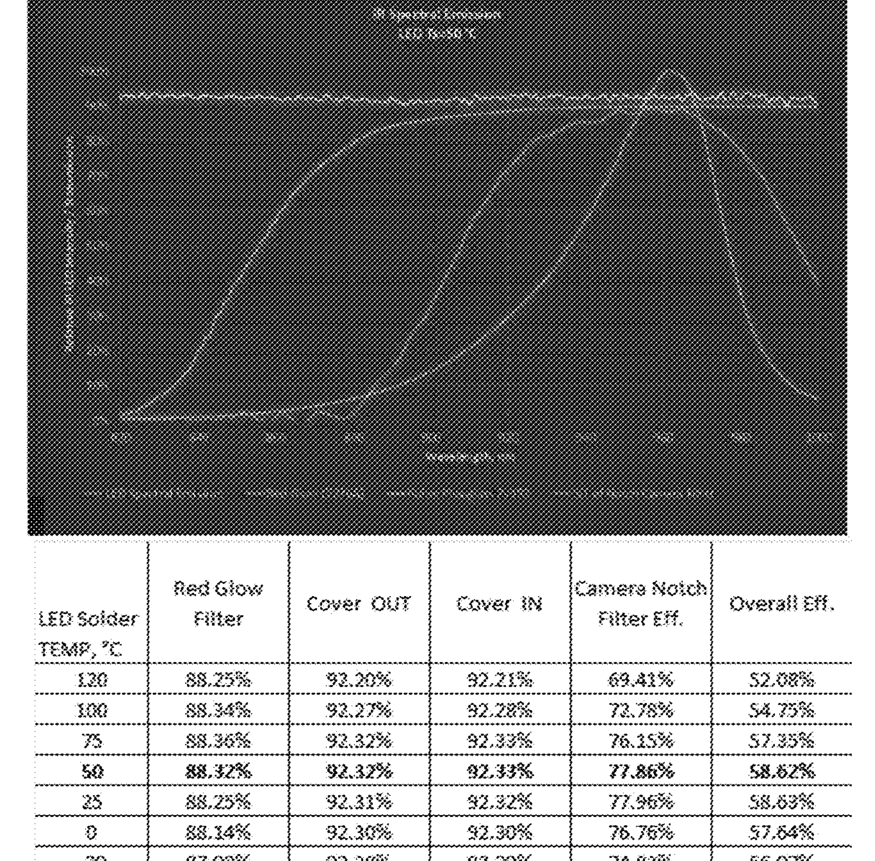
Figure 37:
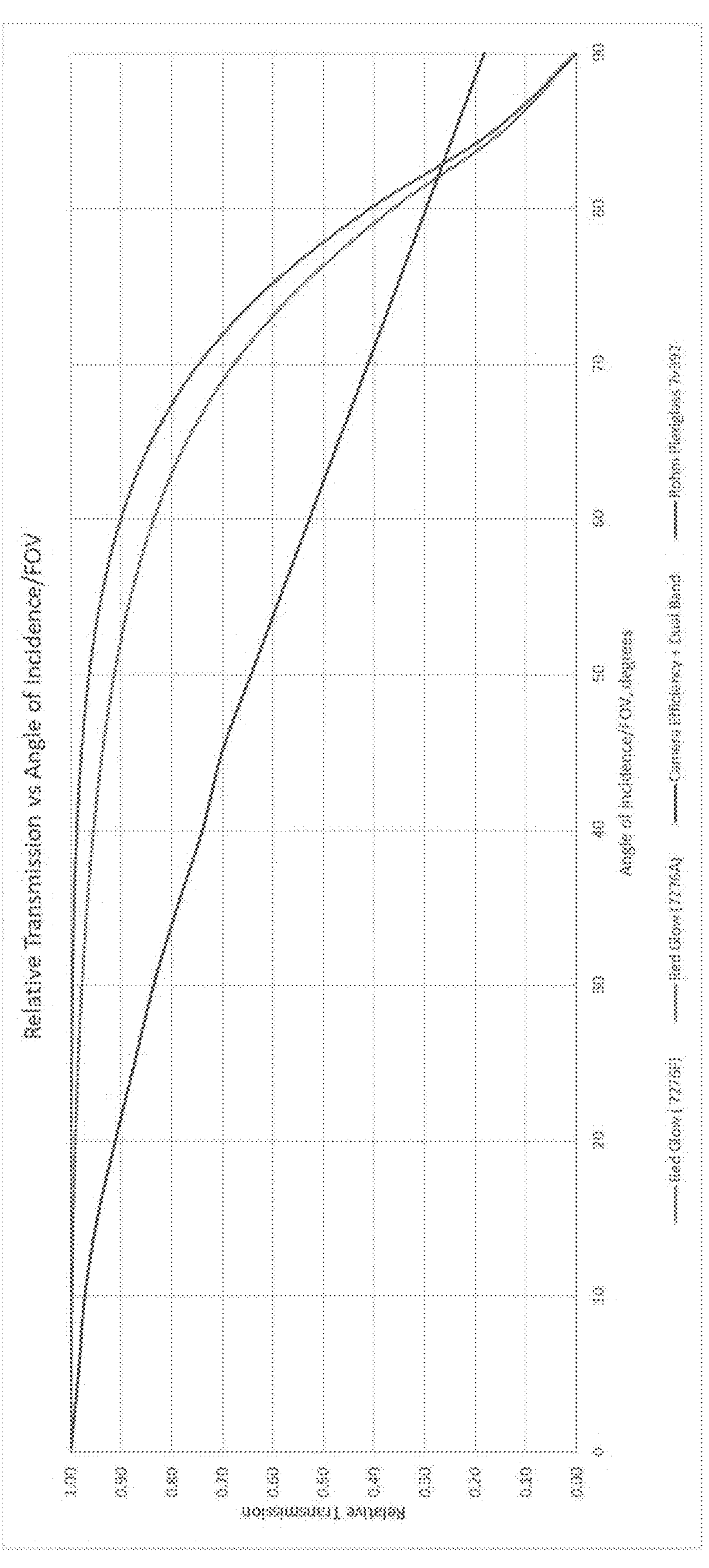
Figure 38:
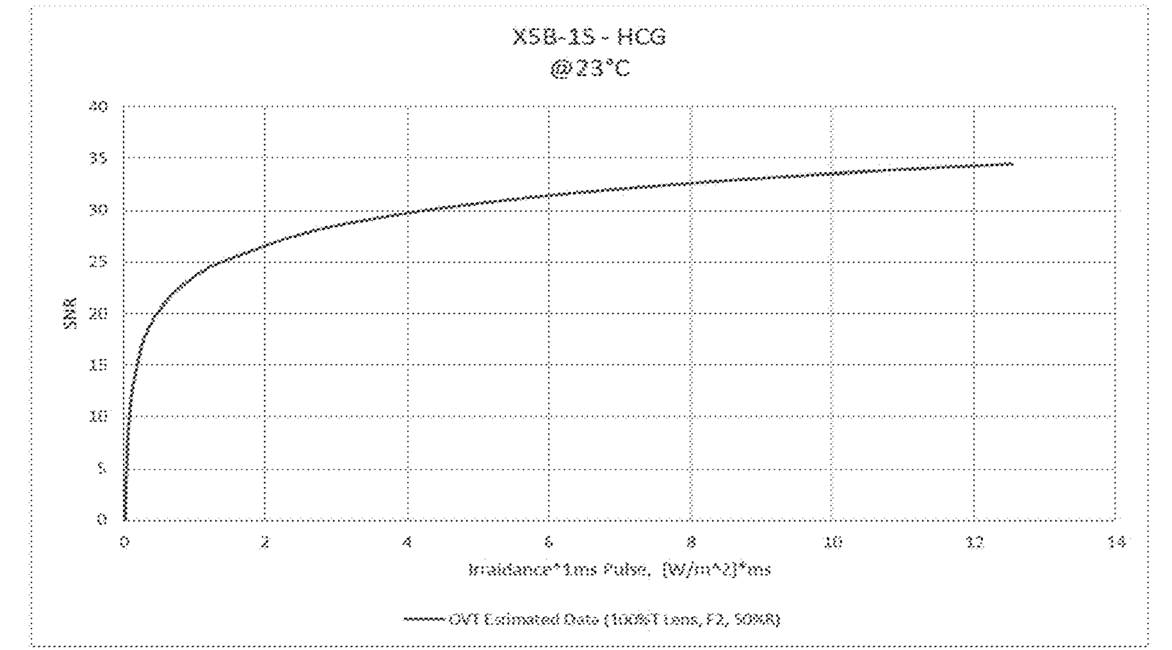
Figure 39:
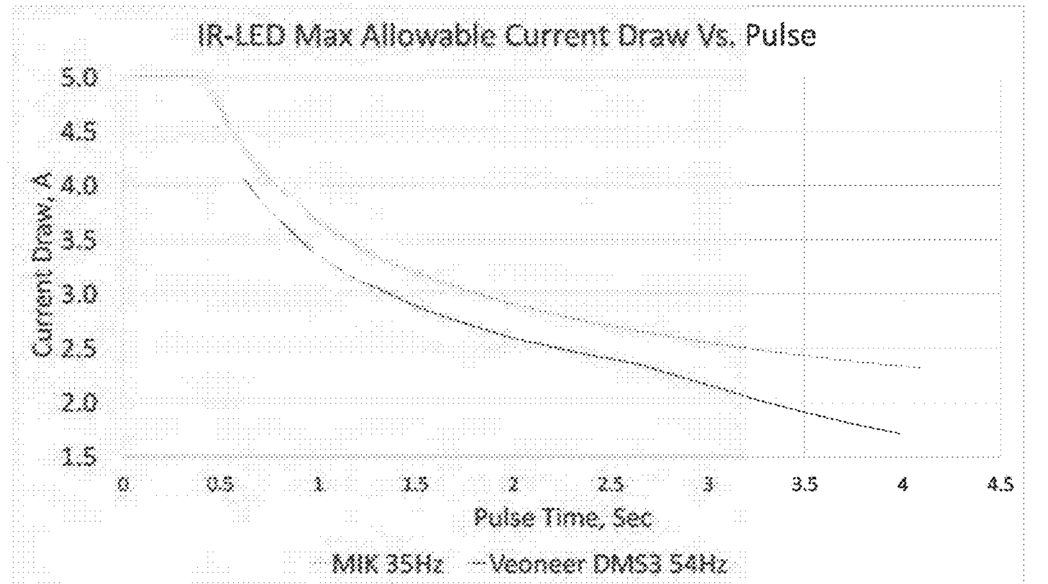

FIGS. 20-24 show example dimensions of the mirror assembly and example fields of view for the camera with the mirror assembly in different vehicle applications. For example, the camera 18 and the chin cover 26 may be tilted at an angle of about 20 degrees relative to the mirror reflective element, with an imager of the camera 18 shifted by about 0.25 millimeters or 5.68 degrees. The camera 18 may have any suitable field of view or viewing range for viewing at least the driver region and the front passenger region (and optionally rear passenger regions) of the interior cabin of the vehicle, such as a field of view spanning at least 165 degrees diagonally, with a horizontal range of at least 140 degrees (e.g., 141.64 degrees) and a vertical range of at least 90 degrees (e.g., 93.48 degrees). FIG. 21 shows a range of positions within the interior cabin of the vehicle where the DMS is capable of detecting the eyes of the driver. FIG. 22 depicts example C-pose estimation. FIG. 23 shows example positions and orientations of the camera 18 and LEDs 24 at the chin region 26. FIG. 24 shows example measurements of the mirror reflective element 14.

FIGS. 25-32 show example fields of view for the camera with the mirror assembly in different vehicle applications and example determinations by the DMS/OMS based on processing of image data captured by the cameras. For example, a video mirror may in general provide a narrower range of positions of the mirror head compared to a non-video mirror, leading to better passenger visibility and a further distance between the driver's eyes and the camera axis.

When the DMS is operating during darkened ambient light conditions, such as during nighttime driving, the camera may capture image data representative of near IR light emitted by the near IR light emitters. FIGS. 33-41 show example transmissivity of the cover 28 to near IR light and example near IR light illumination for the vehicle cabin. Driver monitoring image data may be captured with the driver eyes target greater than about 33.4 decibels, a pulse duration of the LEDs 24 of about 4 milliseconds, LED radiant flux at nominal values, and an LED solder temperature at about 63 degrees Celsius (where typical temperature of solder at 25 degrees Celsius ambient). Occupant monitoring data may be captured with all positions of interest at about 20 decibels and a pulse duration of the LEDs 24 of about 4 milliseconds. The ambient rejection ration (ARR) may be greater than or equal to about 0.055, with irradiance from near IR LEDs at the driver's eyes greater than or equal to about 11.25 $W/m^2$.

As shown, a near IR light emitter may operate to achieve irradiance at the driver's head region of about 11.3 watts per square meter or more to achieve an ARR of 0.055 for green pixels. A 35 Hertz near IR light emitter may have a maximum current draw of about 2.31 amps for a 4 milliseconds pulse and a maximum current draw of about 4.69 amps for a 0.5 milliseconds pulse. A 54 Hertz near IR light emitter may have a maximum current draw of about 1.709 amps for a 4 milliseconds pulse and a maximum current draw of about 4.383 amps for a 0.5 milliseconds pulse. There is a possibility to increase the current draw even further and the expected worst case duty cycle may be about 12 percent.

Figure 42:
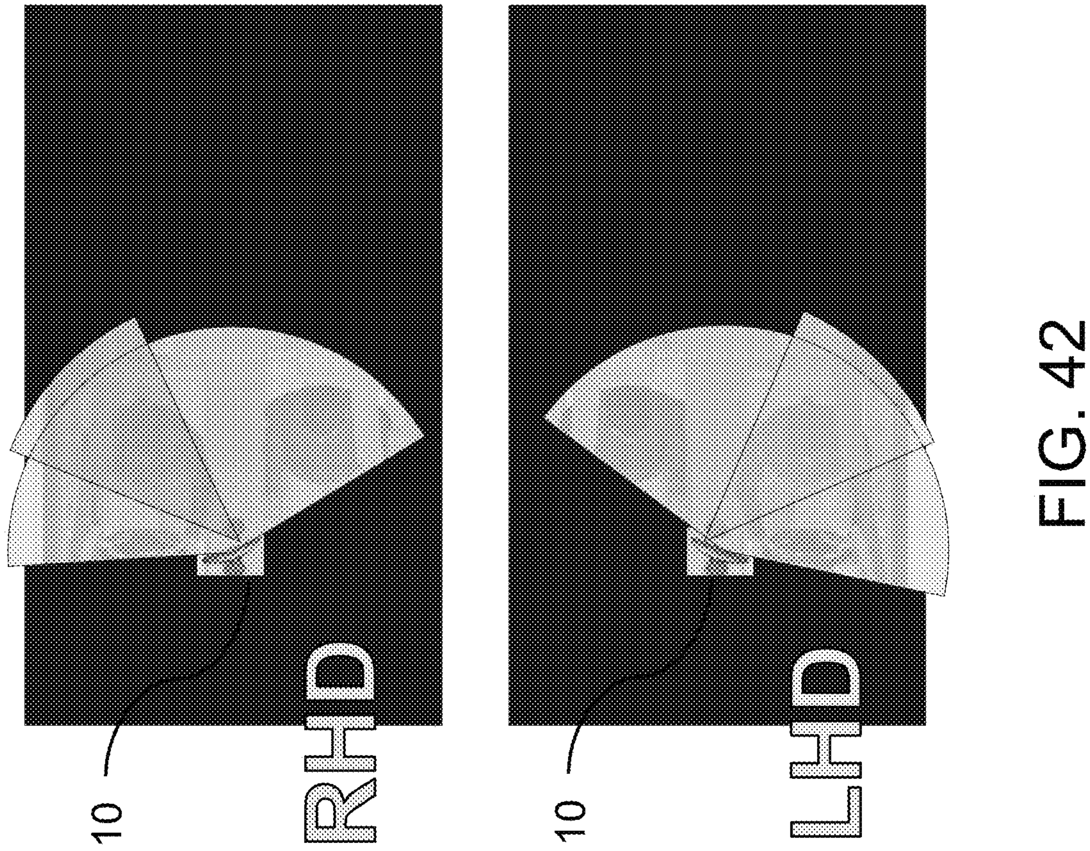
FIGS. 42 and 43 show example operating parameters for the mirror assembly.
Figure 43:
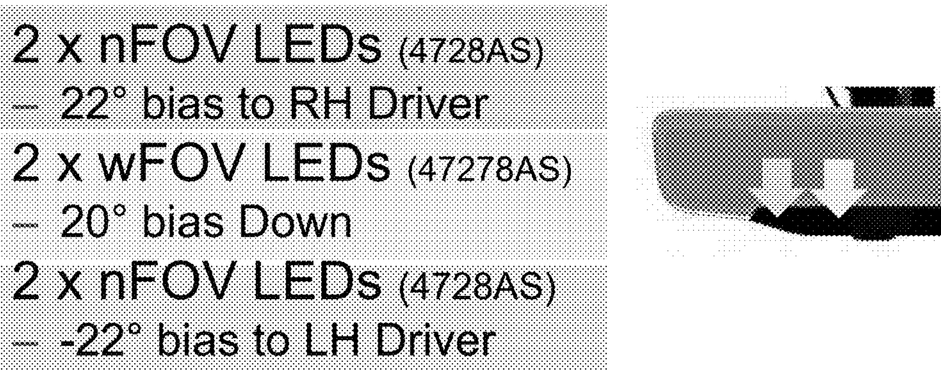
Figure 44:
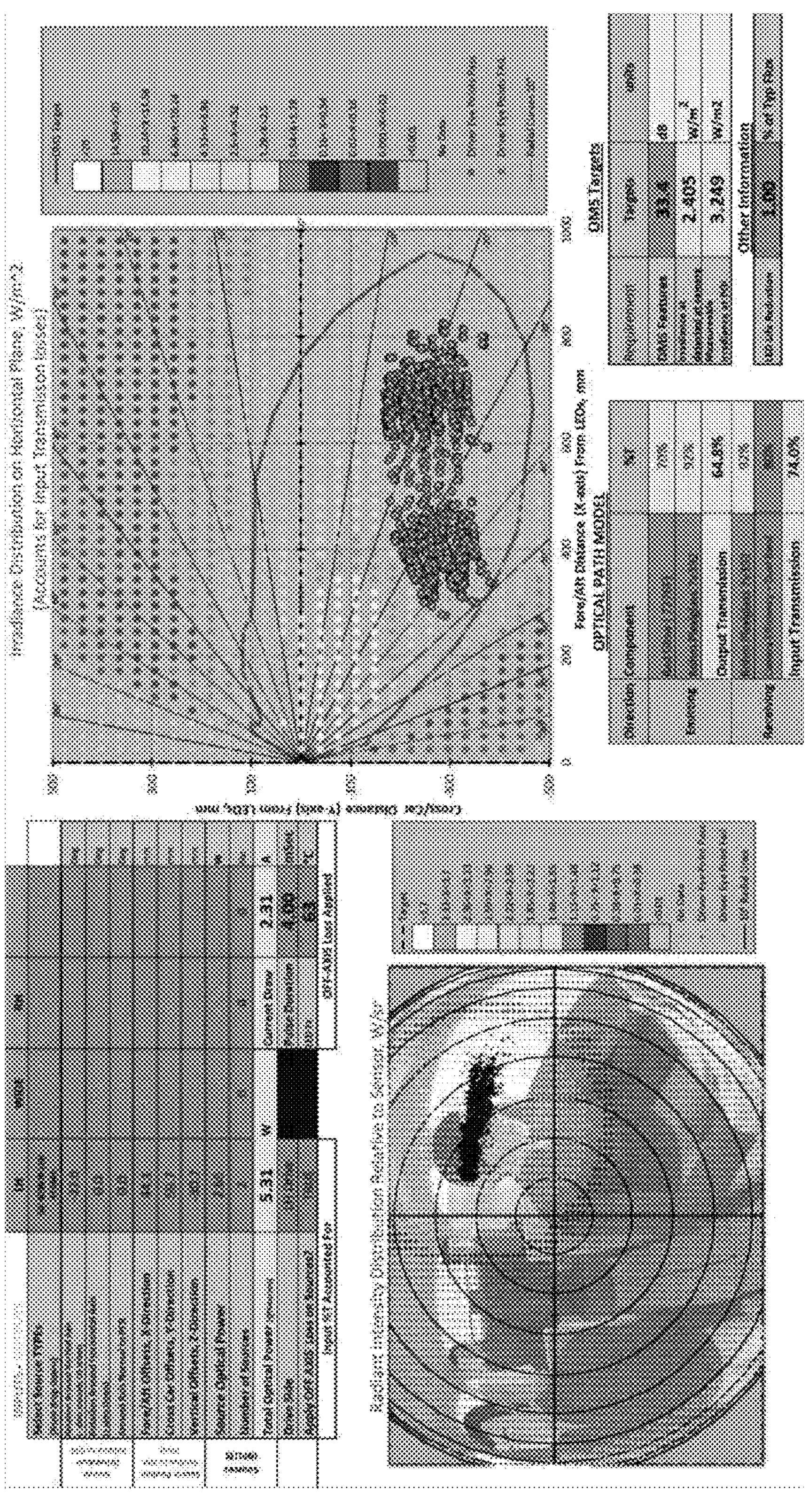
FIGS. 44-55 show example detection data based on image data captured by the camera within the chin portion of the mirror assembly.
Figure 45:
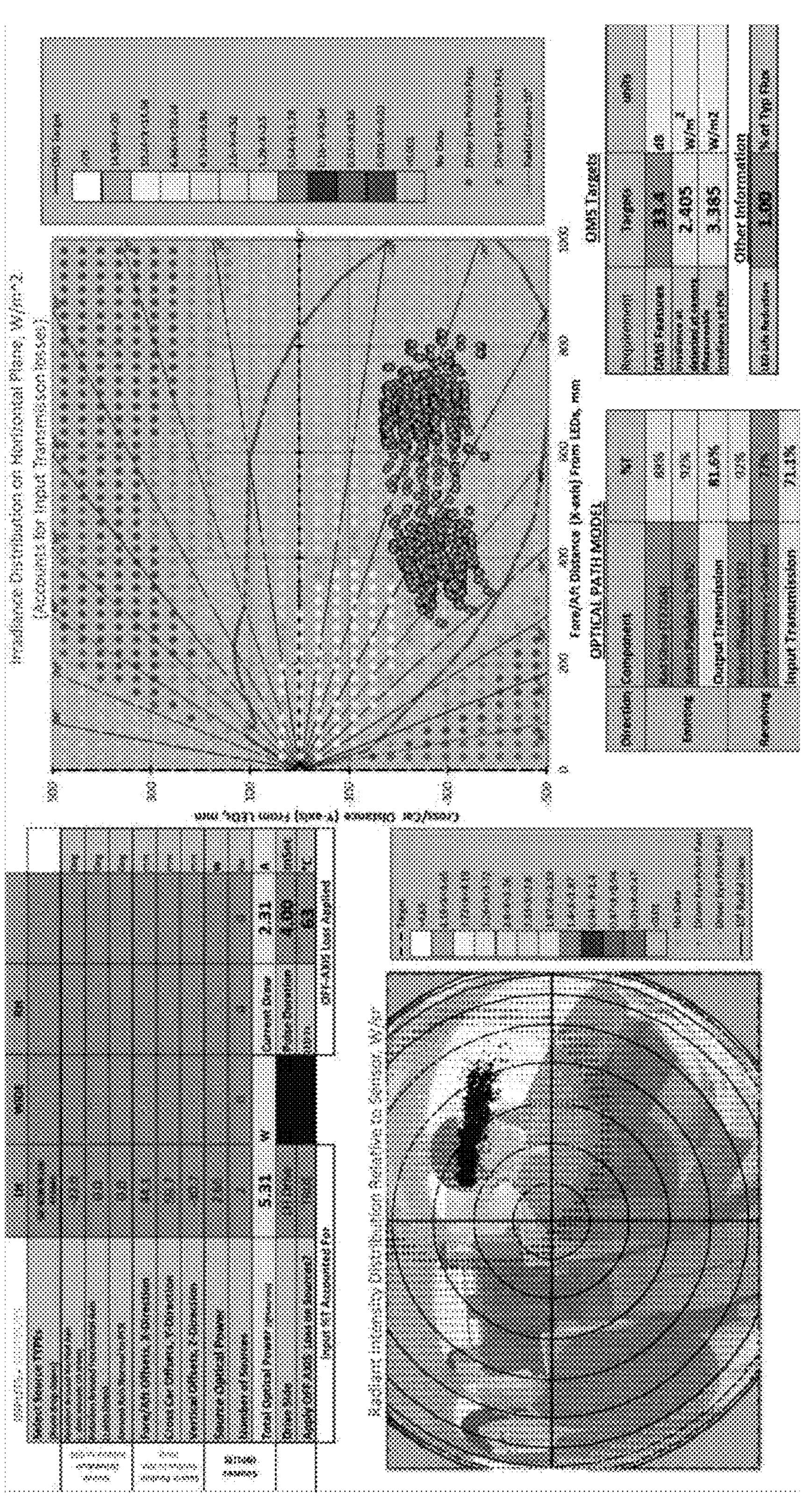
Figure 46:
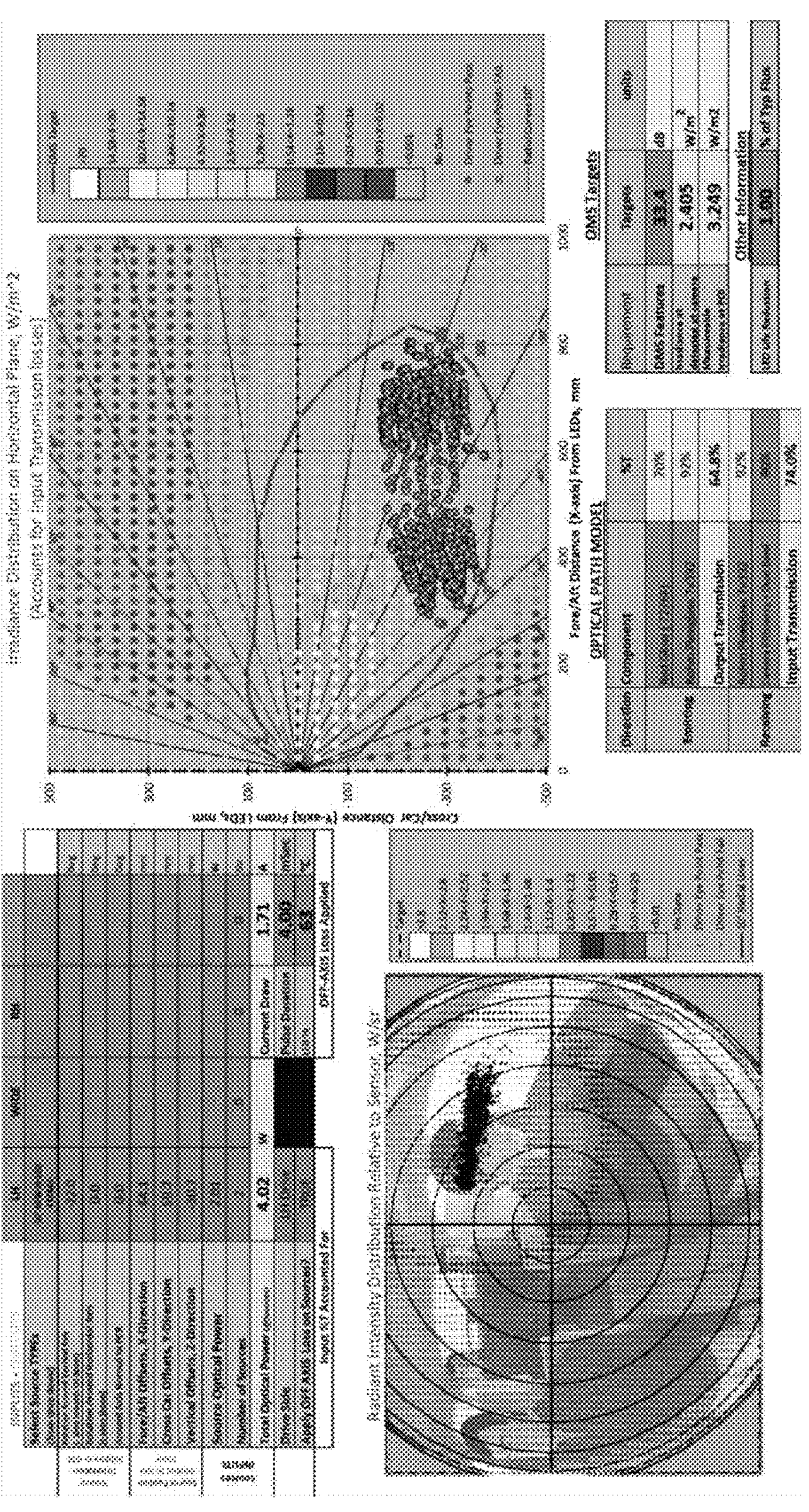
Figure 47:
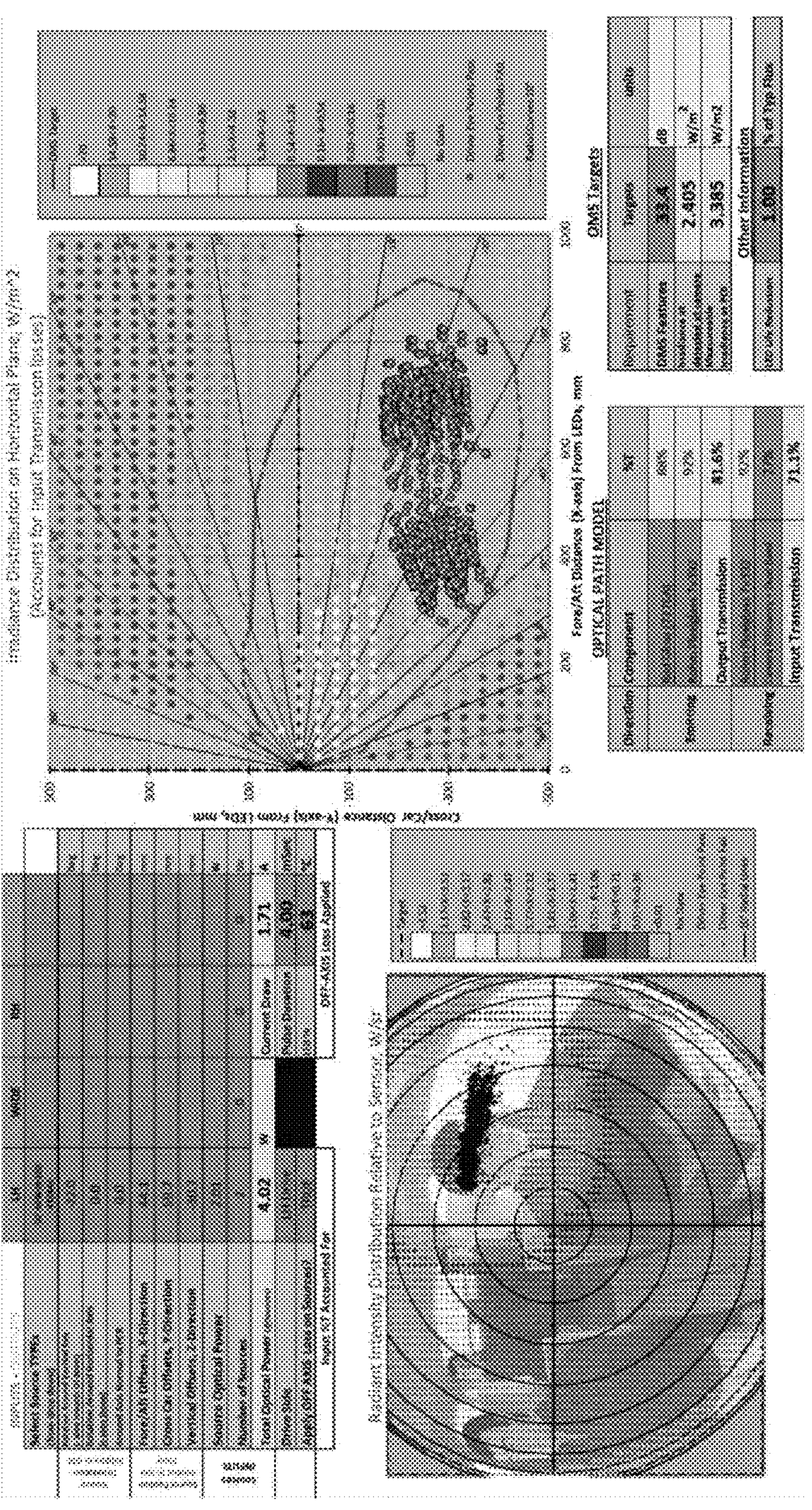
Figure 48:
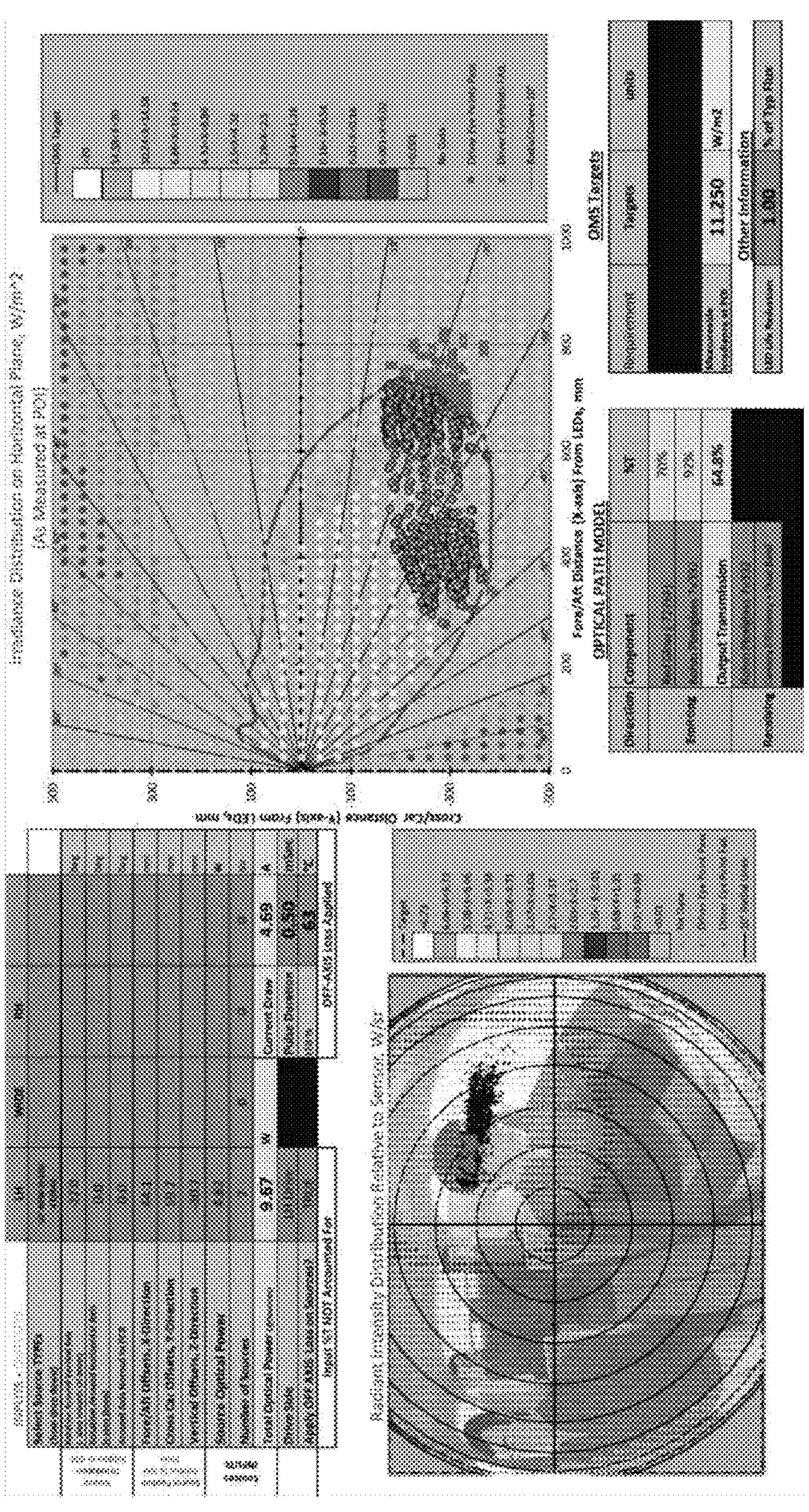
Figure 49:
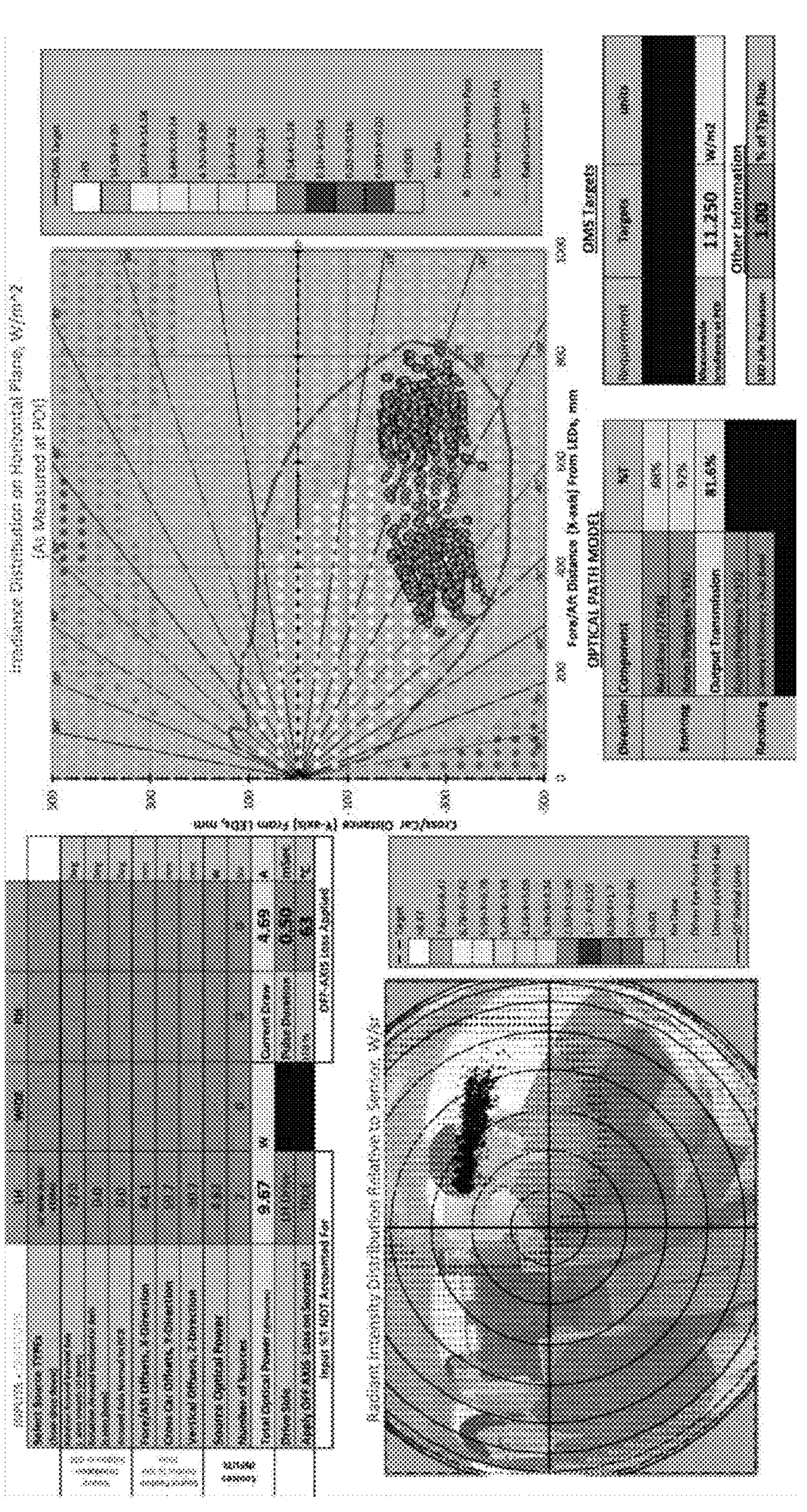
Figure 50:
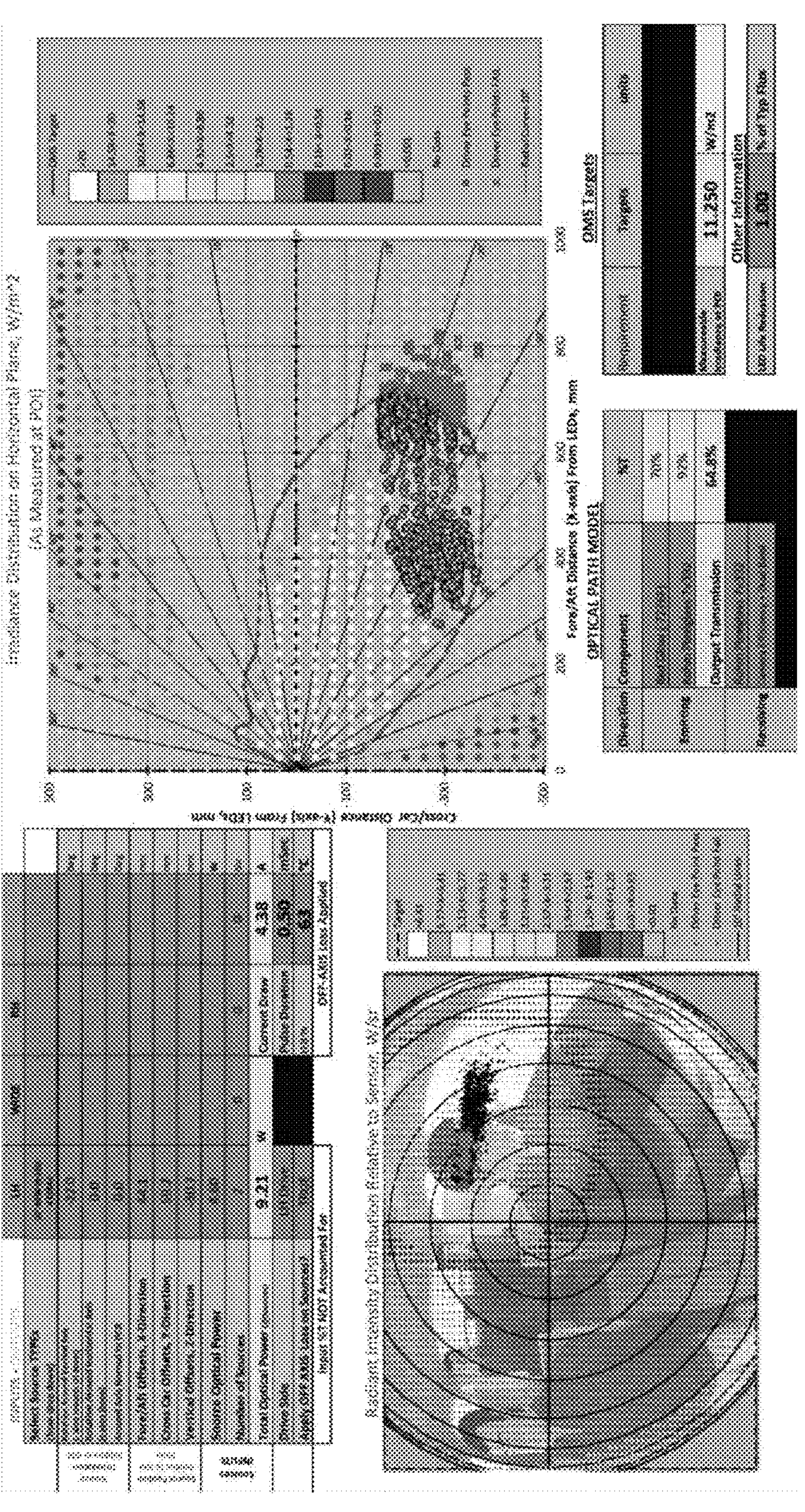
Figure 51:
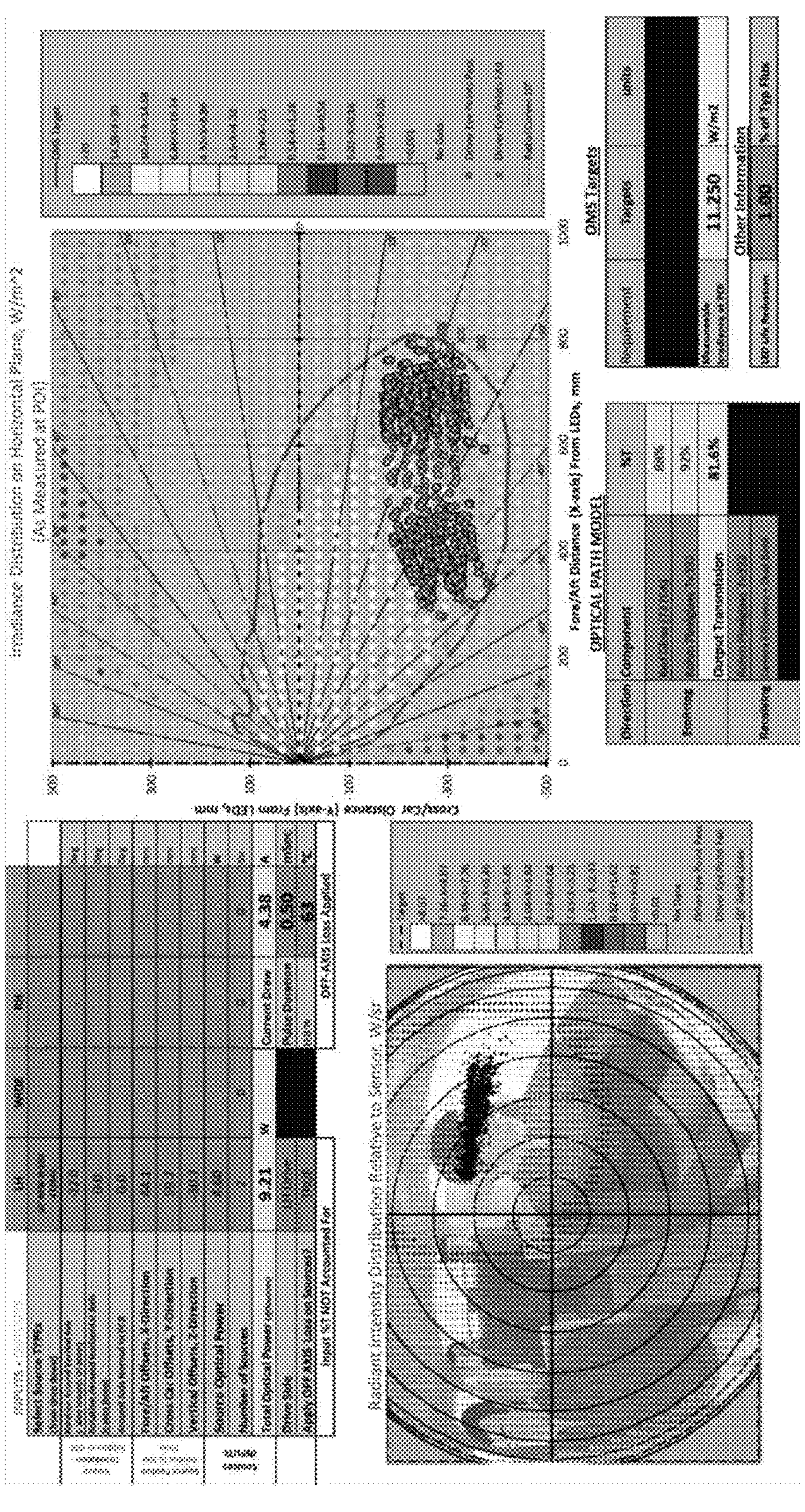
Figure 52:
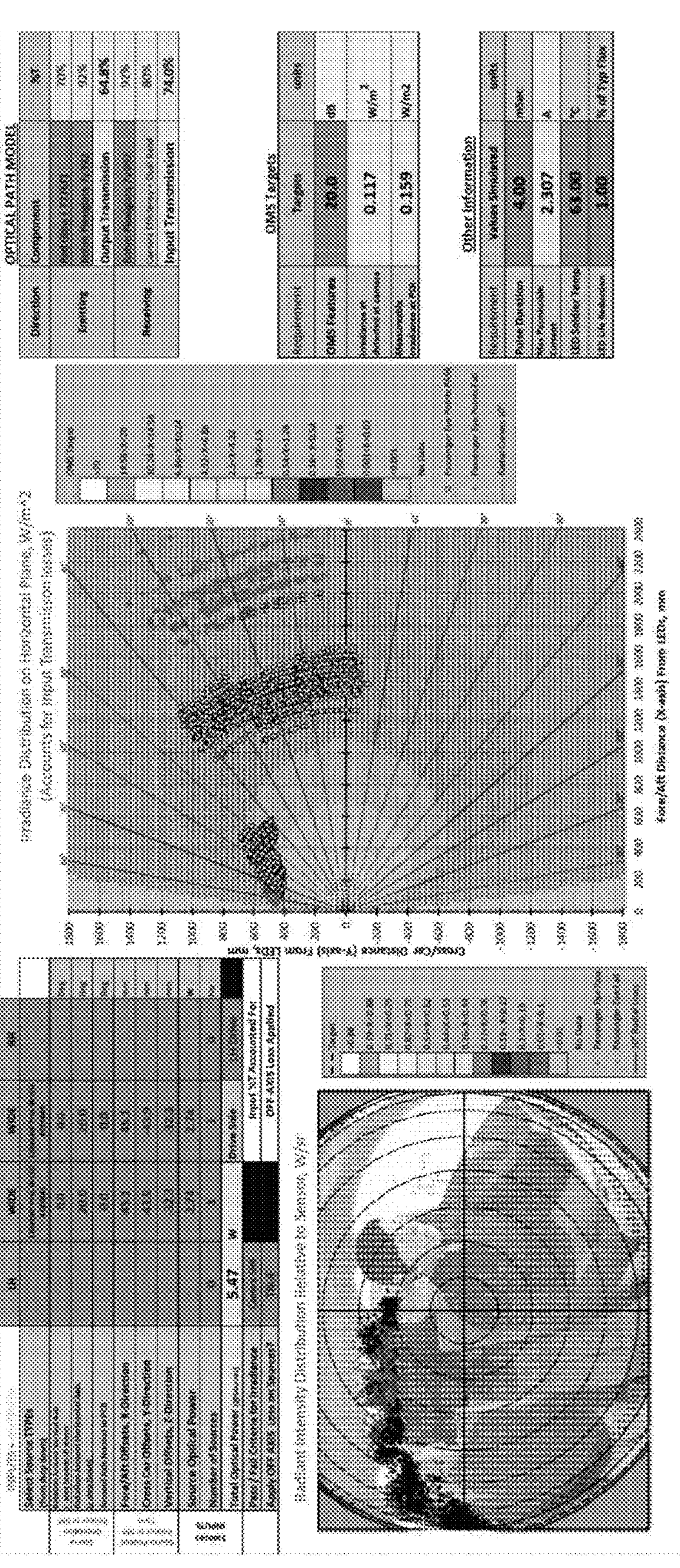
Figure 53:
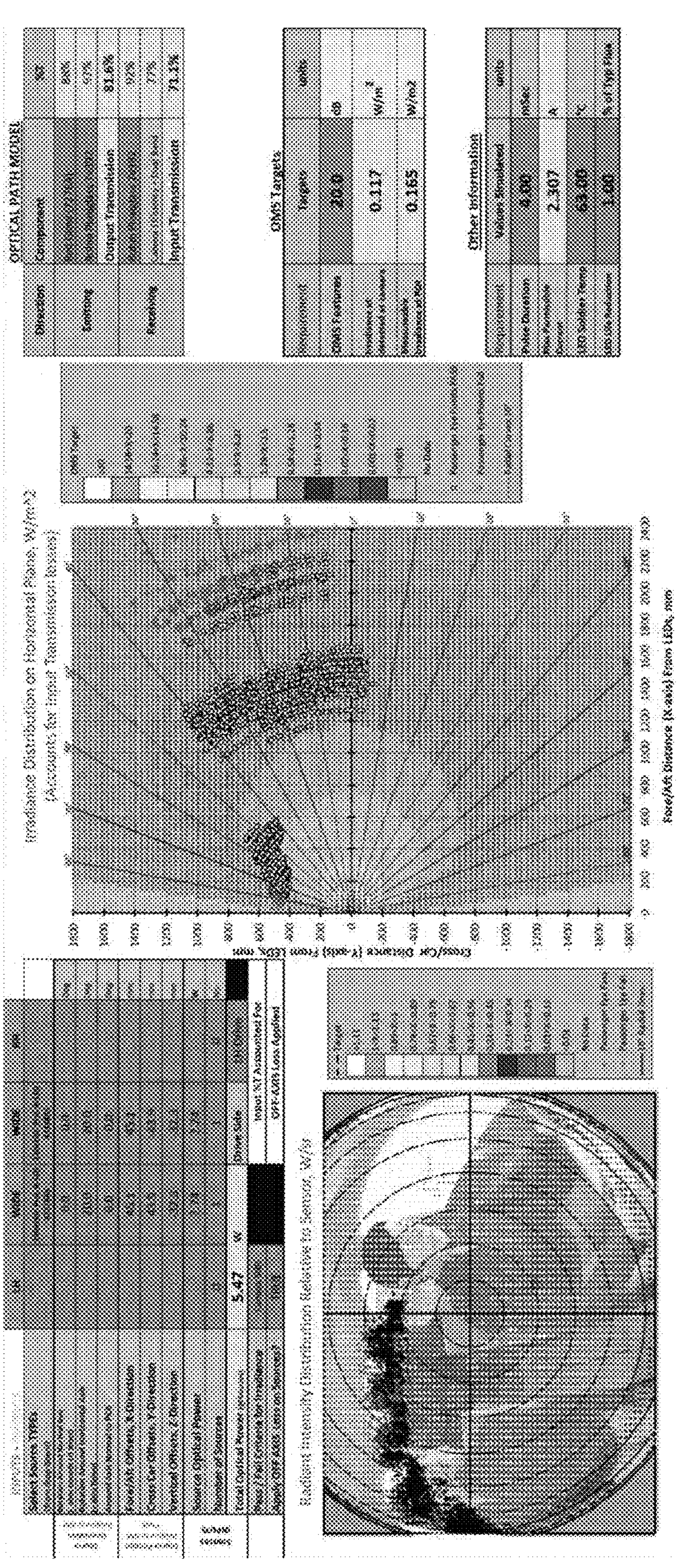
Figure 54:
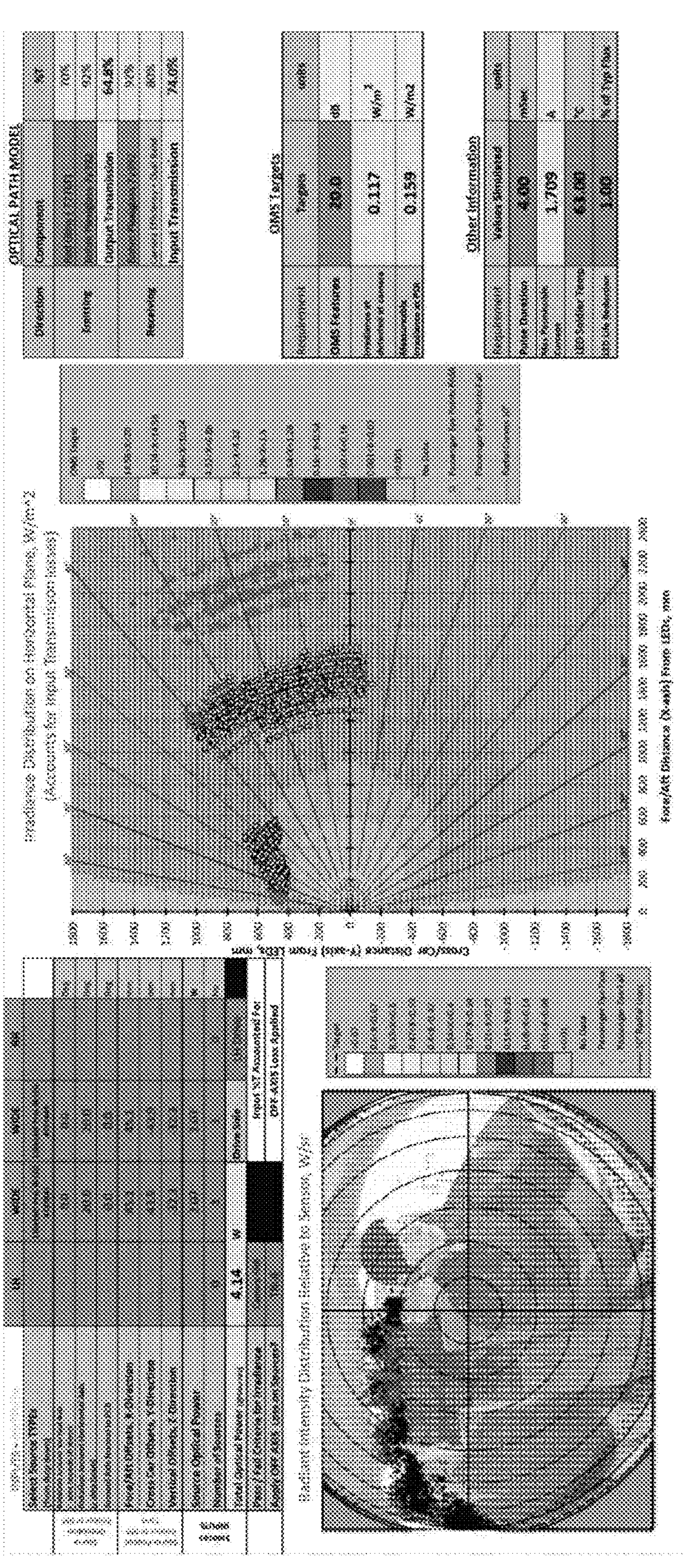
Figure 55:
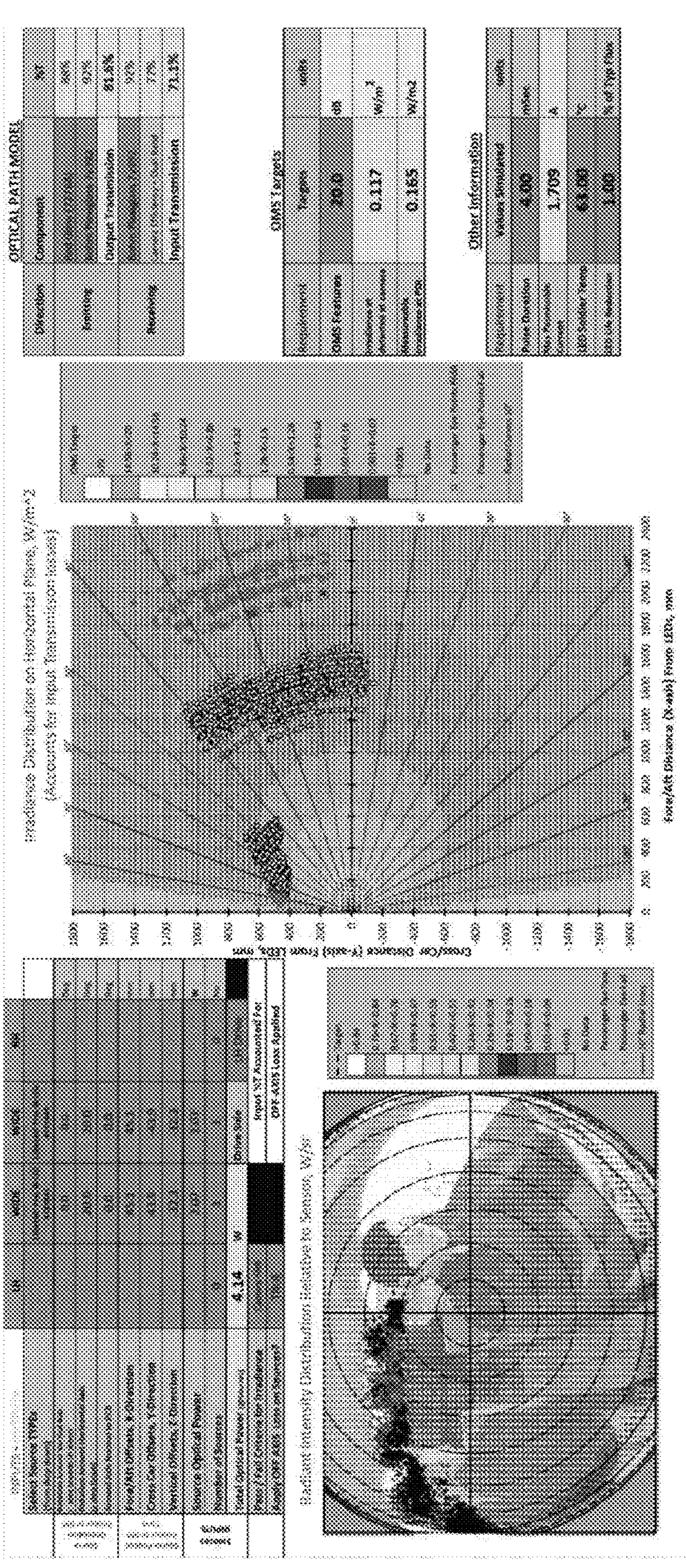
Figure 56:
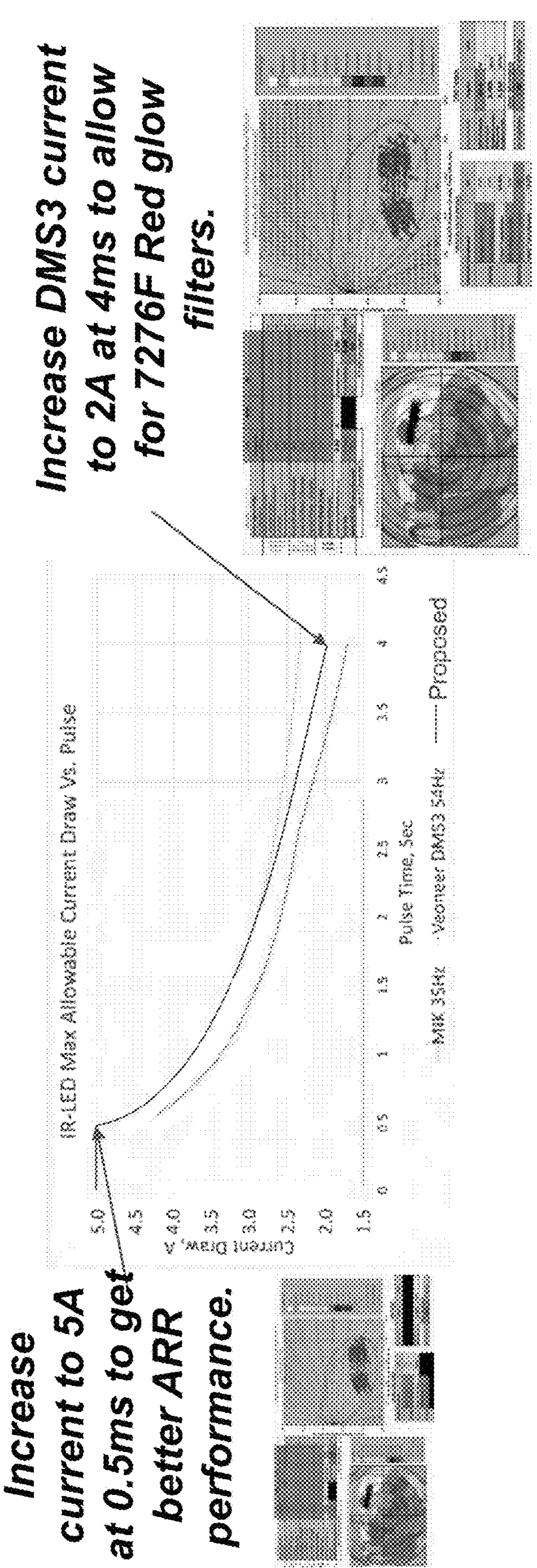

As shown in FIGS. 42 and 43, the image data captured by the camera 18 may be processed for the DMS and OMS functions. For example, alternating frames of image data (e.g., captured at 60 frames per second) may be processed for the DMS function and the OMS function. Optionally, in a 0.2 second period (having 12 frames of image data), a first frame may be processed for the DMS function, a second frame may be processed for the OMS function, and then third, fifth, seventh, ninth, and eleventh frames may be processed for the DMS function while fourth, sixth, eighth, tenth, and twelfth frames are processed for a color or RGB image processing function. The DMS and OMS image frames may be representative of near IR light. The LEDs may include a LHD DMS near IR LED operating at 30 hertz, a LHD OMS near IR LED operating at 5 hertz, a RHD DMS near IR LED operating at 30 hertz, a RHD OMS near IR LED operating at 5 hertz, and a RGB LED operating at 25 hertz. During DMS image data capture for a LHD vehicle, the narrow field of view LEDs closer to the driver side of the LHD vehicle may be operated. During OMS image data capture for a LHD vehicle, the wide field of view LEDs at or near the central portion of the mirror head may be operated. During DMS image data capture for a RHD vehicle, the narrow field of view LEDs closer to the driver side of the RHD vehicle may be operated. During OMS image data capture for a RHD vehicle, the wide field of view LEDs at or near the central portion of the mirror head may be operated. During RGB image data capture, the wide field of view LEDs at the central portion of the mirror head may be operated. The narrow field of view LEDs for RHD DMS image data capture may be biased or angled about 22 degrees toward the driver of the RHD vehicle. The narrow field of view LEDs for LHD DMS image data capture may be biased or angled about 22 degrees toward the driver of the LHD vehicle. The wide field of view LEDs for OMS image data capture may be biased or angled about 20 degrees downward from the mirror head (e.g., relative to a plane of the mirror reflective element). The narrow field of view LEDs and the wide field of view LEDs may comprise any suitable light sources, such as OSLON™ Black 4728AS LEDs commercially available from ams-OSRAM AG of Premstaetten, Austria. The LEDs may be operated with 1 W of optical flux and 5 M rays to produce a field of illumination having dimensions of about 130 degrees by about 160 degrees relative to the light source. The length of active area of the light source may be about 1 millimeter with a radiant flux at 1 Amp and 25 degrees Celsius of about 1.3 or about 1.34.

FIGS. 44-47 show example SNR irradiance of the driver head region by the near IR light emitters disposed at the mirror assembly in a LHD vehicle. When the interior rearview mirror assembly is symmetrical, LHD irradiance will equal RHD irradiance.

FIGS. 48-51 show example ARR irradiance of the driver head region by the near IR light emitters disposed at the mirror assembly in a LHD vehicle. When the interior rearview mirror assembly is symmetrical, LHD irradiance will equal RHD irradiance.

FIGS. 52-56 show example SNR irradiance of occupant positions by the near IR light emitters disposed at the mirror assembly in a LHD vehicle. When the interior rearview mirror assembly is symmetrical, LHD irradiance will equal RHD irradiance. Optionally, the current draw for a 0.5 millisecond pulse may be increased to about 5 amps to result in improved ARR performance. Further, the current draw for a four millisecond pulse may be increased to about two amps to allow for red glow filters.

Referring to FIG. 57, to comply with regulations, four our fewer near IR LEDs may be powered at one time (such as two narrow field of view LEDs and two wide field of view LEDs). Thus, the mirror assembly may only have LEDs configured for LHD vehicles or RHD vehicles.

Figure 58:
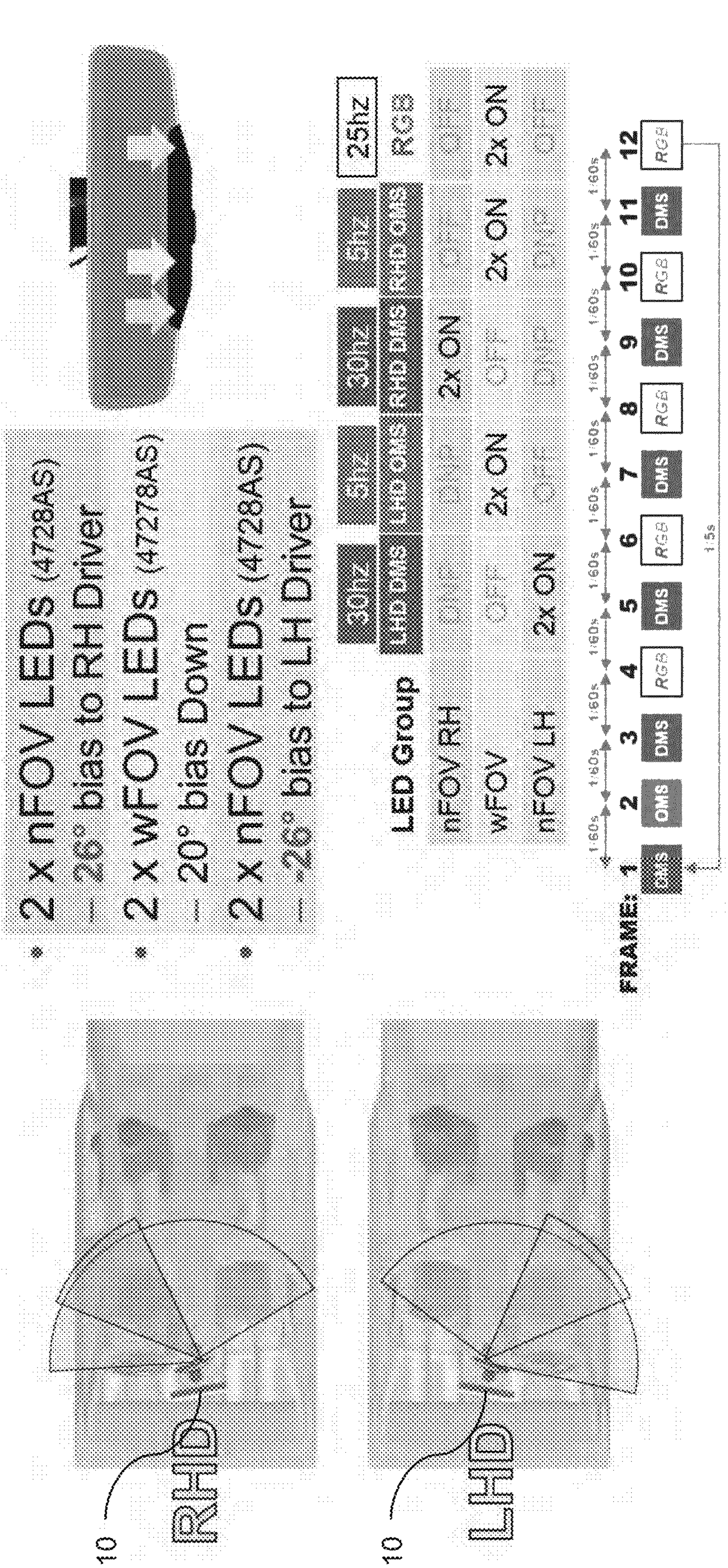
FIG. 58 shows example operating parameters for the mirror assembly.
Figure 59:
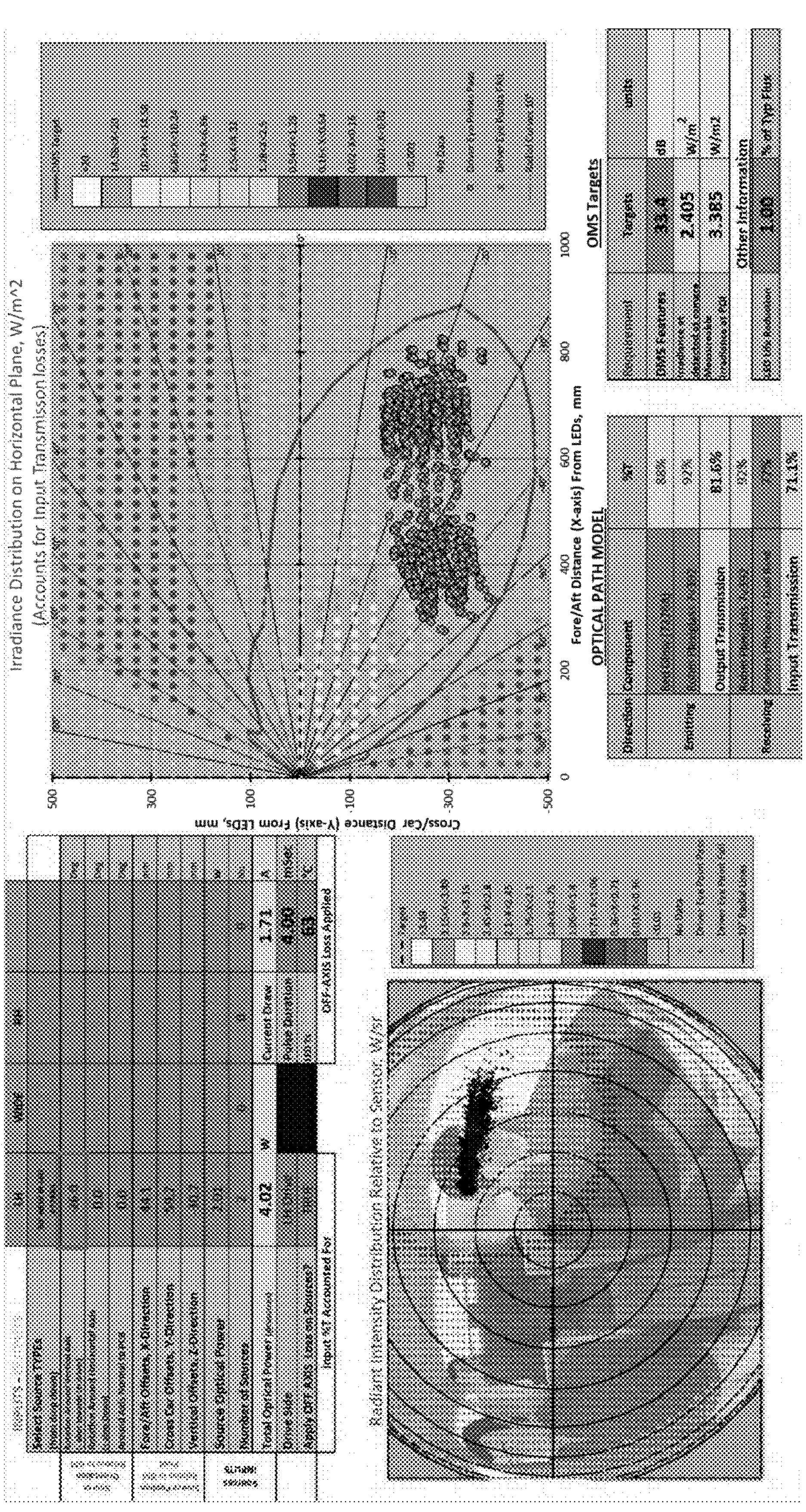
FIG. 59 shows example detection data based on image data captured by the camera within the chin portion of the mirror assembly.

Referring to FIGS. 58 and 59, the near IR LEDs may be adjusted or tilted or moved within the chin region to improve irradiance of the driver. For example, the narrow field near IR LEDs may be rotated or tilted toward a driver's side of the mirror assembly.

The near IR LEDs may be tilted or canted toward the driver's side of the mirror assembly at an angle of about 22 degrees, 26 degrees, and the like. The PCB accommodating the near IR LEDs may be bent or flexed to achieve this angle. The wide near IR LEDs may be biased downward by an angle of about 20 degrees.

Figure 60:
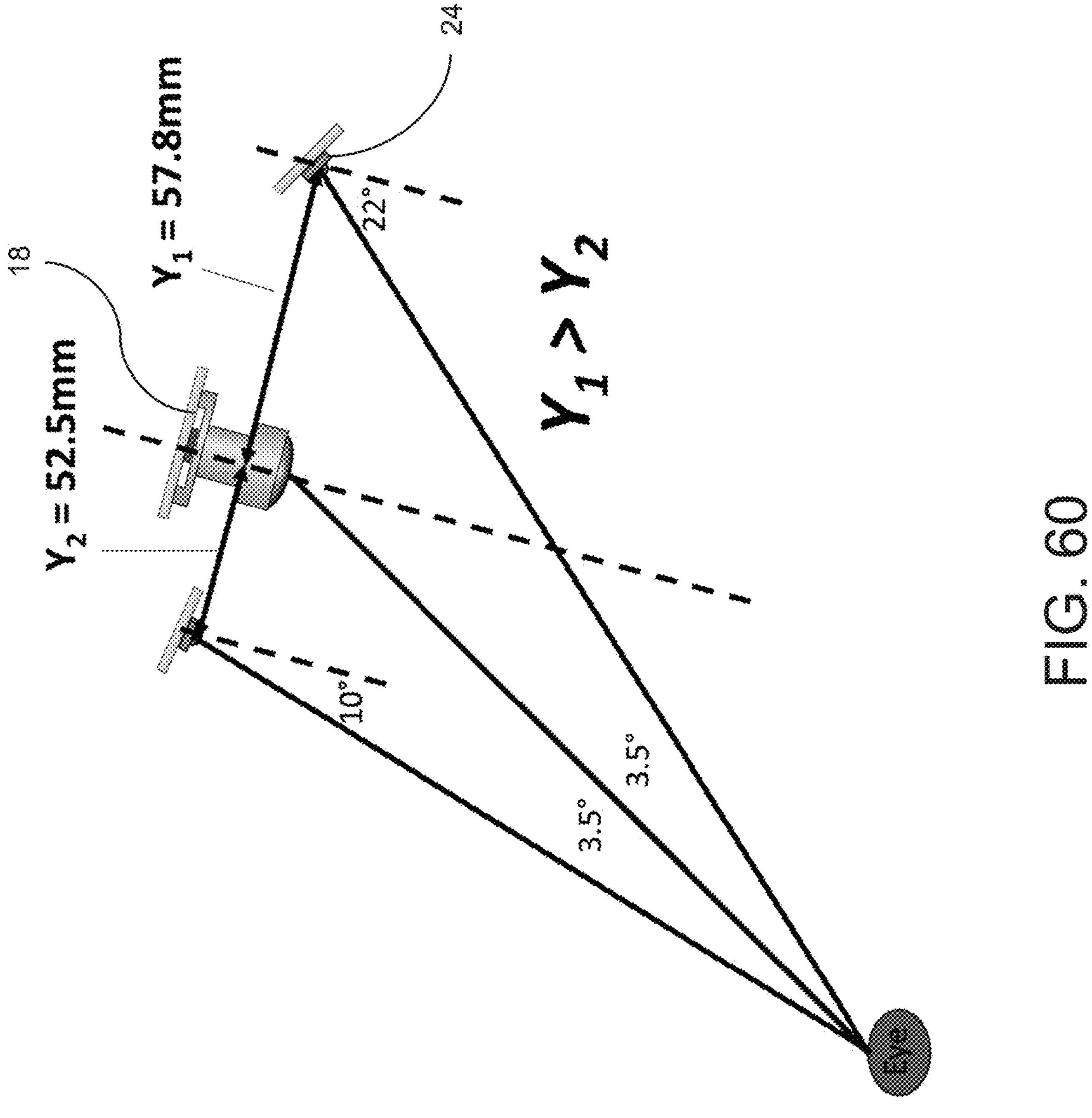
FIG. 60 is a schematic diagram showing an example angle of the camera and near IR light emitters relative to the driver's eye.
Figure 61:
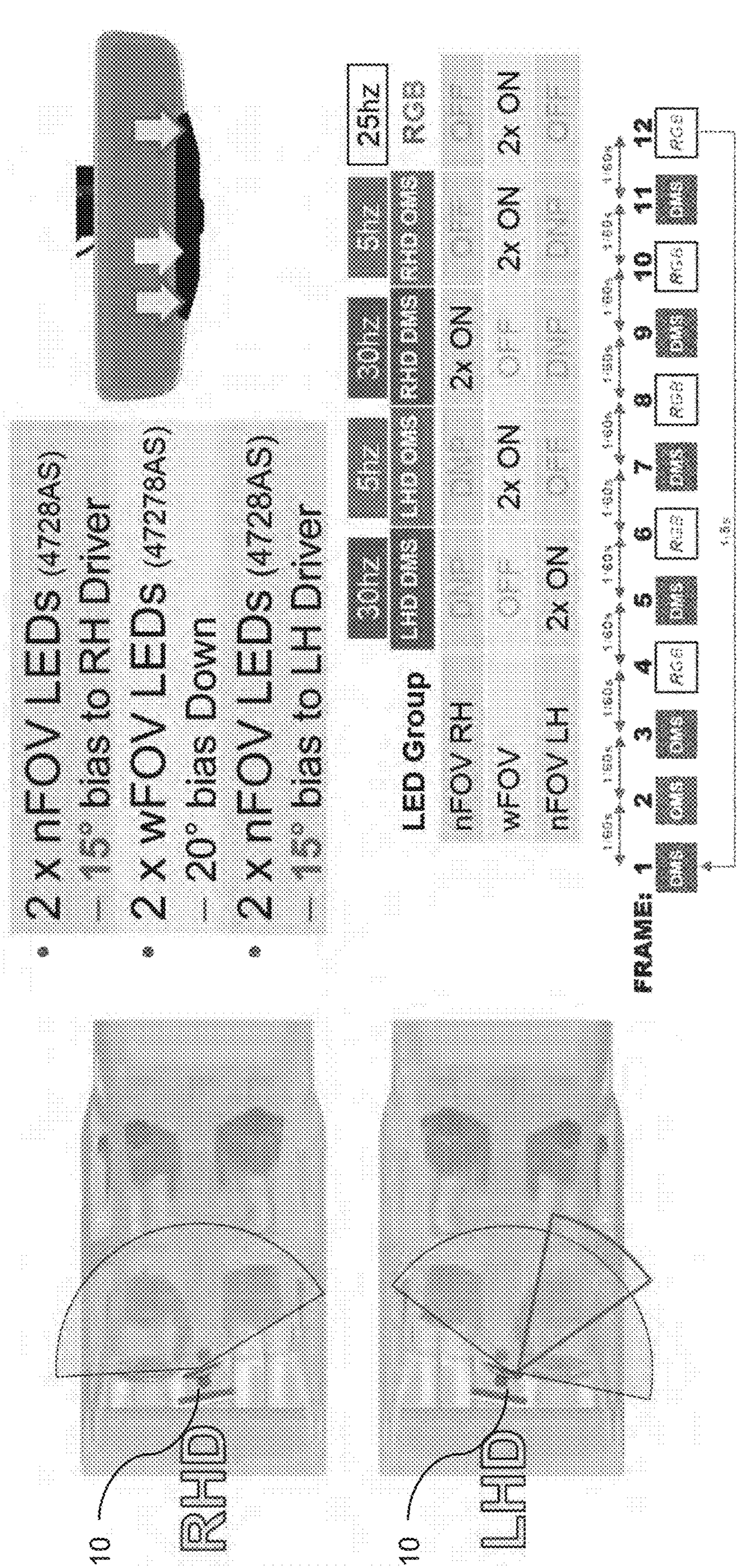
FIG. 61 shows example operating parameters for the mirror assembly.
Figure 62:
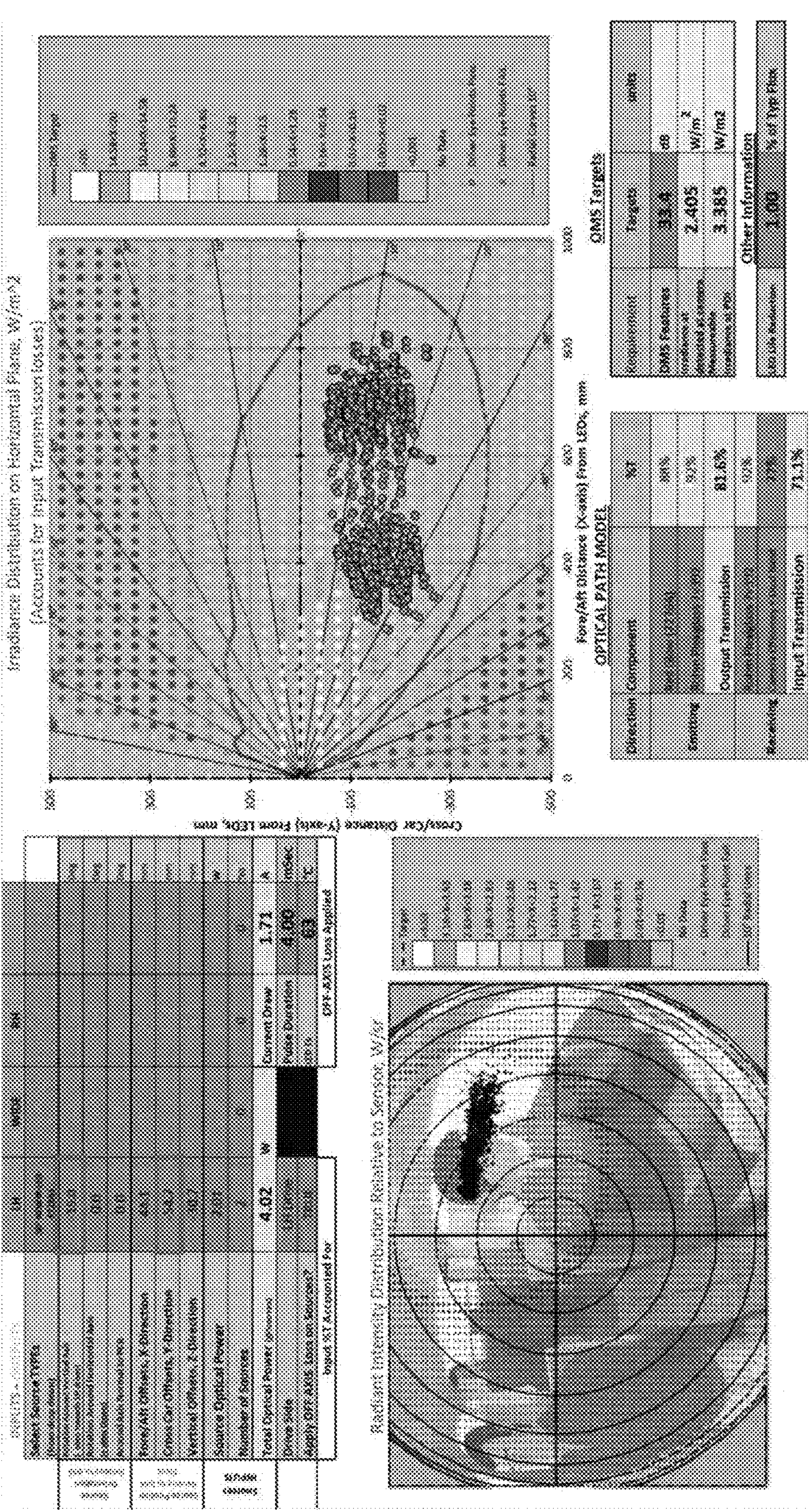
Figure 63:
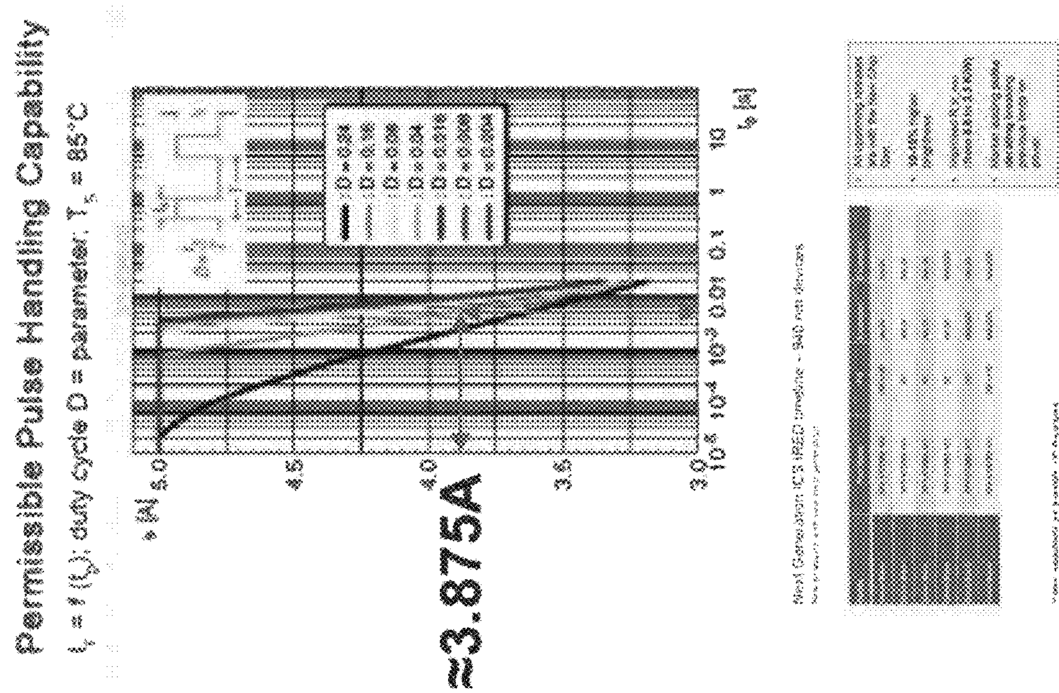
FIGS. 63-70 show example detection data based on image data captured by the camera within the chin portion of the mirror assembly.
Figure 64:
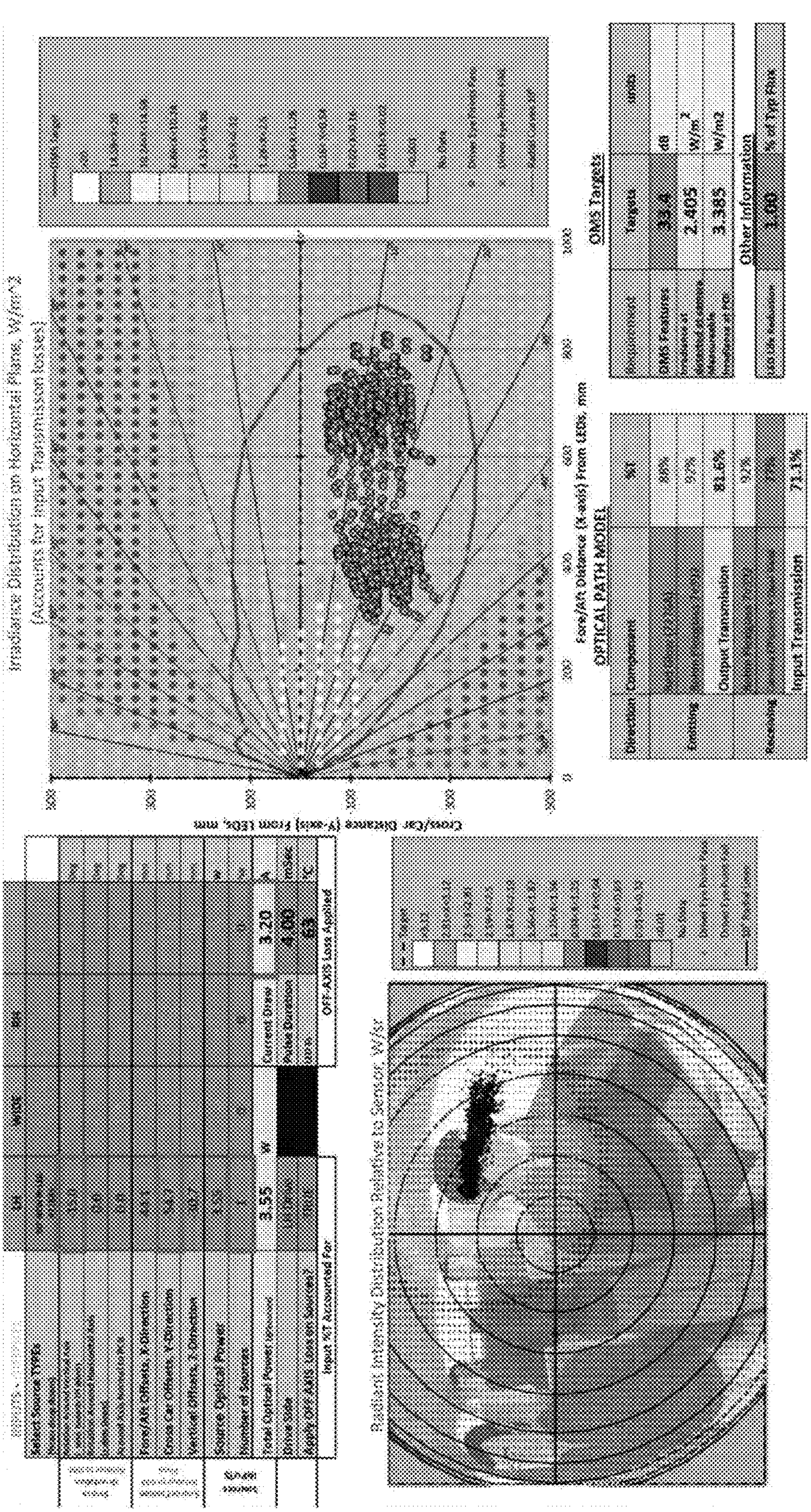
Figure 65:
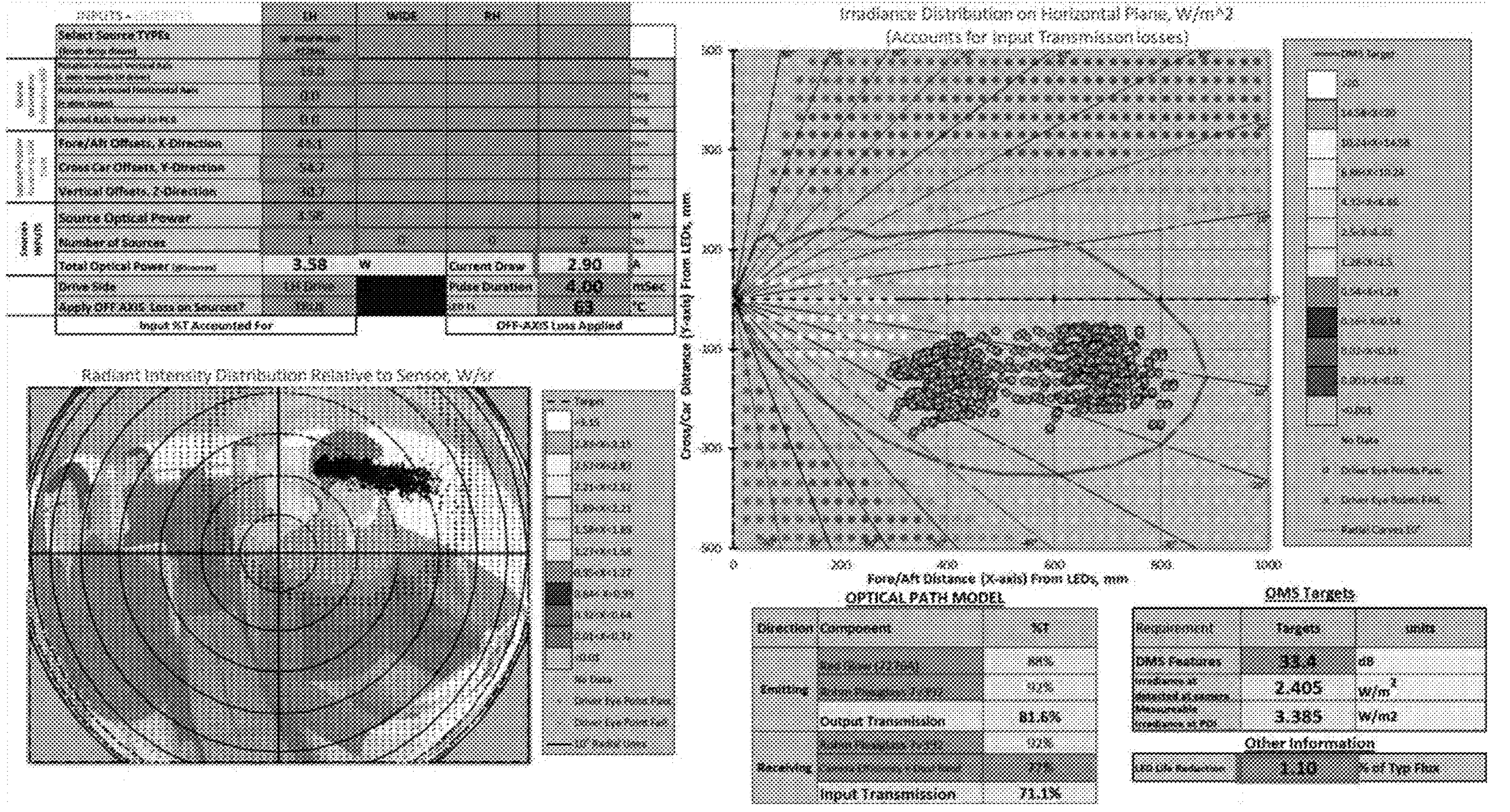
Figure 66:
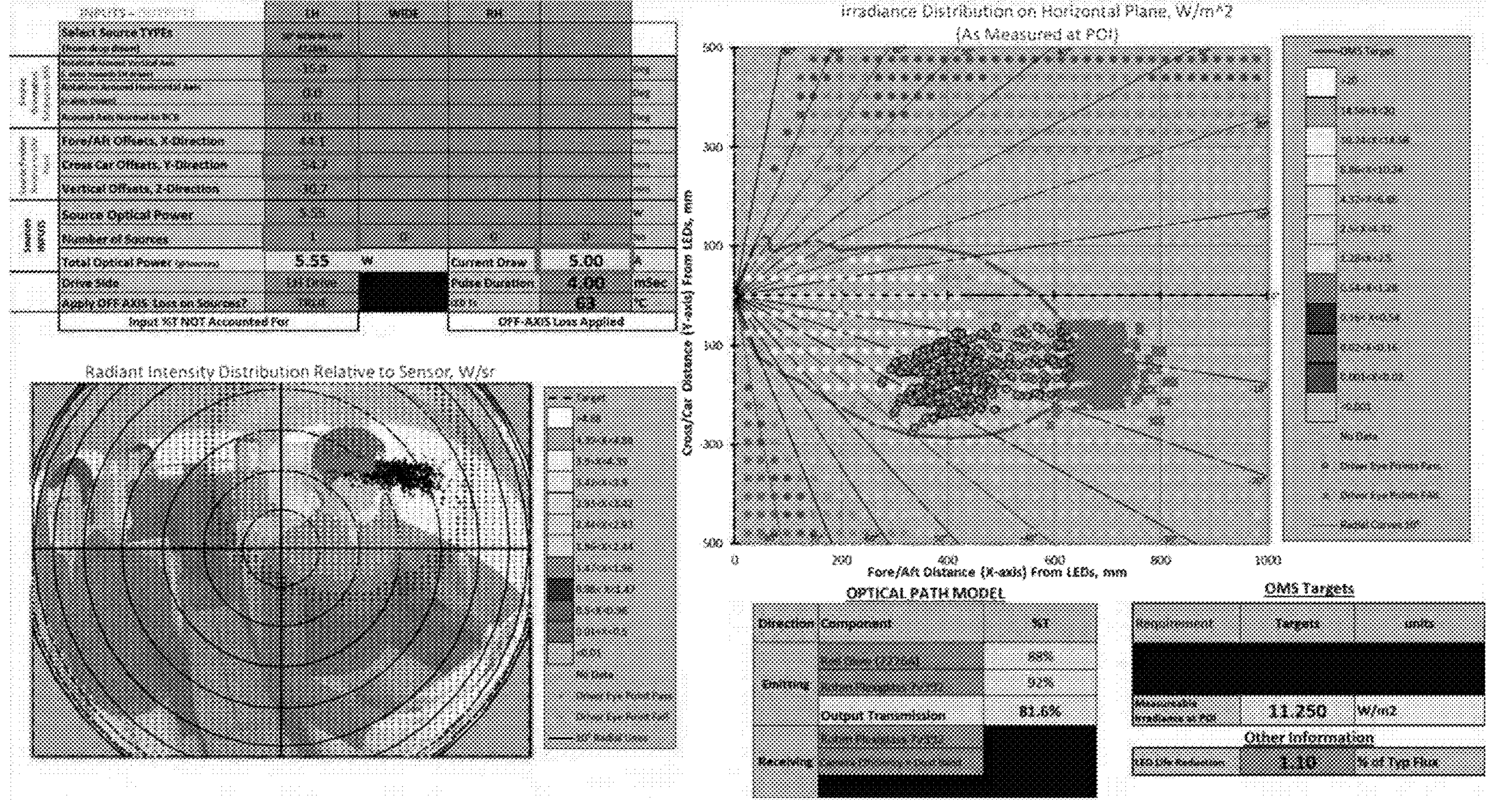
Figure 67:
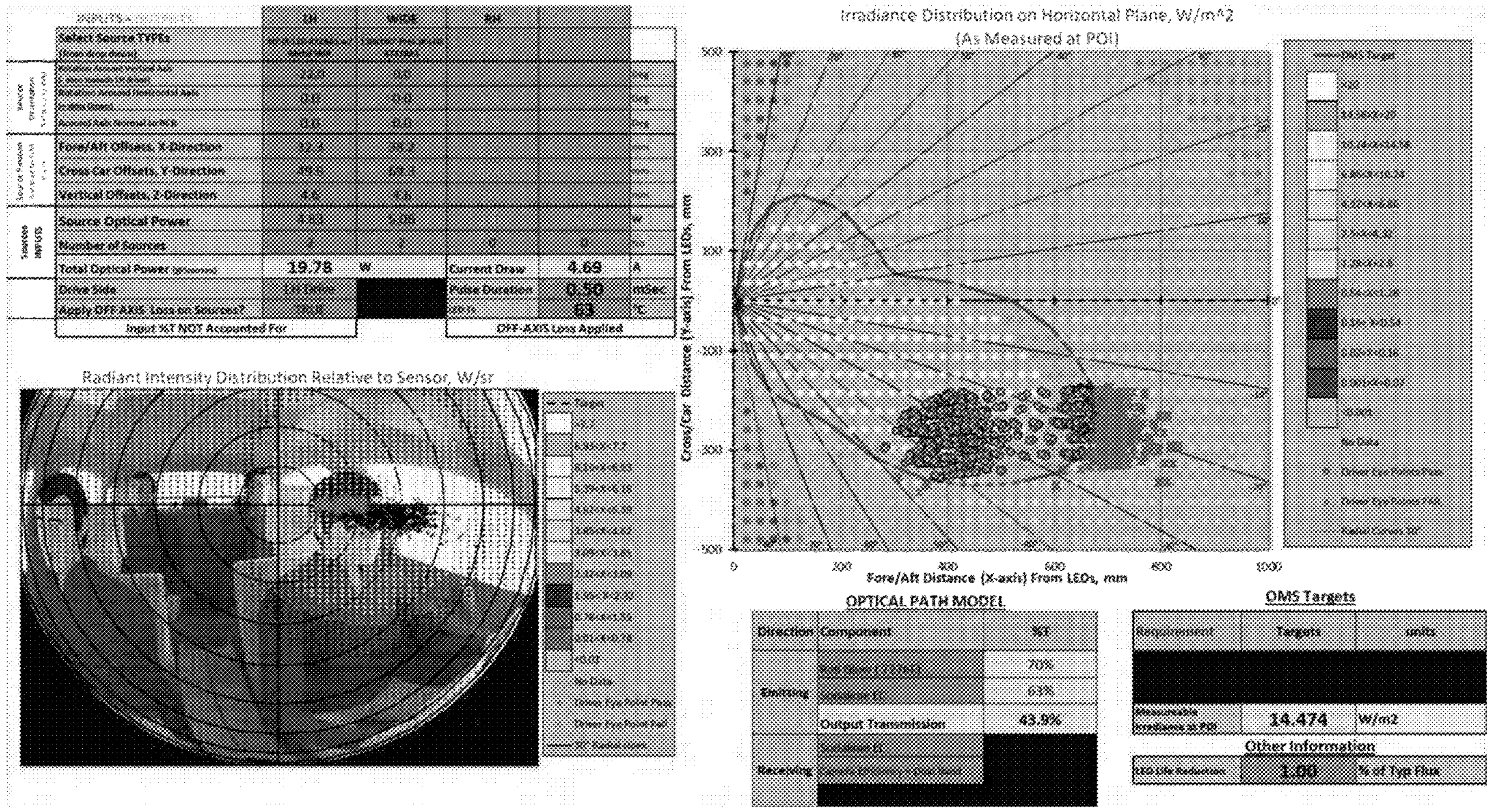

Optionally, and such as shown in FIGS. 60-62, the narrow near IR LEDs may be disposed at the driver's side of the mirror assembly. Thus, the near IR LEDs may be positioned within the chin region closer to the camera without changing the dark pupil angle, and the irradiance of the driver is increased. The field of view of the near IR LEDs may be wider in the cross-car direction, which could widen the cover. The narrow field of view LEDs for RHD DMS image data capture may be biased or angled about 15 degrees toward the driver of the RHD vehicle. The narrow field of view LEDs for LHD DMS image data capture may be biased or angled about 15 degrees toward the driver of the LHD vehicle. The wide field of view LEDs for OMS image data capture may be biased or angled about 20 degrees downward from the mirror head (e.g., relative to a plane of the mirror reflective element).

Optionally, and such as shown in FIGS. 63-67, instead of using two narrow near IR LEDs, the mirror assembly may include one singular near IR LED with an increased current draw. For example, the pulse handling capability limit may be about 3.875 amps. This may result in lowered cost.

Figure 68:
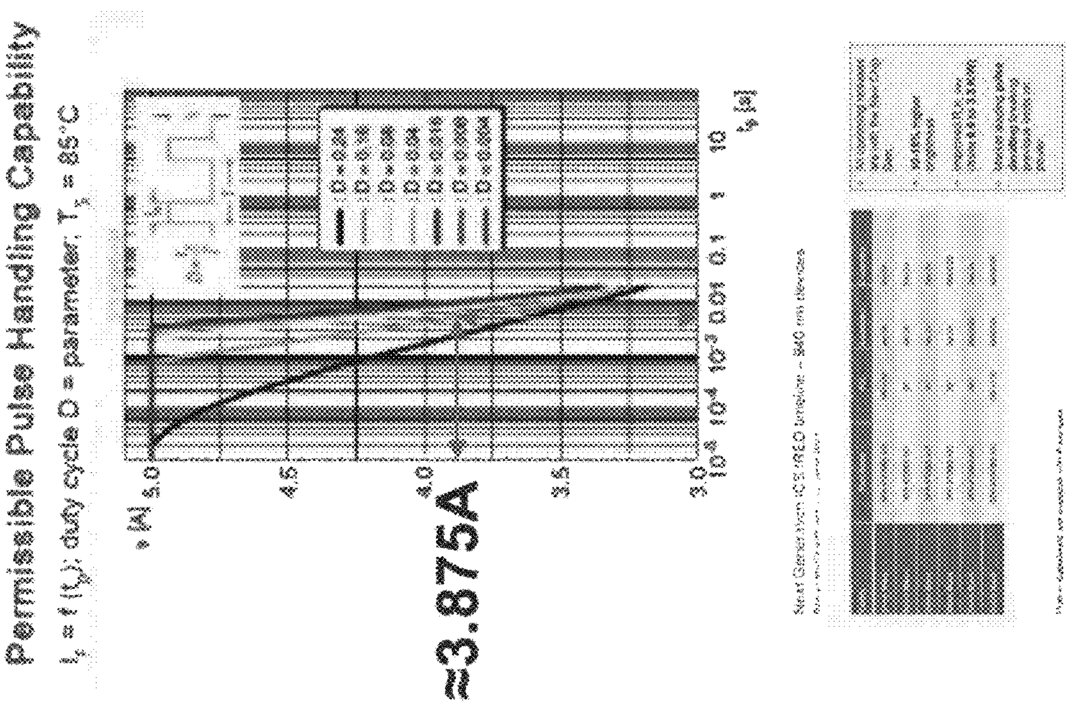
Figure 69:
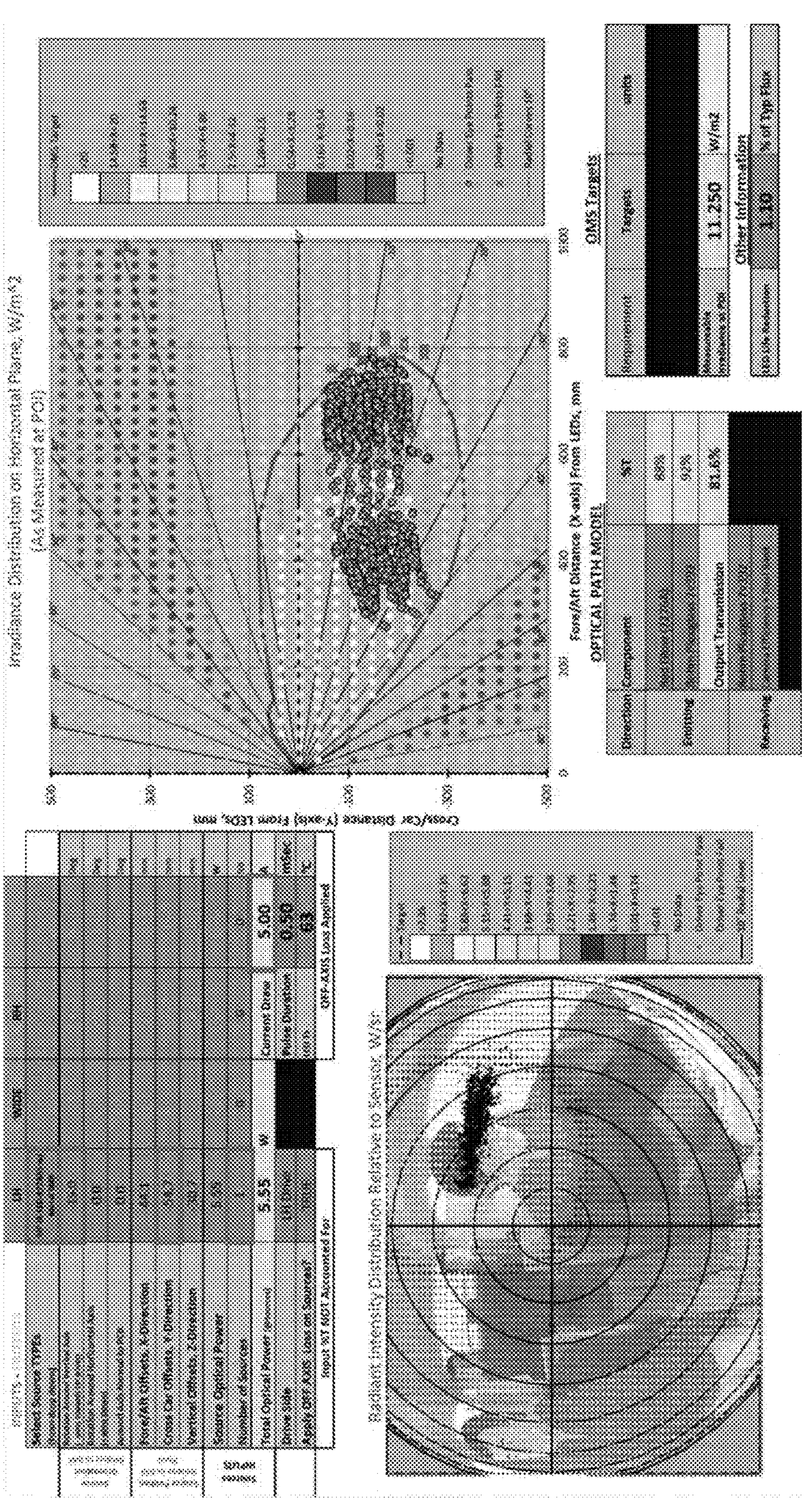
Figure 70:
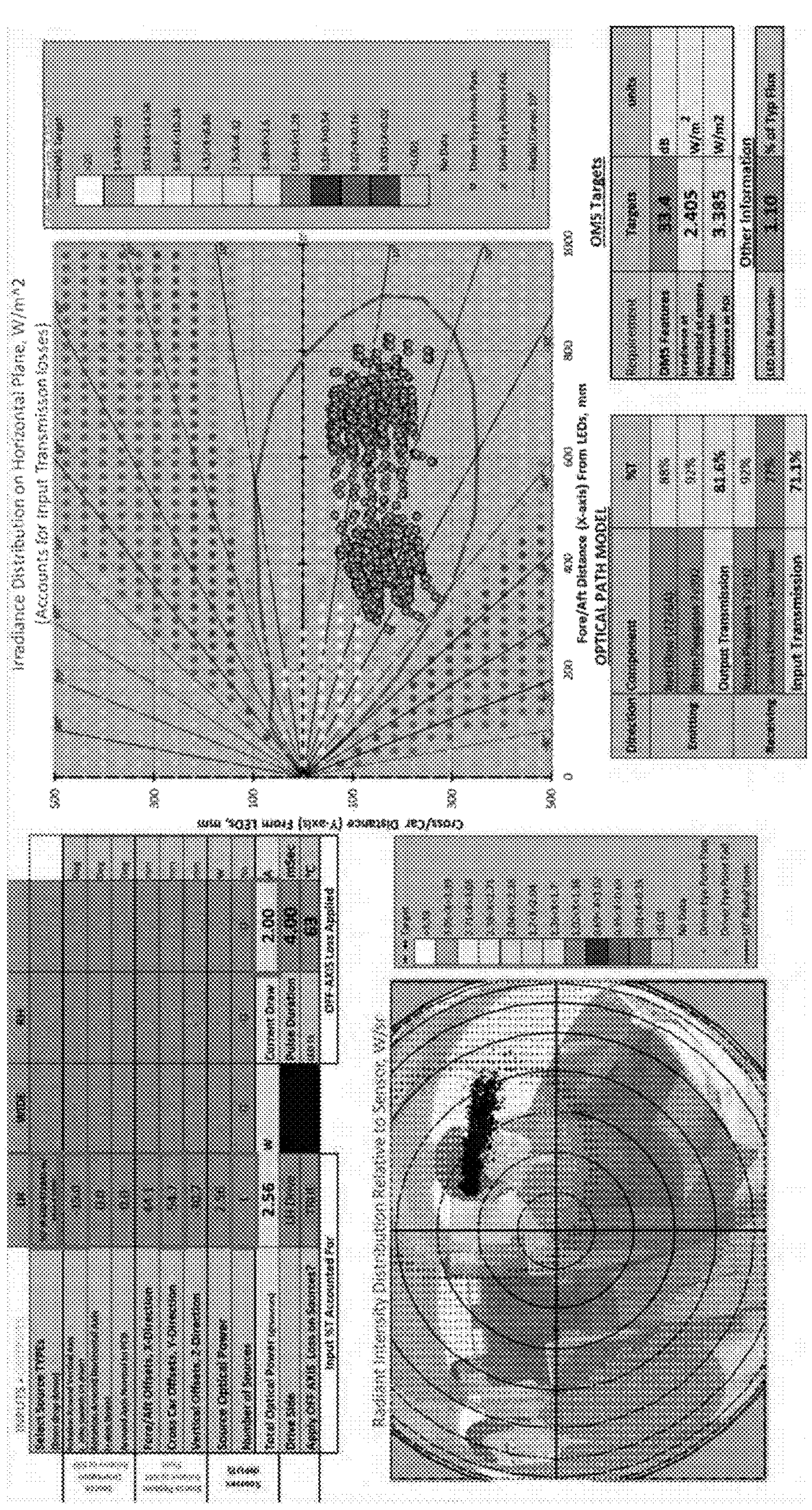
Figure 71:
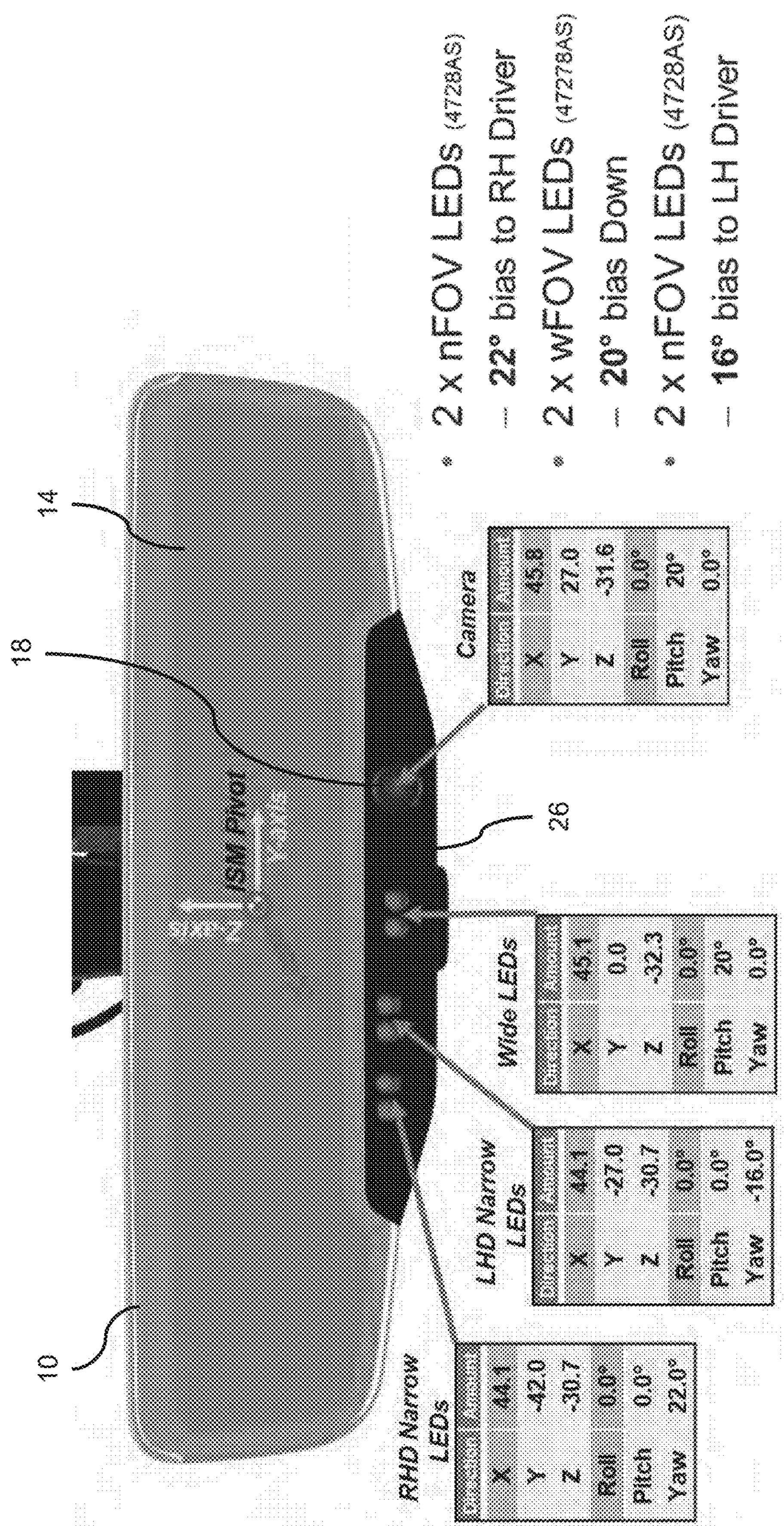
FIG. 71 shows an example position of the camera and near IR LEDs behind the chin cover within the chin portion of the mirror assembly.
Figure 72:
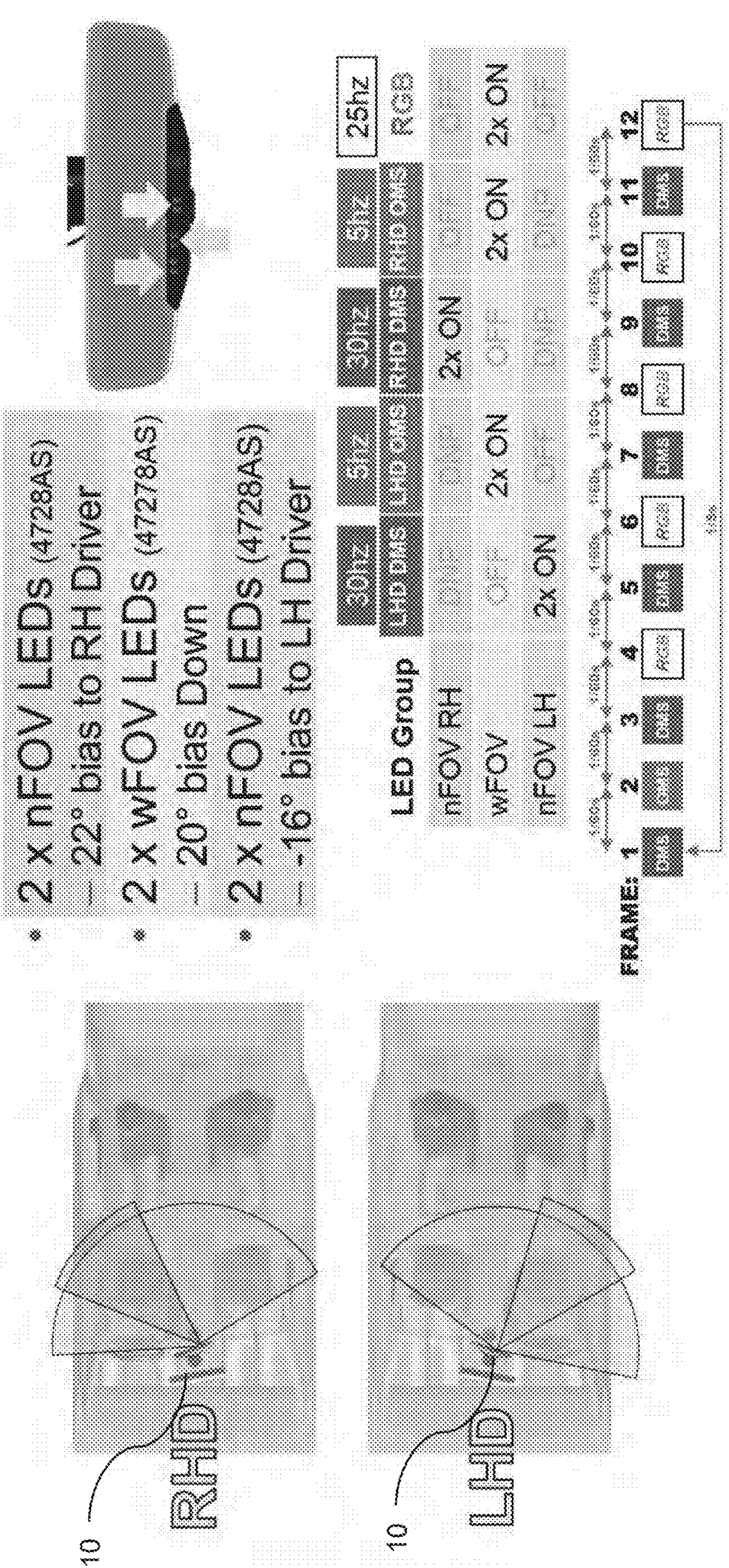
FIG. 72 shows example operating parameters for the mirror assembly.
Figure 73:
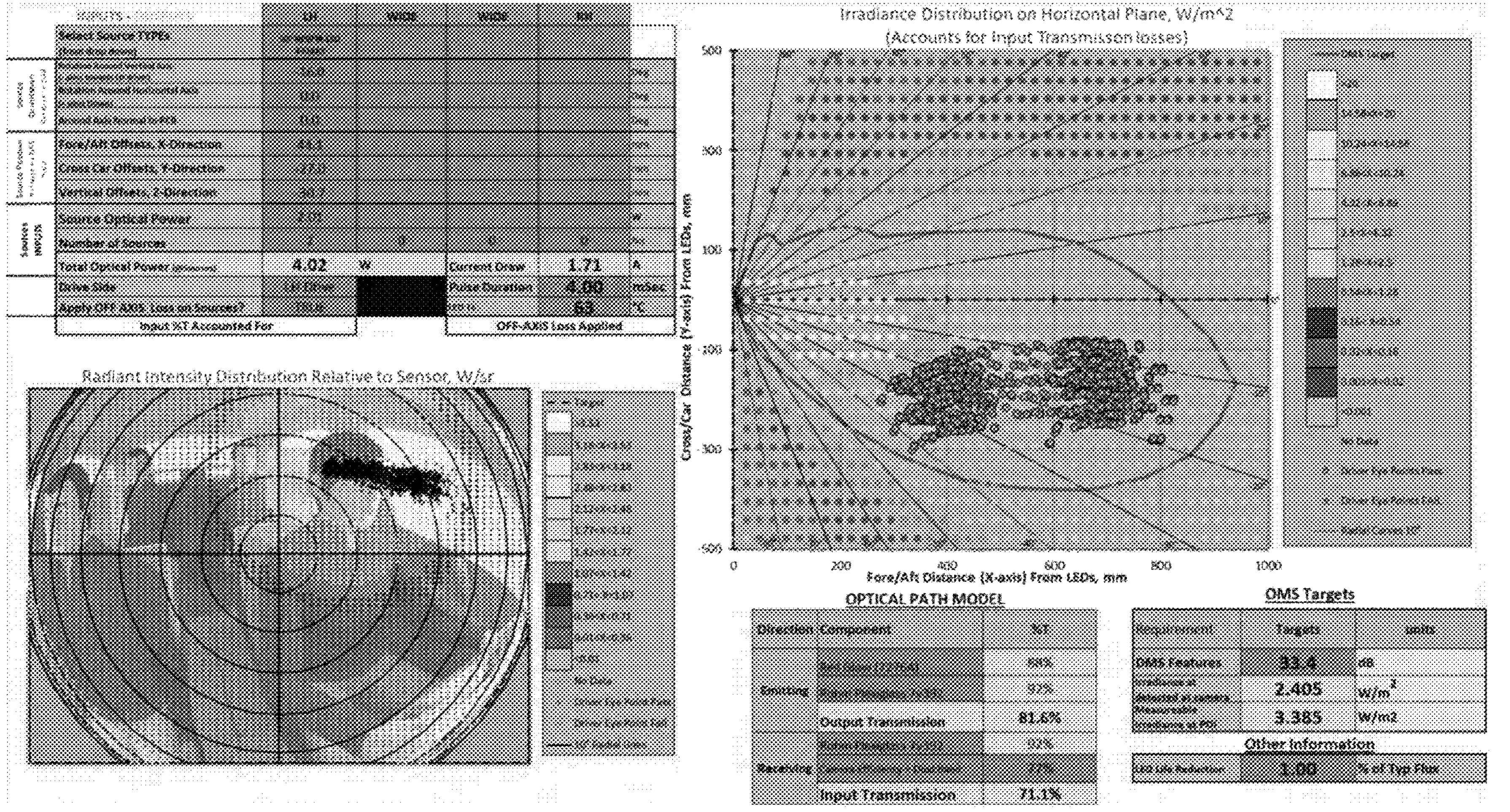
FIGS. 73-77 show example detection data based on image data captured by the camera within the chin portion of the mirror assembly.
Figure 74:
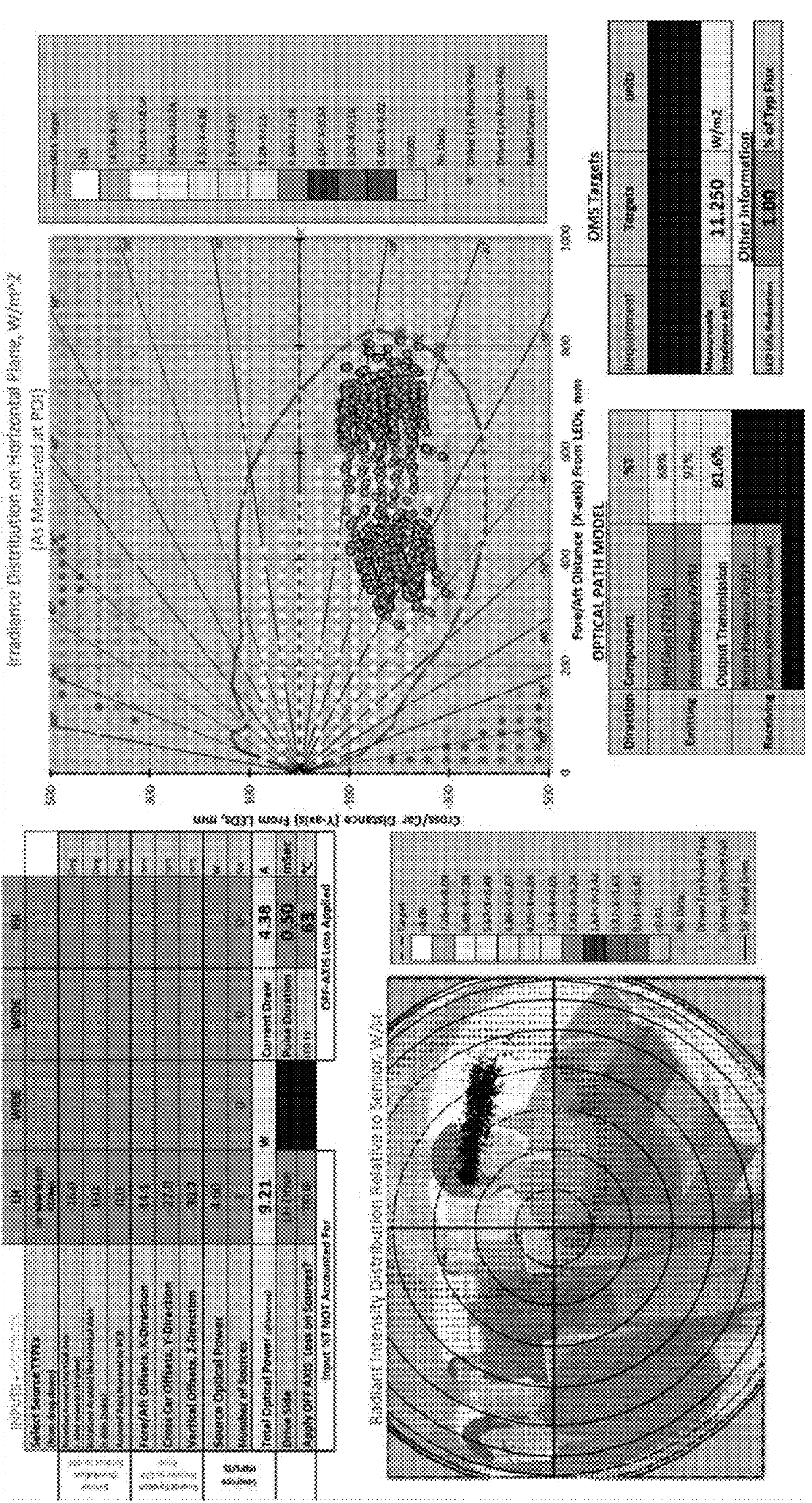
Figure 75:
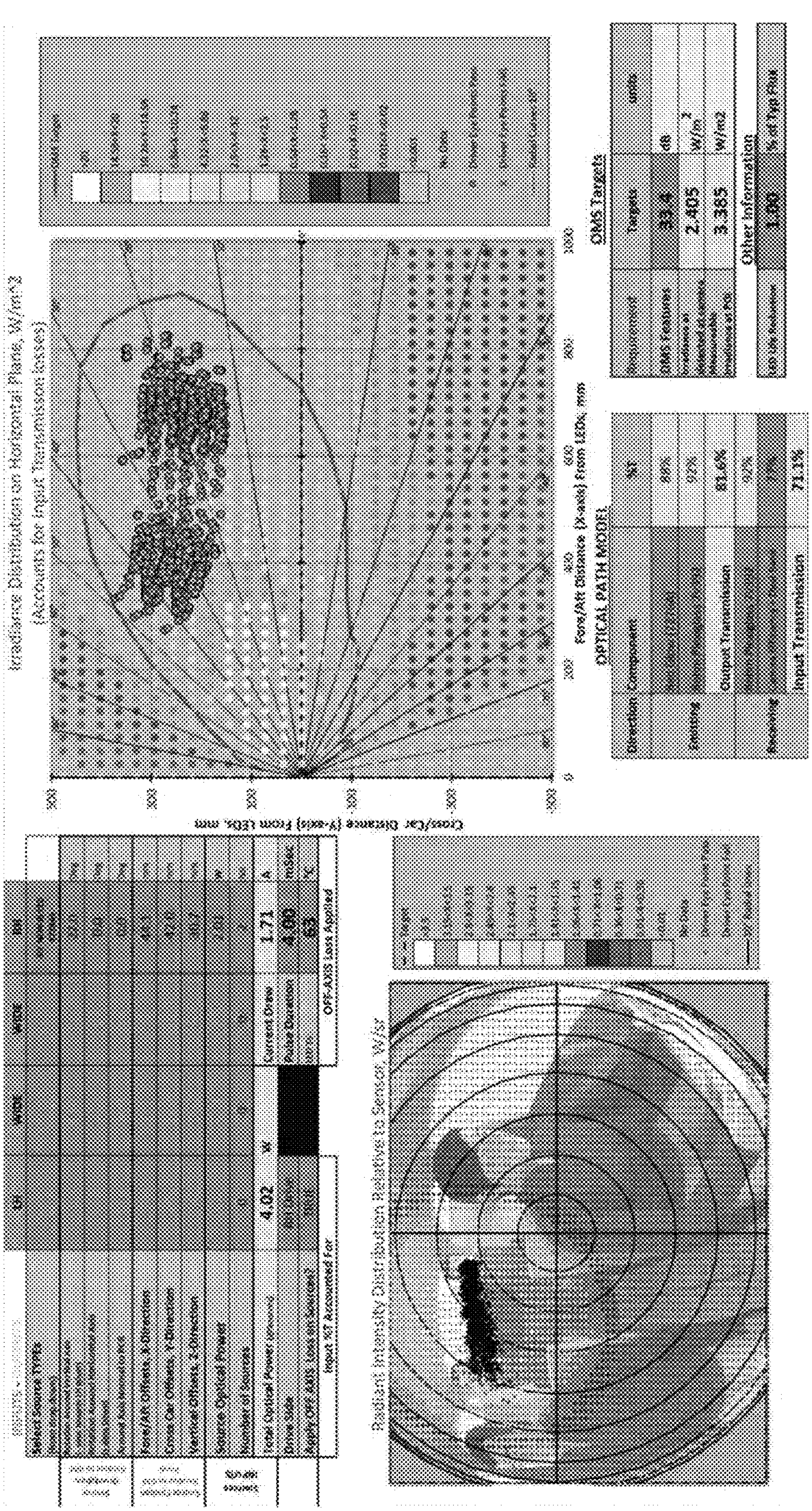
Figure 76:
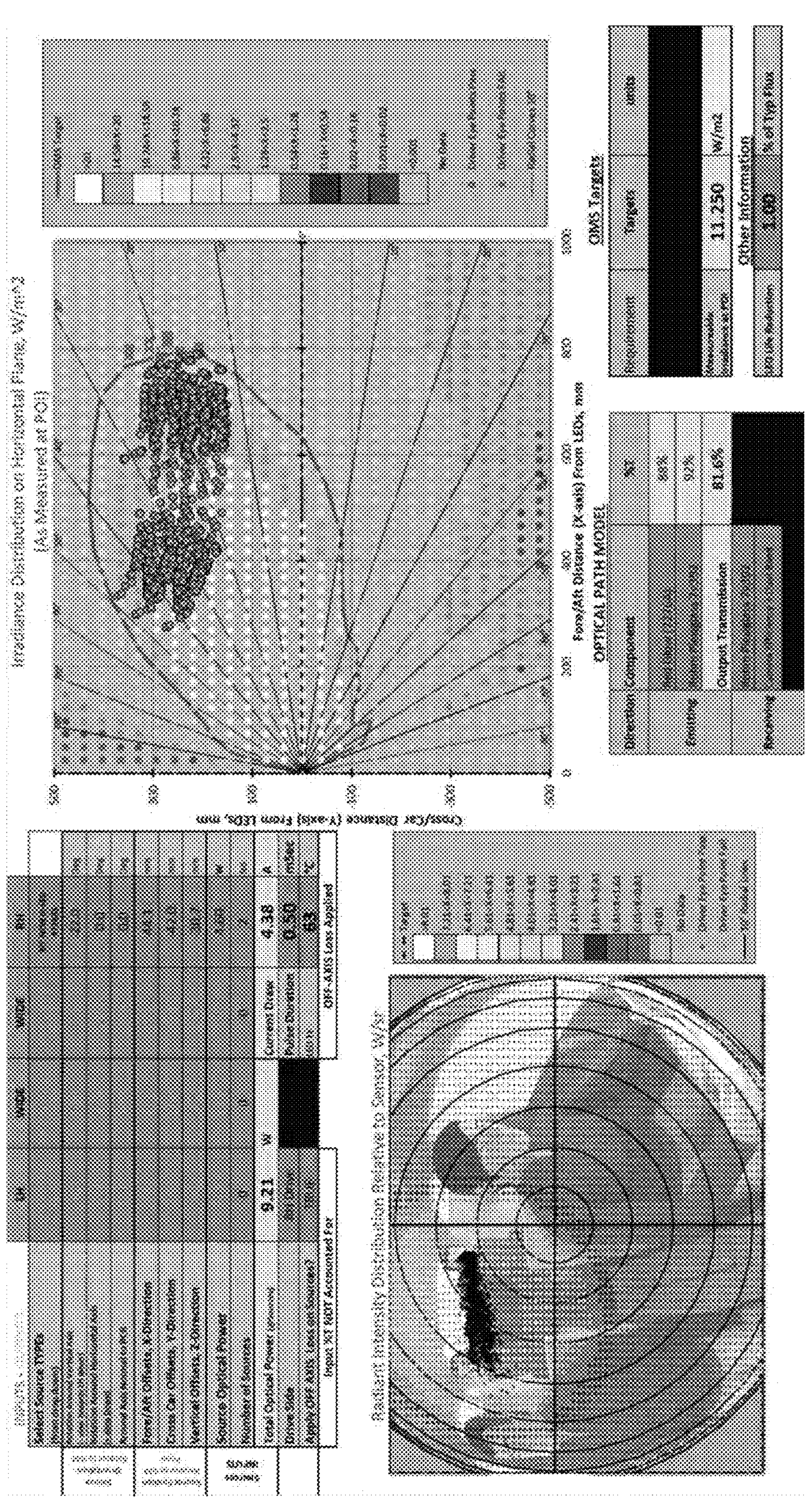
Figure 77:
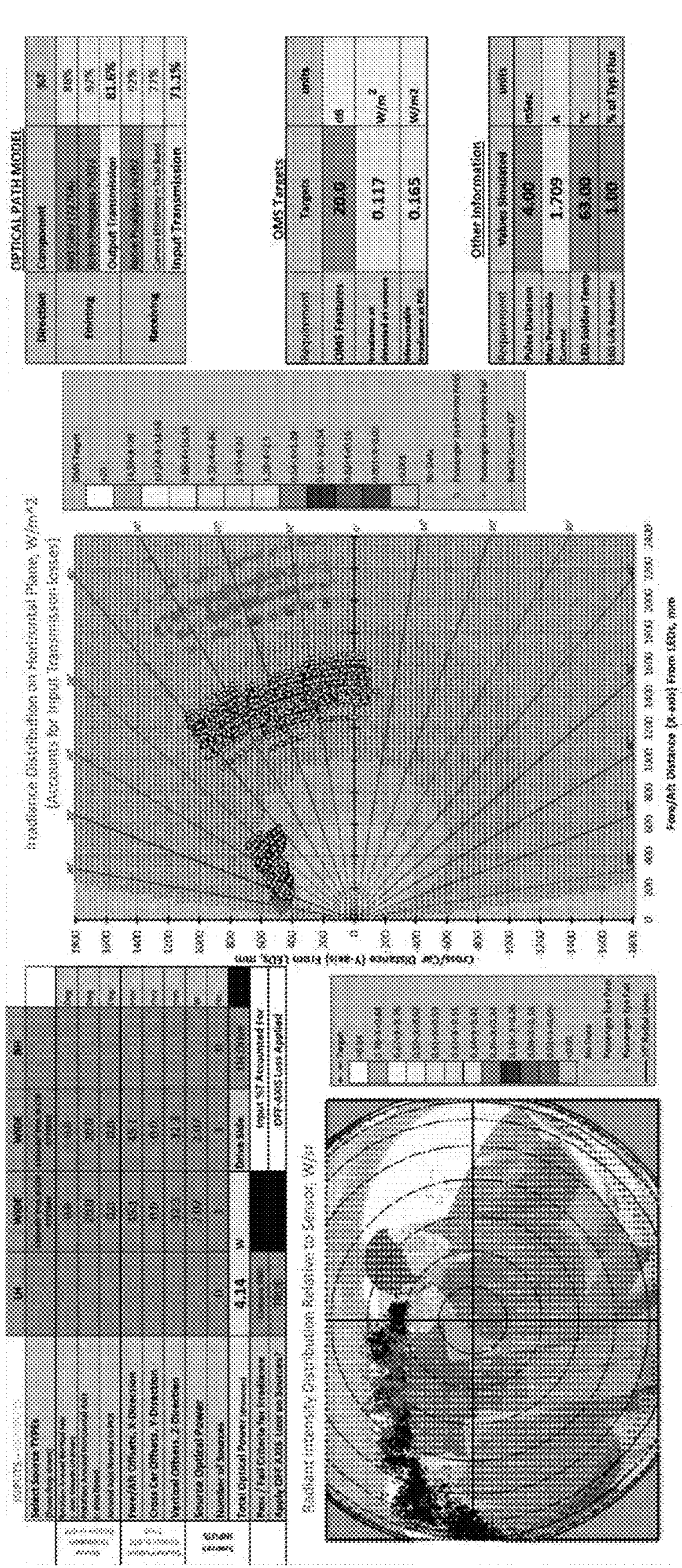

Optionally, and such as shown in FIGS. 68-70, instead of using two narrow near IR LEDs, the mirror assembly may include one singular near IR LED and a structure mini round (SMR) LED. This may lower cost compared to a two LED system, and meet ARR targets, with an increased current draw.

Referring to FIGS. 71-77, the mirror assembly 10 may include the DMS camera 18 offset from the center portion of the chin region 26 and at a 20 degree angle relative to the mirror reflective element 14. The chin cover 28 may be at a 20 degree angle relative to the mirror reflective element 14. The wide view near IR LEDs or OSM IR LEDs may be at the center portion of the chin region 26 and disposed at a 20 degree angle relative to the mirror reflective element 14. The OSM IR LEDs may be disposed on the same PCB as the camera imager. The narrow view near IR LEDs or DMS LEDs for RHD vehicles may be disposed at the opposite side portion of the chin region from the DMS camera 18, with the narrow view near IR LEDs or DMS LEDs for LHD vehicles disposed between the RHD DMS LEDs and the OSM LEDs. The RHD DMS LEDs may be angled toward the driver's side of the vehicle, such as at an angle of about 22 degrees and the LHD DMS LEDs may be angled toward the passenger's side of the vehicle, such as at an angle of about 16 degrees. Thus, the mirror assembly may be suitable for use in both LHD vehicles and RHD vehicles.

Figure 78:
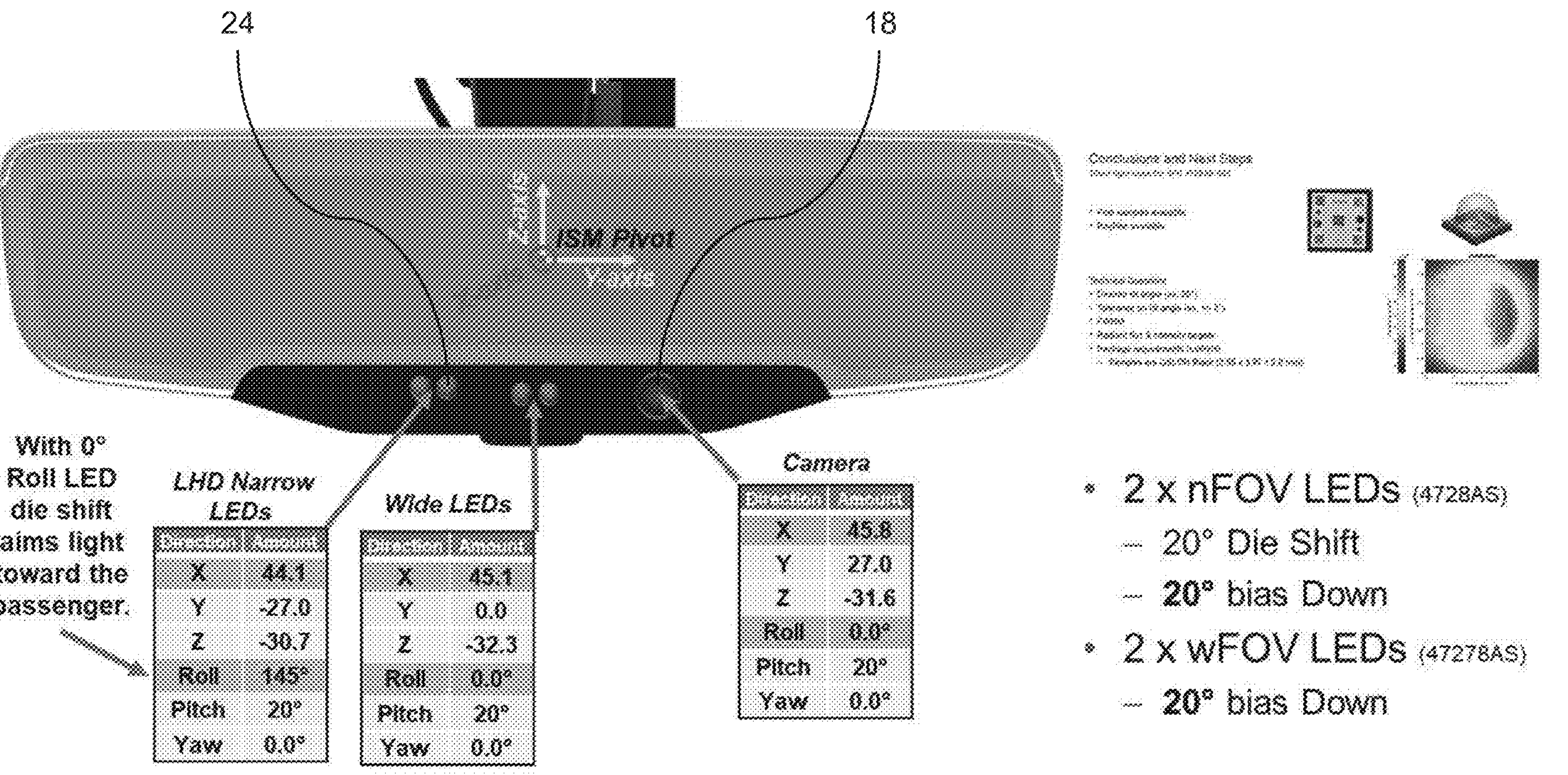
FIG. 78 shows an example position of the camera and near IR LEDs behind the chin cover within the chin portion of the mirror assembly.
Figure 79:
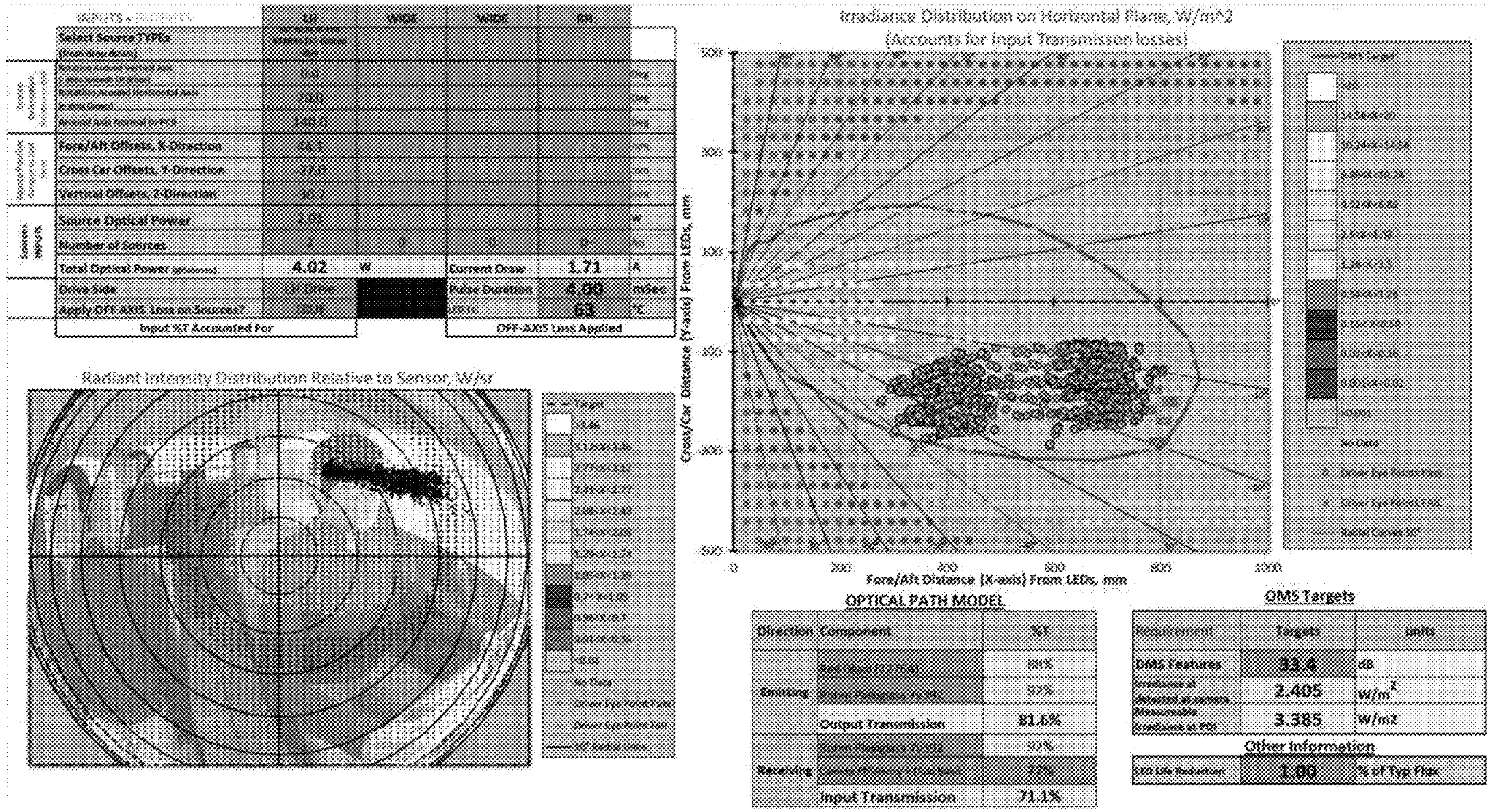
FIGS. 79-82 show example detection data based on image data captured by the camera within the chin portion of the mirror assembly.

Optionally, the dye or light emitter of the near IR LED may be rotated or titled relative to the PCB to direct light at an angle relative to the PCB. Thus, the light emitted by the near IR LED may be directed at an angle relative to the PCB without orienting or angling the near IR LED at the angle. For example, FIGS. 78 and 79 depict the mirror assembly having the near IR LEDs 24 and the camera 18 disposed on the same PCB, and thus disposed at an angle of about 20 degrees relative to the mirror reflective element. The near IR LEDs for driver monitoring may be rotated about an axis perpendicular to the PCB by about 145 degrees to direct the light toward the driver of a LHD vehicle.

Figure 81:
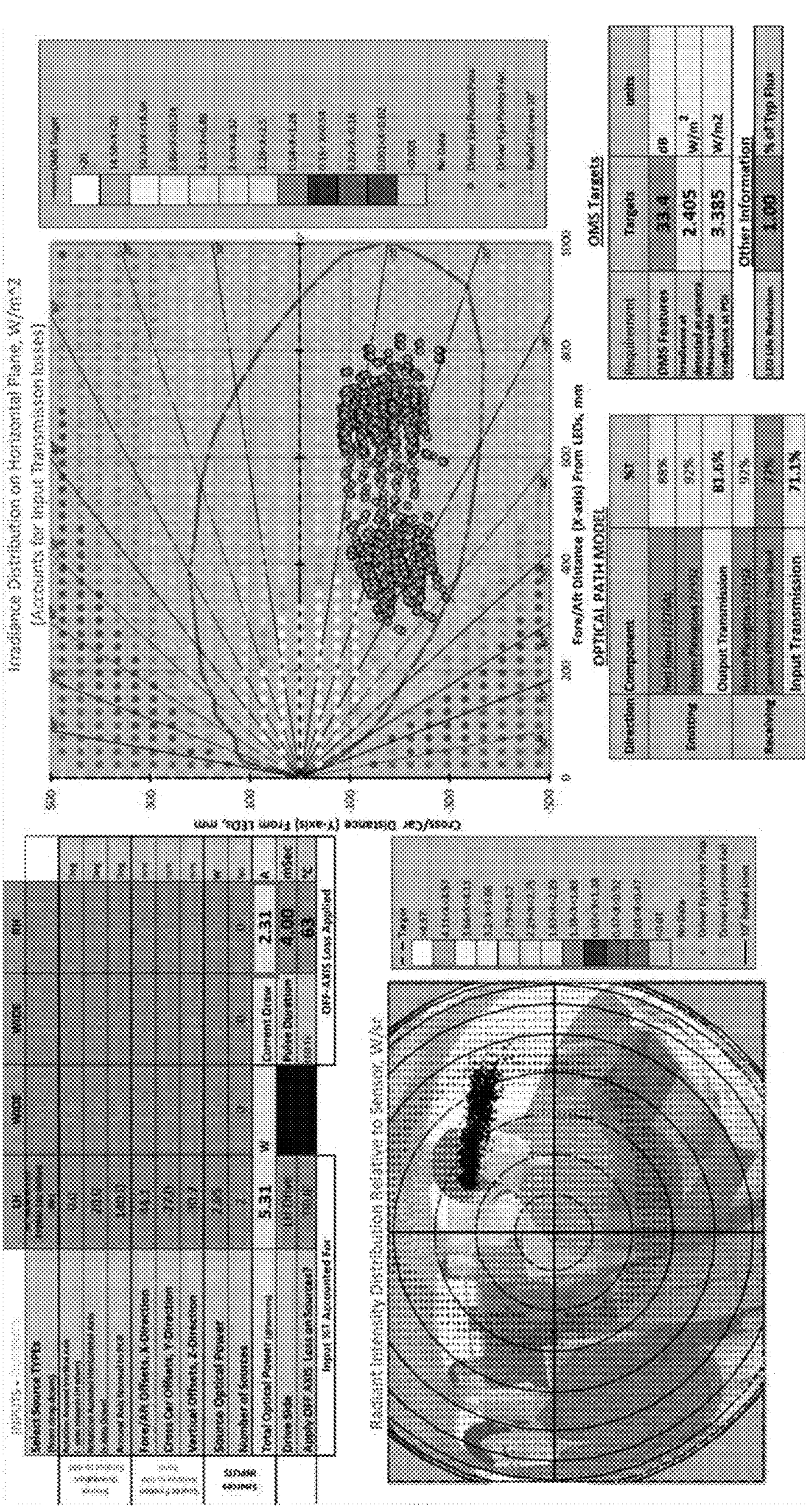
Figure 82:
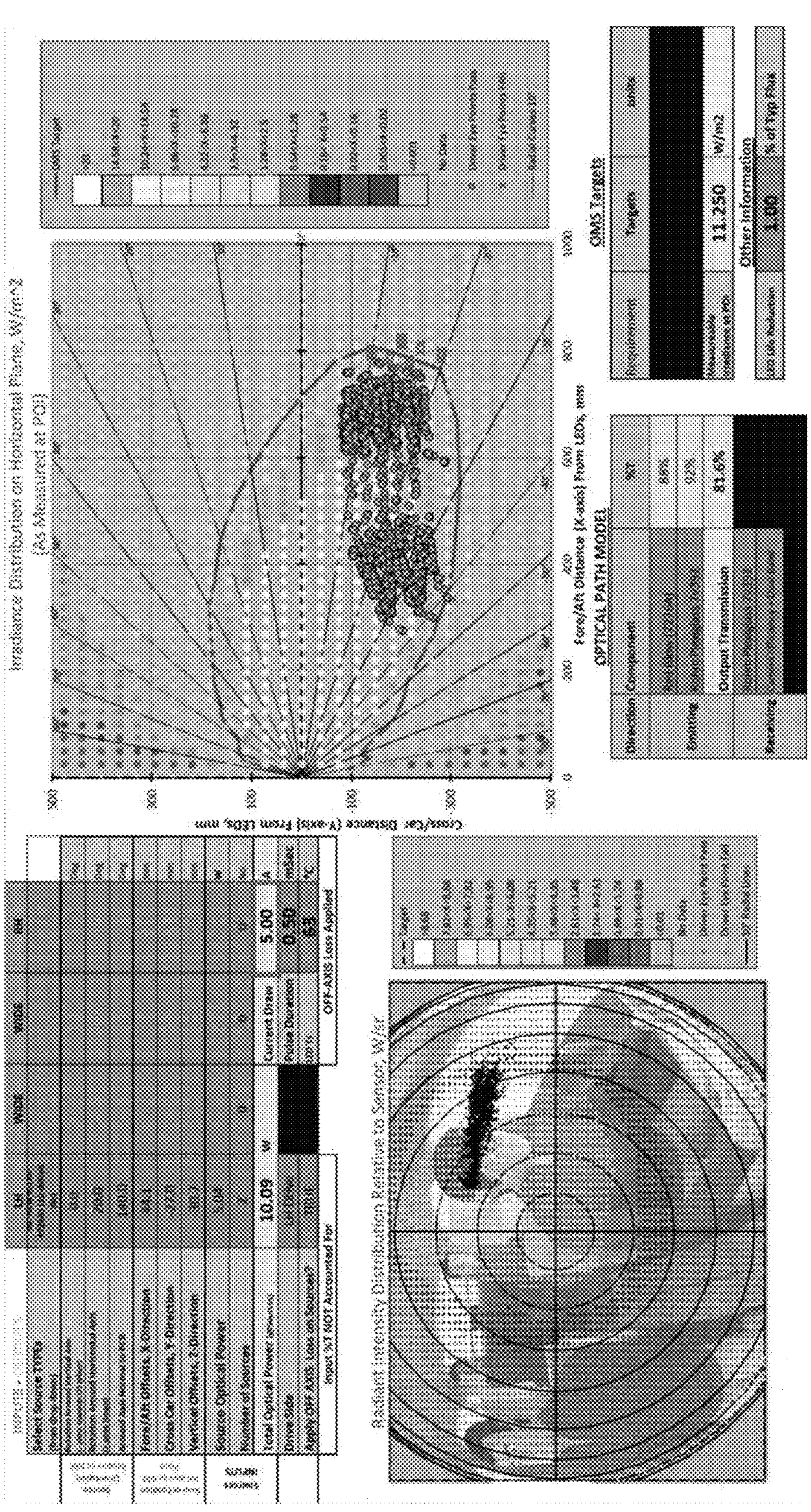
Figure 83:
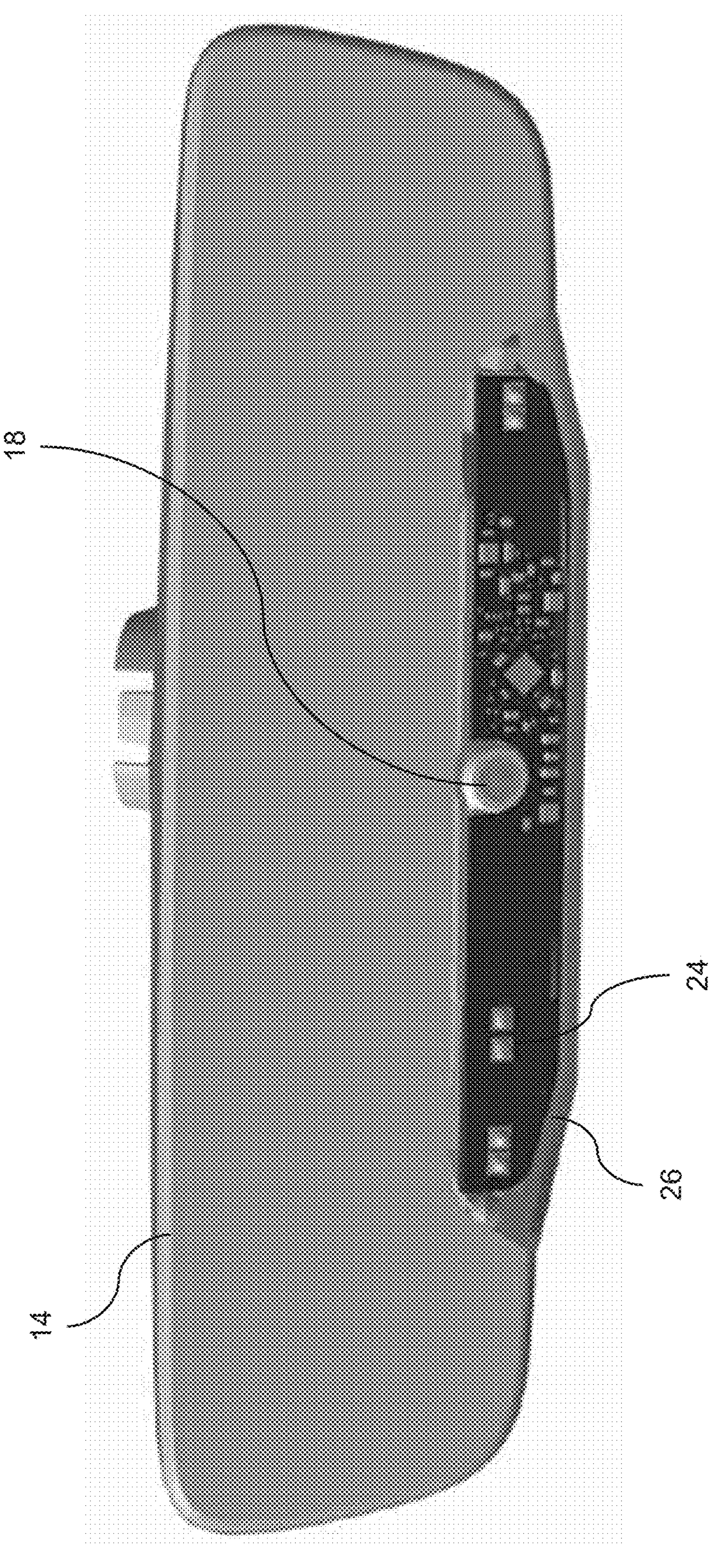
FIG. 83 shows an example position of the camera and near IR LEDs at a PCB within the chin portion of the mirror assembly.
Figure 84:
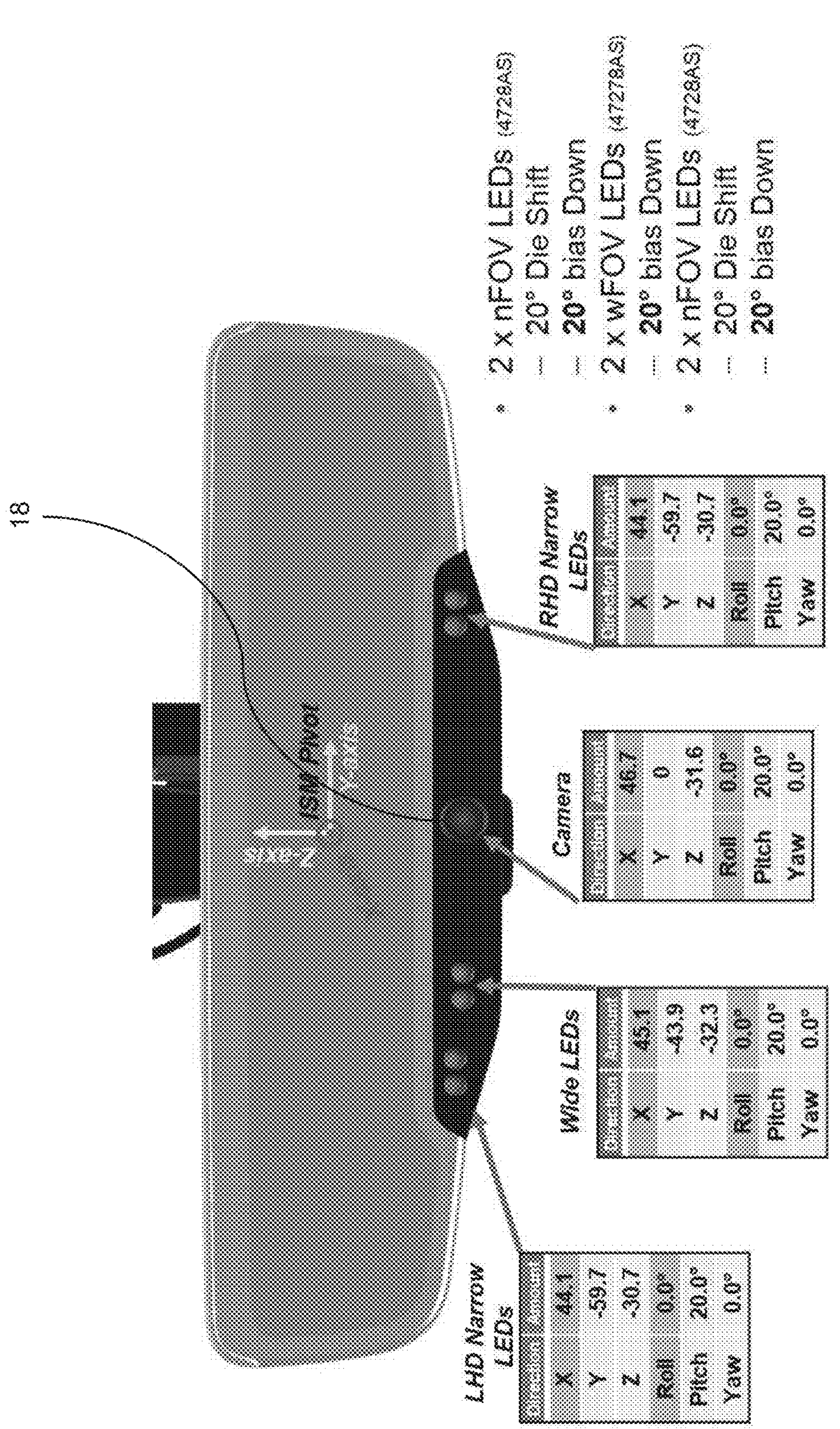
FIG. 84 shows an example position of the camera and near IR LEDs behind the chin cover within the chin portion of the mirror assembly.
Figure 85:
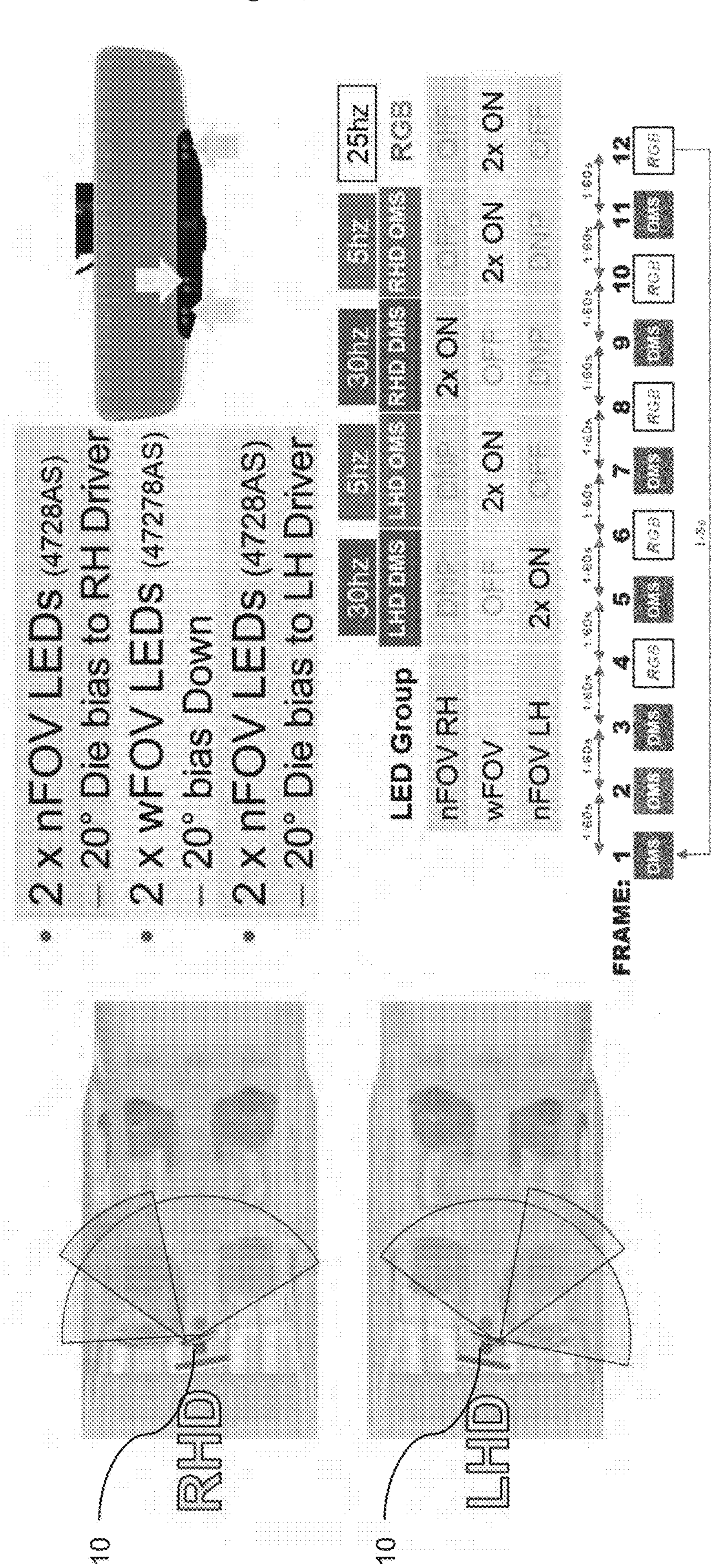
FIG. 85 shows example operating parameters for the mirror assembly.
Figure 86:
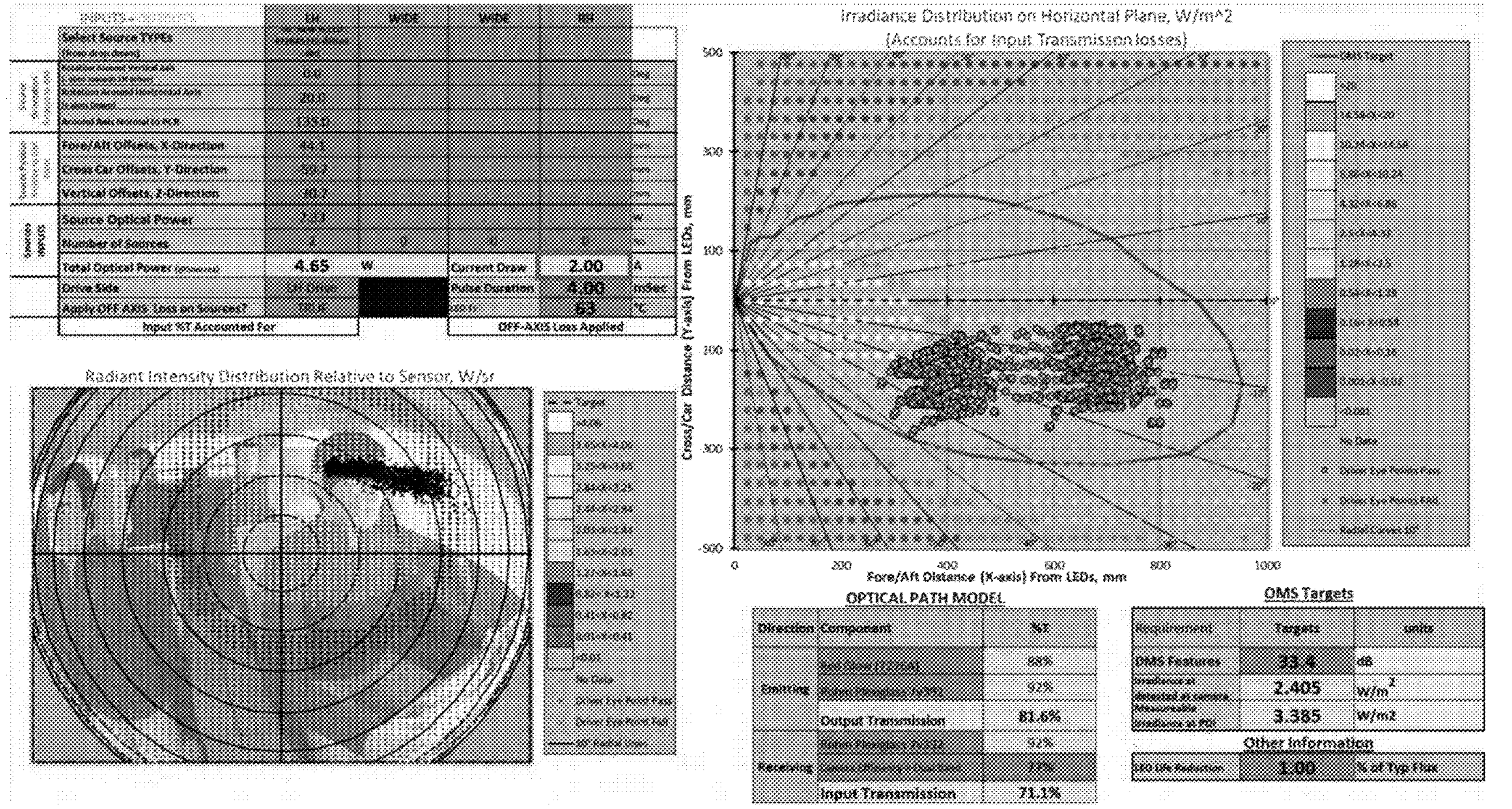
FIGS. 86 and 87 show example detection data based on image data captured by the camera within the chin portion of the mirror assembly.
Figure 87:
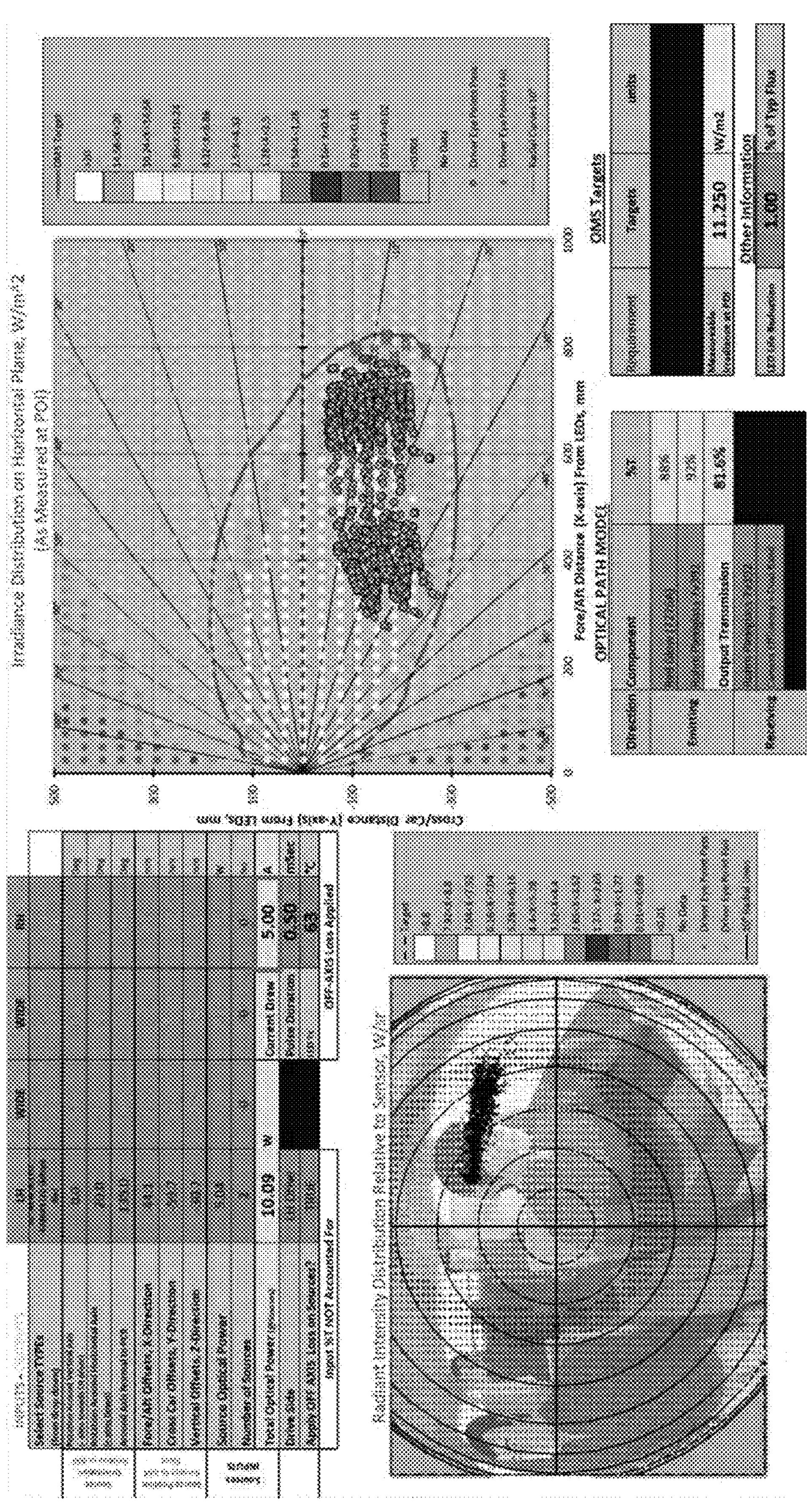
Figure 88:
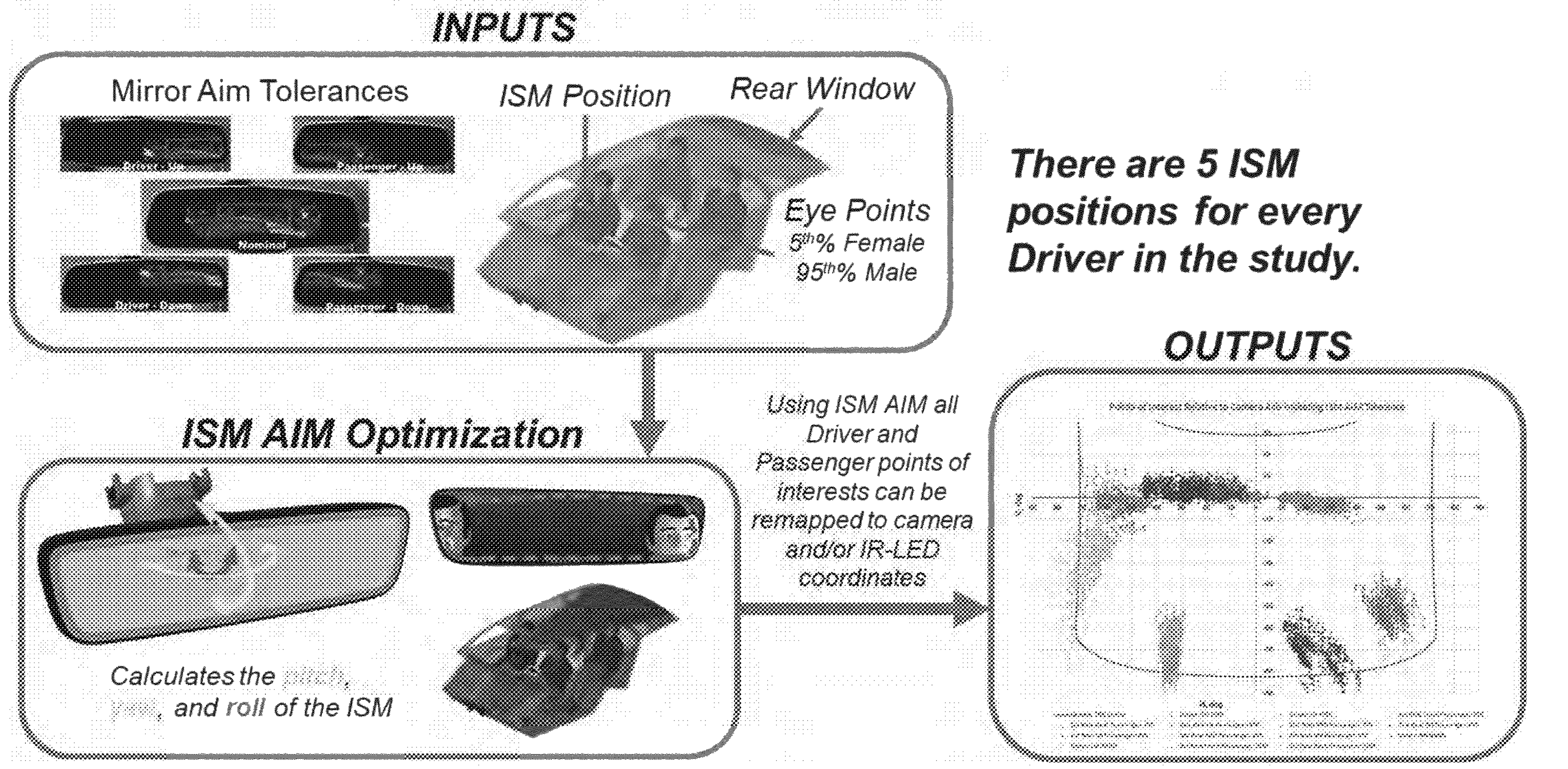
Figure 92:
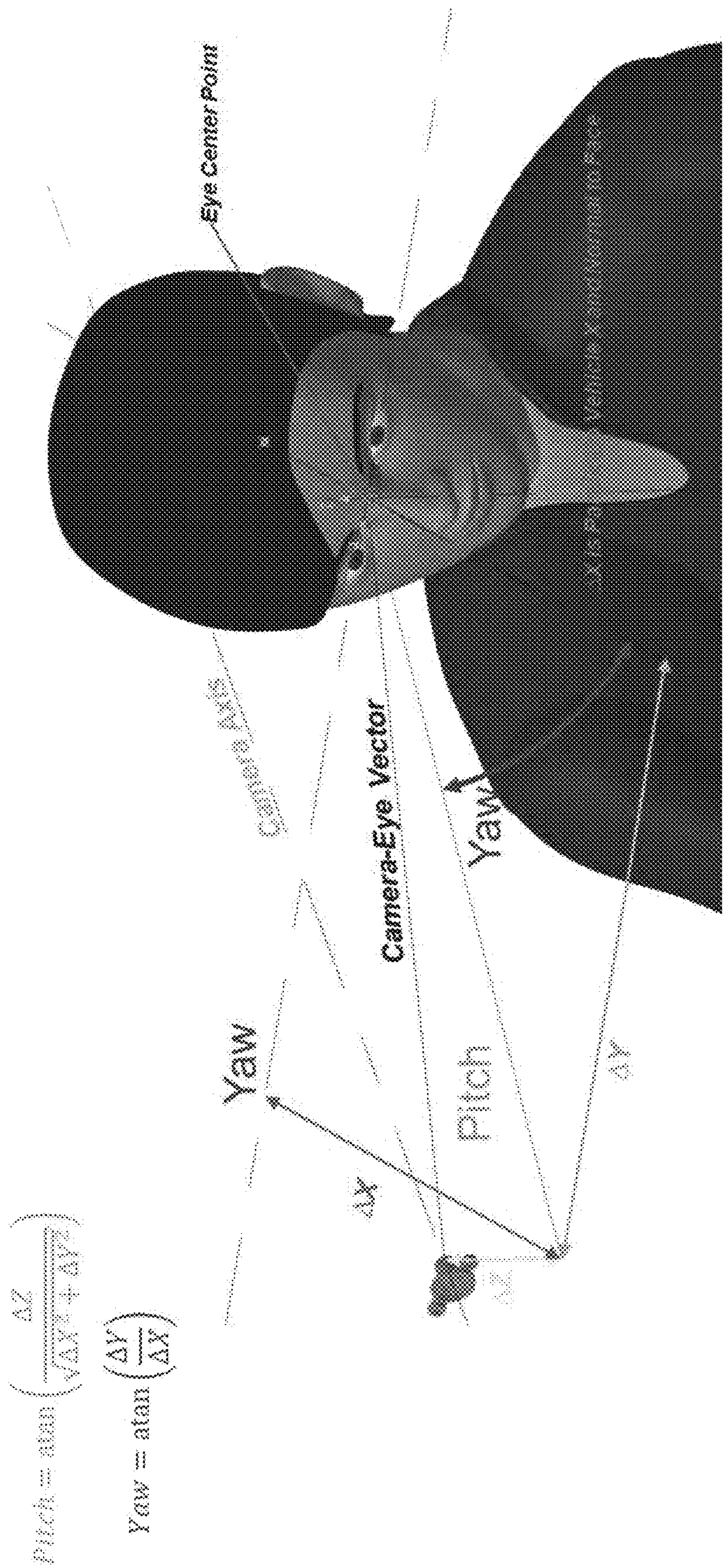
Figure 93:
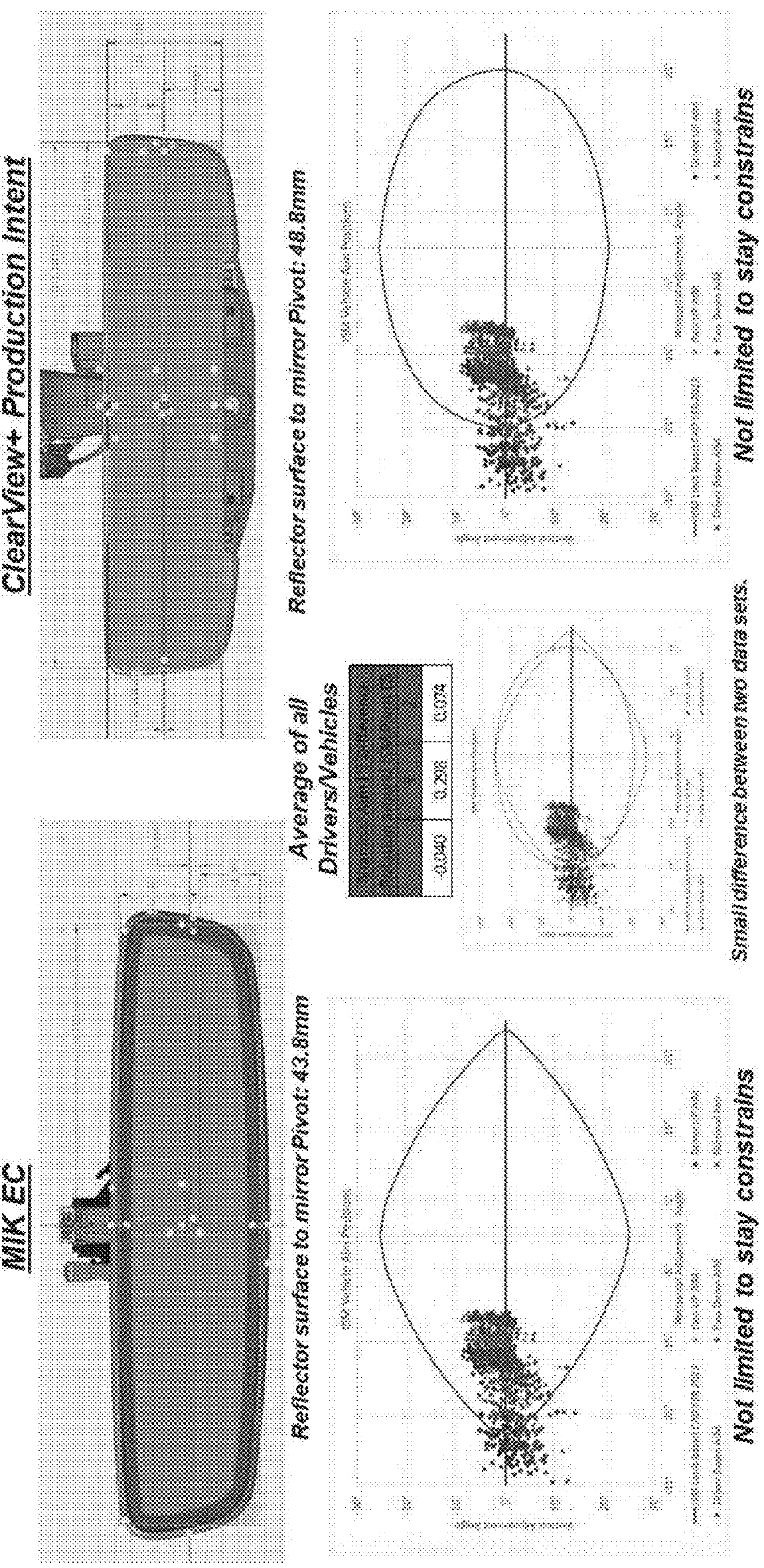
FIG. 93 shows example detection data based on image data captured by a camera behind the mirror reflective element of a mirror assembly and detection data based on image data captured by the camera within the chin portion of the mirror assembly.

Thus, with the PCB disposed at an angle relative to the mirror reflective element (such as an angle of about 20 degrees) and the camera imager accommodated at the angled PCB, the die of the LEDs may be shifted or rotated (such as by an angle of about 20 degrees) to direct light toward the driver region of the interior cabin of the vehicle. A larger or smaller die shift may be utilized. This allows the LEDs and camera to be positioned on a common or shared rigid PCB, or at least on PCBs on plane with one another. Optionally, and such as shown in FIGS. 81 and 82, a larger current draw may be used.

Figure 80:
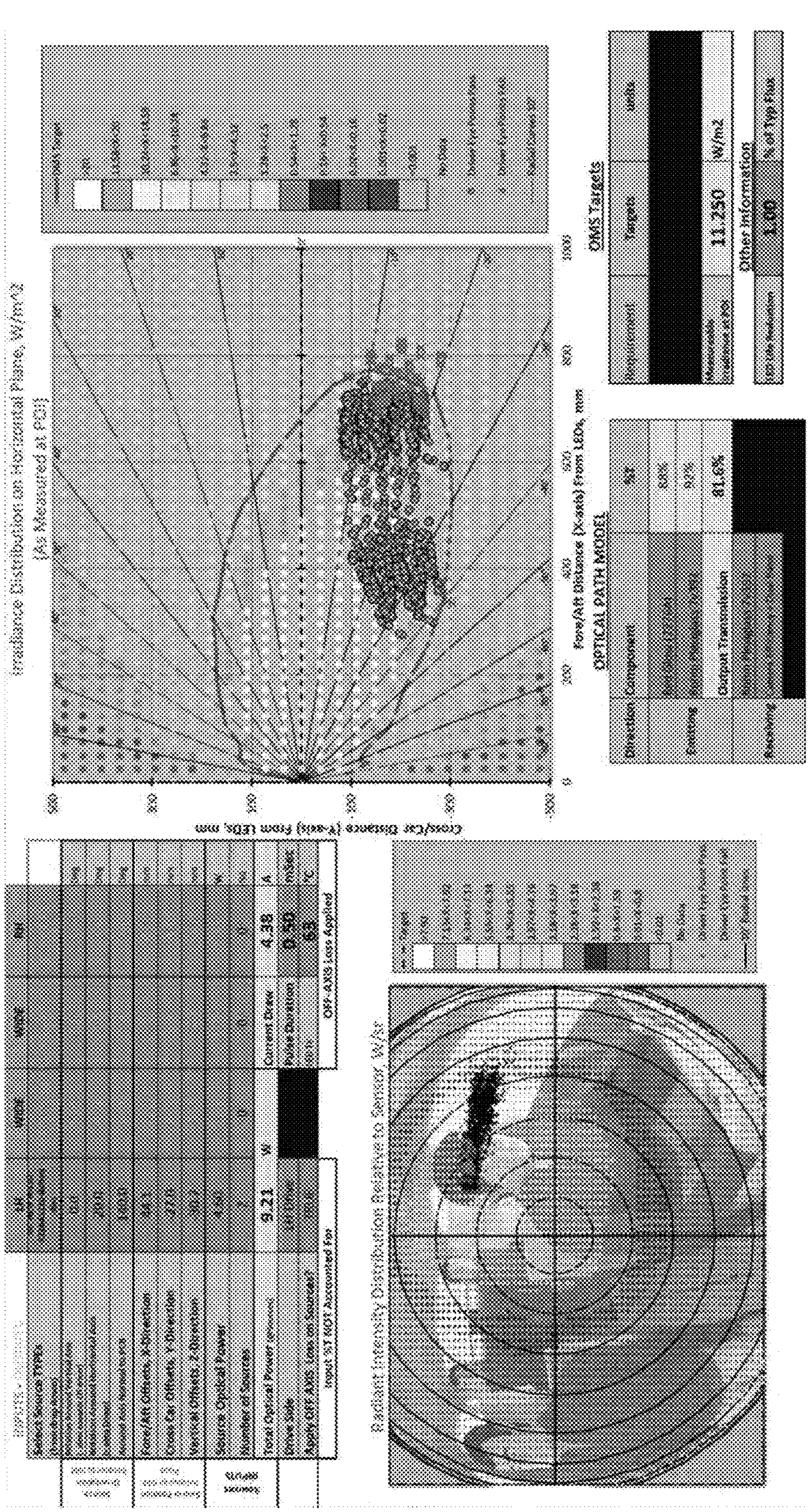

Optionally, with the PCB parallel to the mirror reflective element, a Fresnel prism may be disposed at the red glow filter and a narrow near IR LED may be added and/or changed to have an 80 degree beam angle. FIG. 80 shows example irradiance of the driver region with a current draw of about 2.31 amps and FIG. 81 shows example irradiance of the driver region with a current draw of about 5 amps.

Referring to FIGS. 83-87, the mirror assembly 10 may include the DMS camera 18 at the center portion of the chin region 26 and at a 20 degree angle relative to the mirror reflective element 14. The chin cover 28 may be at a 20 degree angle relative to the mirror reflective element 14. Because the LHD DMS near IR LEDs, the RHD DMS near IR LEDS and the OMS near IR LEDs are disposed on the same PCB as the camera, the LEDs 24 may be at the 20 degree angle relative to the mirror reflective element. The narrow view near IR LEDs or DMS LEDs for RHD vehicles may be disposed at one side portion of the chin region (e.g., the driver's side portion for a RHD vehicle), with the narrow view near IR LEDs or DMS LEDs for LHD vehicles disposed at the other side portion of the chin region (e.g., the driver's side portion for a LHD vehicle). The wide view near IR LEDs or OSM IR LEDs may be disposed between the LHD DMS near IR LEDs and the camera 18. Thus, the mirror assembly may be suitable for use in both LHD vehicles and RHD vehicles. Further, because the interior rearview mirror assembly is symmetrical, LHD irradiance will equal RHD irradiance.

As shown in FIGS. 88-92, image data may be captured with the mirror assembly moved to five different locations, such as a central or nominal position and four corners of mirror movement tolerance. Using this image data together with measured pitch, yaw, and roll of the mirror assembly, the driver and passenger points of interest may be mapped to the camera and/or for IR LED coordinates. At the nominal position, the rear window reflection may be approximately centered on the mirror reflective element when viewed using a monocular eye point of the driver. At the aim tolerance positions, only about 75 percent of the rear window in both the vertical and horizontal axes may be reflected in the mirror reflective element when viewed from the monocular eye point of the driver. This is repeated for each of the four corners of the aim tolerance (passenger side and upward, passenger side and downward, driver side and upward, driver side and downward). The camera may be about 500 millimeters rearward from the mirror pivot.

The interior mirror assembly may comprise a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety. The operating mode of the mirror and video display screen may be selected by flipping the mirror head upward or downward (e.g., via a toggle located at the mirror head) or responsive to another user input. When the mirror is operating in the mirror mode, the video display screen is deactivated and rendered covert by the mirror reflective element, and the driver views rearward via reflection of light incident at the mirror reflective element. When the mirror is operating in the display mode, the video display screen is operated to display video images that are viewable through the mirror reflective element by the driver of the vehicle.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Although shown as an electrochromic mirror application, it is envisioned that the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

The mirror assembly may include the camera or sensor or light of the driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,827,153; 11,780,372; 11,639,134; 11,582,425; 11,518,401; 10,958,830; 10,065,574; 10,017,114; 9,405,120 and/or 7,914,187, and/or U.S. Publication Nos. US-2024-0383406; US-2024-0190456; US-2024-0168355; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International PCT Application PCT/US2025/027206, filed May 1, 2025 and published on Nov. 6, 2025 as International Publication No. WO 2025/231198, and/or International Publication No. WO 2023/220222, which are all hereby incorporated herein by reference in their entireties.

The camera includes a lens and imaging sensor. The imaging sensor may have a quantum efficiency (QE) of at least 15% for near-infrared (near-IR) light having a wavelength of 940 nm, or a quantum efficiency (QE) of at least 22% for near-infrared (near-IR) light having a wavelength of 940 nm, or a quantum efficiency (QE) of at least 32% for near-infrared (near-IR) light having a wavelength of 940 nm, such as by utilizing aspects of the cameras and systems described in U.S. Pat. No. 11,639,134, which is hereby incorporated herein by reference in its entirety. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a lens focusing images onto the imaging array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least two million photosensor elements or at least three million photosensor elements or pixels or at least five million photosensor elements or pixels arranged in rows and columns. The imaging array may be sensitive to near-infrared light. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS (e.g., a rearward-viewing camera disposed at the rear of the vehicle remote from the rear backup camera of the vehicle, and rearward-viewing cameras disposed at respective sides of the vehicle, such as at respective side-mounted exterior rearview mirror assemblies of the vehicle), to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:

a vehicular interior rearview mirror assembly comprising a mirror head adjustable about a mounting structure, wherein the mounting structure is configured to mount the vehicular interior rearview mirror assembly at an interior portion of an interior cabin of a vehicle;

wherein the mirror head accommodates a mirror reflective element;

wherein a cabin monitoring camera is accommodated by the mirror head, and wherein the cabin monitoring camera moves together and in tandem with the mirror head when, with the vehicular interior rearview mirror assembly mounted at the interior portion of the interior cabin of the vehicle, the mirror head is adjusted about the mounting structure to provide a rearward view provided by the mirror reflective element for a driver of the vehicle;

wherein the cabin monitoring camera is operable to capture image data;

wherein a near infrared light source is accommodated by the mirror head, and wherein the near infrared light source moves together and in tandem with the mirror head when, with the vehicular interior rearview mirror assembly mounted at the interior portion of the interior cabin of the vehicle, the mirror head is adjusted about the mounting structure to provide the rearward view for the driver of the vehicle;

an electronic control unit (ECU);

wherein image data captured by the cabin monitoring camera is transferred to the ECU;

wherein the ECU comprises electronic circuitry and associated software, and wherein the electronic circuitry of the ECU comprises an image processor operable to process image data captured by the cabin monitoring camera and transferred to the ECU;

wherein the mirror head comprises a chin portion that, with the vehicular interior rearview mirror assembly mounted at the interior portion of the interior cabin of the vehicle, is disposed at a lower region of the mirror head, and wherein the chin portion of the mirror head accommodates a cover panel disposed below a lower edge region of the mirror reflective element;

wherein, with the vehicular interior rearview mirror assembly mounted at the interior portion of the interior cabin of the vehicle, (i) the cabin monitoring camera views through the cover panel and views at least a driver region of the interior cabin of the vehicle and a front passenger region of the interior cabin of the vehicle and (ii) the near infrared light source, when electrically operated to emit near infrared light, emits near infrared light that passes through the cover panel;

wherein an outer surface of the cover panel is disposed at an oblique angle relative to an outer surface of the mirror reflective element at the lower region of the mirror reflective element;

wherein a principal viewing axis of the cabin monitoring camera is perpendicular to the outer surface of the cover panel;

wherein the cabin monitoring camera is accommodated by the chin portion at a first side region of the chin portion, and wherein the near infrared light source is accommodated by the chin portion at a second side region of the chin portion that is opposite the first side region; and wherein, with the vehicular interior rearview mirror assembly mounted at the interior portion of the interior cabin of the vehicle, image data captured by the cabin monitoring camera is processed at the ECU at least for monitoring the driver of the vehicle.

2. The vehicular cabin monitoring system of claim 1, wherein the near infrared light source comprises (i) a first near infrared light emitter that, when electrically operated, emits near infrared light that illuminates the driver region of the interior cabin of the vehicle and (ii) a second near infrared light emitter that, when electrically operated, emits near infrared light that illuminates the front passenger region of the interior cabin of the vehicle.

3. The vehicular cabin monitoring system of claim 2, wherein the second near infrared light emitter is disposed at the chin portion between the first near infrared light emitter and the cabin monitoring camera.

4. The vehicular cabin monitoring system of claim 2, wherein a printed circuit board (PCB) is at least partially accommodated by the chin portion, and wherein the first near infrared light emitter, the second near infrared light emitter, and an imager of the cabin monitoring camera are all disposed at the PCB.

5. The vehicular cabin monitoring system of claim 4, wherein the PCB is disposed at the oblique angle relative to the outer surface of the mirror reflective element.

6. The vehicular cabin monitoring system of claim 4, wherein the first near infrared light emitter, when electrically operated, emits near infrared light along a first beam direction that is at a first angle relative to the PCB, and wherein the second near infrared light emitter, when electrically operated, emits near infrared light along a second beam direction that is at a second angle relative to the PCB, and wherein the first angle is different from the second angle.

7. The vehicular cabin monitoring system of claim 6, wherein the first near infrared light emitter, when electrically operated, emits near infrared light that passes through a first lens, and wherein the first near infrared light emitter is off-center from the first lens.

8. The vehicular cabin monitoring system of claim 7, wherein the second near infrared light emitter, when electrically operated, emits near infrared light that passes through a second lens, and wherein the second near infrared light emitter is off-center from the second lens.

9. The vehicular cabin monitoring system of claim 2, wherein the near infrared light source further comprises a third near infrared light emitter that, when electrically operated, emits near infrared light that illuminates a rear passenger region of the interior cabin of the vehicle.

10. The vehicular cabin monitoring system of claim 2, wherein image data captured by the cabin monitoring camera is processed for monitoring the driver of the vehicle and for monitoring the front passenger region of the interior cabin of the vehicle.

11. The vehicular cabin monitoring system of claim 1, wherein, with the vehicular interior rearview mirror assembly mounted at the interior portion of the interior cabin of the vehicle, (i) the first side region of the chin portion is closer to the front passenger region of the interior cabin of the vehicle than the second side region of the chin portion and (ii) the second side region of the chin portion is closer to the driver region of the interior cabin of the vehicle than the first side region of the chin portion.

12. The vehicular cabin monitoring system of claim 1, wherein, with the vehicular interior rearview mirror assembly mounted at the interior portion of the interior cabin of the vehicle, (i) the first side region of the chin portion is closer to the driver region of the interior cabin of the vehicle than the second side region of the chin portion and (ii) the second side region of the chin portion is closer to the front passenger region of the interior cabin of the vehicle than the first side region of the chin portion.

13. The vehicular cabin monitoring system of claim 1, wherein the vehicular cabin monitoring system, based on processing of image data captured by the cabin monitoring camera, determines a gaze direction of the driver of the vehicle.

14. The vehicular cabin monitoring system of claim 13, wherein the vehicular cabin monitoring system determines the gaze direction of the driver of the vehicle based on a dark pupil algorithm.

15. The vehicular cabin monitoring system of claim 13, wherein the vehicular cabin monitoring system determines the gaze direction of the driver of the vehicle based on a bright pupil algorithm.

16. The vehicular cabin monitoring system of claim 1, wherein, with the vehicular interior rearview mirror assembly mounted at the interior portion of the interior cabin of the vehicle, the cabin monitoring camera has a field of view that spans at least 90 degrees horizontally.

17. The vehicular cabin monitoring system of claim 16, wherein, with the vehicular interior rearview mirror assembly mounted at the interior portion of the interior cabin of the vehicle, and with the mirror head adjusted about the mounting structure to provide the rearward view for the driver of the vehicle, (i) at least 40 degrees of the field of view of the cabin monitoring camera views a driver's head portion of the driver region of the interior cabin of the vehicle and (ii) at least 50 degrees of the field of view of the cabin monitoring camera views a driver's lap portion of the driver region of the interior cabin of the vehicle.

18. The vehicular cabin monitoring system of claim 1, wherein the cabin monitoring camera has a field of view that, with the vehicular interior rearview mirror assembly mounted at the interior portion of the interior cabin of the vehicle, has a horizontal range that spans at least 140 degrees.

19. The vehicular cabin monitoring system of claim 18, wherein the cabin monitoring camera has a field of view that, with the vehicular interior rearview mirror assembly mounted at the interior portion of the interior cabin of the vehicle, has a vertical range that spans at least 90 degrees.

20. A vehicular cabin monitoring system, the vehicular cabin monitoring system comprising:

a vehicular interior rearview mirror assembly comprising a mirror head adjustable about a mounting structure, wherein the mounting structure is configured to mount the vehicular interior rearview mirror assembly at an interior portion of an interior cabin of a vehicle;

wherein the mirror head accommodates a mirror reflective element;

wherein a cabin monitoring camera is accommodated by the mirror head, and wherein the cabin monitoring camera moves together and in tandem with the mirror head when, with the vehicular interior rearview mirror assembly mounted at the interior portion of the interior cabin of the vehicle, the mirror head is adjusted about the mounting structure to provide a rearward view provided by the mirror reflective element for a driver of the vehicle;

wherein the cabin monitoring camera is operable to capture image data;

wherein a near infrared light source is accommodated by the mirror head, and wherein the near infrared light source moves together and in tandem with the mirror head when, with the vehicular interior rearview mirror assembly mounted at the interior portion of the interior cabin of the vehicle, the mirror head is adjusted about the mounting structure to provide the rearward view for the driver of the vehicle;

an electronic control unit (ECU);

wherein image data captured by the cabin monitoring camera is transferred to the ECU;

wherein the ECU comprises electronic circuitry and associated software, and wherein the electronic circuitry of the ECU comprises an image processor operable to process image data captured by the cabin monitoring camera and transferred to the ECU;

wherein the mirror head comprises a chin portion that, with the vehicular interior rearview mirror assembly mounted at the interior portion of the interior cabin of the vehicle, is disposed at a lower region of the mirror head, and wherein the chin portion of the mirror head accommodates a cover panel disposed below a lower edge region of the mirror reflective element;

wherein, with the vehicular interior rearview mirror assembly mounted at the interior portion of the interior cabin of the vehicle, (i) the cabin monitoring camera views through the cover panel and views at least a driver region of the interior cabin of the vehicle and a front passenger region of the interior cabin of the vehicle and (ii) the near infrared light source, when electrically operated to emit near infrared light, emits near infrared light that passes through the cover panel;

wherein an outer surface of the cover panel is disposed at an oblique angle relative to an outer surface of the mirror reflective element at the lower region of the mirror reflective element;

wherein a principal viewing axis of the cabin monitoring camera is perpendicular to the outer surface of the cover panel;

wherein the cabin monitoring camera is accommodated by the chin portion at a first side region of the chin portion, and wherein the near infrared light source is accommodated by the chin portion at a second side region of the chin portion that is opposite the first side region;

wherein, with the vehicular interior rearview mirror assembly mounted at the interior portion of the interior cabin of the vehicle, (i) the first side region of the chin portion is closer to the front passenger region of the interior cabin of the vehicle than the second side region of the chin portion and (ii) the second side region of the chin portion is closer to the driver region of the interior cabin of the vehicle than the first side region of the chin portion;

wherein the near infrared light source comprises (i) a first near infrared light emitter that, when electrically operated, emits near infrared light that illuminates the driver region of the interior cabin of the vehicle and (ii) a second near infrared light emitter that, when electrically operated, emits near infrared light that illuminates the front passenger region of the interior cabin of the vehicle; and wherein, with the vehicular interior rearview mirror assembly mounted at the interior portion of the interior cabin of the vehicle, image data captured by the cabin monitoring camera is processed at the ECU at least for (i) monitoring the driver of the vehicle and (ii) monitoring the front passenger region of the interior cabin of the vehicle.

21. The vehicular cabin monitoring system of claim 20, wherein the second near infrared light emitter is disposed at the chin portion between the first near infrared light emitter and the cabin monitoring camera.

22. The vehicular cabin monitoring system of claim 20, wherein a printed circuit board (PCB) is at least partially accommodated by the chin portion, and wherein the first near infrared light emitter, the second near infrared light emitter, and an imager of the cabin monitoring camera are all disposed at the PCB.

23. The vehicular cabin monitoring system of claim 22, wherein the first near infrared light emitter, when electrically operated, emits near infrared light along a first beam direction that is at a first angle relative to the PCB, and wherein the second near infrared light emitter, when electrically operated, emits near infrared light along a second beam direction that is at a second angle relative to the PCB, and wherein the first angle is different from the second angle.

24. The vehicular cabin monitoring system of claim 20, wherein, with the vehicular interior rearview mirror assembly mounted at the interior portion of the interior cabin of the vehicle, the cabin monitoring camera has a field of view that spans at least 90 degrees horizontally, and wherein, with the vehicular interior rearview mirror assembly mounted at the interior portion of the interior cabin of the vehicle, and with the mirror head adjusted about the mounting structure to provide the rearward view for the driver of the vehicle, (i) at least 40 degrees of the field of view of the cabin monitoring camera views a driver's head portion of the driver region of the interior cabin of the vehicle and (ii) at least 50 degrees of the field of view of the cabin monitoring camera views a driver's lap portion of the driver region of the interior cabin of the vehicle.

25. A vehicular cabin monitoring system, the vehicular cabin monitoring system comprising:

a vehicular interior rearview mirror assembly comprising a mirror head adjustable about a mounting structure, wherein the mounting structure is configured to mount the vehicular interior rearview mirror assembly at an interior portion of an interior cabin of a vehicle;

wherein the mirror head accommodates a mirror reflective element;

wherein a cabin monitoring camera is accommodated by the mirror head, and wherein the cabin monitoring camera moves together and in tandem with the mirror head when, with the vehicular interior rearview mirror assembly mounted at the interior portion of the interior cabin of the vehicle, the mirror head is adjusted about the mounting structure to provide a rearward view provided by the mirror reflective element for a driver of the vehicle;

wherein the cabin monitoring camera is operable to capture image data;

wherein a near infrared light source is accommodated by the mirror head, and wherein the near infrared light source moves together and in tandem with the mirror head when, with the vehicular interior rearview mirror assembly mounted at the interior portion of the interior cabin of the vehicle, the mirror head is adjusted about the mounting structure to provide the rearward view for the driver of the vehicle;

an electronic control unit (ECU);

wherein image data captured by the cabin monitoring camera is transferred to the ECU;

wherein the ECU comprises electronic circuitry and associated software, and wherein the electronic circuitry of the ECU comprises an image processor operable to process image data captured by the cabin monitoring camera and transferred to the ECU;

wherein the mirror head comprises a chin portion that, with the vehicular interior rearview mirror assembly mounted at the interior portion of the interior cabin of the vehicle, is disposed at a lower region of the mirror head, and wherein the chin portion of the mirror head accommodates a cover panel disposed below a lower edge region of the mirror reflective element;

wherein, with the vehicular interior rearview mirror assembly mounted at the interior portion of the interior cabin of the vehicle, (i) the cabin monitoring camera views through the cover panel and views at least a driver region of the interior cabin of the vehicle and a front passenger region of the interior cabin of the vehicle and (ii) the near infrared light source, when electrically operated to emit near infrared light, emits near infrared light that passes through the cover panel;

wherein an outer surface of the cover panel is disposed at an oblique angle relative to an outer surface of the mirror reflective element at the lower region of the mirror reflective element;

wherein a principal viewing axis of the cabin monitoring camera is perpendicular to the outer surface of the cover panel;

wherein the cabin monitoring camera is accommodated by the chin portion at a first side region of the chin portion, and wherein the near infrared light source is accommodated by the chin portion at a second side region of the chin portion that is opposite the first side region;

wherein, with the vehicular interior rearview mirror assembly mounted at the interior portion of the interior cabin of the vehicle, (i) the first side region of the chin portion is closer to the driver region of the interior cabin of the vehicle than the second side region of the chin portion and (ii) the second side region of the chin portion is closer to the front passenger region of the interior cabin of the vehicle than the first side region of the chin portion;

wherein the near infrared light source comprises (i) a first near infrared light emitter that, when electrically operated, emits near infrared light that illuminates the driver region of the interior cabin of the vehicle and (ii) a second near infrared light emitter that, when electrically operated, emits near infrared light that illuminates the front passenger region of the interior cabin of the vehicle; and wherein, with the vehicular interior rearview mirror assembly mounted at the interior portion of the interior cabin of the vehicle, image data captured by the cabin monitoring camera is processed at the ECU at least for (i) monitoring the driver of the vehicle and (ii) monitoring the front passenger region of the interior cabin of the vehicle.

26. The vehicular cabin monitoring system of claim 25, wherein the second near infrared light emitter is disposed at the chin portion between the first near infrared light emitter and the cabin monitoring camera.

27. The vehicular cabin monitoring system of claim 25, wherein a printed circuit board (PCB) is at least partially accommodated by the chin portion, and wherein the first near infrared light emitter, the second near infrared light emitter, and an imager of the cabin monitoring camera are all disposed at the PCB.

28. The vehicular cabin monitoring system of claim 27, wherein the first near infrared light emitter, when electrically operated, emits near infrared light along a first beam direction that is at a first angle relative to the PCB, and wherein the second near infrared light emitter, when electrically operated, emits near infrared light along a second beam direction that is at a second angle relative to the PCB, and wherein the first angle is different from the second angle.

29. The vehicular cabin monitoring system of claim 25, wherein the near infrared light source further comprises a third near infrared light emitter that, when electrically operated, emits near infrared light that illuminates a rear passenger region of the interior cabin of the vehicle.

30. The vehicular cabin monitoring system of claim 25, wherein, with the vehicular interior rearview mirror assembly mounted at the interior portion of the interior cabin of the vehicle, the cabin monitoring camera has a field of view that spans at least 90 degrees, and wherein, with the vehicular interior rearview mirror assembly mounted at the interior portion of the interior cabin of the vehicle, and with the mirror head adjusted about the mounting structure to provide the rearward view for the driver of the vehicle, (i) at least 40 degrees of the field of view of the cabin monitoring camera views a driver's head portion of the driver region of the interior cabin of the vehicle and (ii) at least 50 degrees of the field of view of the cabin monitoring camera views a driver's lap portion of the driver region of the interior cabin of the vehicle.

* * * * *